(12) United States Patent (10) Patent No.: US 8,462,998 B2
Sun et al. (45) Date of Patent: *Jun. 11, 2013

(54) IMAGE PROCESSING APPARATUS, IMAGE PROCESSING METHOD, AND PROGRAM

(75) Inventors: Yun Sun, Tokyo (JP); Tamaki Kojima, Kanagawa (JP); Tomohiko Gotoh, Kanagawa (JP); Makoto Murata, Tokyo (JP); Masatomo Kurata, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/216,983

(22) Filed: Aug. 24, 2011

(65) Prior Publication Data

US 2012/0039514 A1 Feb. 16, 2012

Related U.S. Application Data

(63) Continuation of application No. 12/484,643, filed on Jun. 15, 2009, now Pat. No. 8,027,523.

(30) Foreign Application Priority Data

Jun. 18, 2008 (JP) ................................ P2008-159782

(51) Int. Cl.
*G06K 9/00* (2006.01)
*H04N 9/07* (2006.01)

(52) U.S. Cl.
USPC ......................................... 382/118; 348/267

(58) Field of Classification Search
USPC .. 382/103, 104, 107, 115–118, 236; 348/154, 348/155, 169, 170, 171, 172, 267; 379/93.03, 379/207.13
See application file for complete search history.

(56) References Cited

U.S. PATENT DOCUMENTS 6,526,158 B1 * 2/2003 Goldberg ...................... 382/115
(Continued)

FOREIGN PATENT DOCUMENTS

JP 11-175730 7/1999
(Continued)

OTHER PUBLICATIONS

Japanese Office Action in corresponding Japanese Patent Application 2008-159782 dated Apr. 5, 2010.
(Continued)

*Primary Examiner* — Abolfazl Tabatabai
(74) *Attorney, Agent, or Firm* — Finnegan Henderson Farabow Garrett & Dunner LLP

(57) ABSTRACT

An image processing apparatus includes a face detector detecting face images from still-image frames successively extracted from a moving-image stream in accordance with image information items regarding the still-image frames, a face-feature-value calculation unit calculating face feature values of the face images in accordance with image information items regarding the face images, an identity determination unit determining whether a first face image in a current frame and a second face image in a previous frame represent an identical person in accordance with at least face feature values of the first and second face images, and a merging processor which stores one of the first and second face images when the first face image and the second face image represent an identical person, and which stores the first and second face images when the first face image and the second face image do not represent an identical person.

32 Claims, 46 Drawing Sheets

U.S. PATENT DOCUMENTS

| | | | |
|---|---|---|---|
| 7,239,725 B2 * | 7/2007 | Dobashi | 382/118 |
| 7,734,072 B2 * | 6/2010 | Yamaguchi | 382/118 |
| 8,116,537 B2 * | 2/2012 | Date et al. | 382/118 |

FOREIGN PATENT DOCUMENTS

| | | |
|---|---|---|
| JP | 2008-17042 | 1/2008 |
| JP | 2008-77536 | 4/2008 |
| WO | WO 2006/025185 A1 | 3/2006 |

OTHER PUBLICATIONS

Okamura, et al., "Clustering of Face Features for Listing Performers in TV-Programs", FIT 2006, Public lecture memoirs, Third Separate Volume, pp. 29-30, (Aug. 21, 2006).

F. Cootes et al., "Active Appearance Models," Proc. Fifth European Conf. Computer Vision, H. Burkhardt and B. Neumann, eds, vol. 2, pp. 484-498 (1998).

* cited by examiner

FIG. 4

| ITEM | DESCRIPTION ITEM |
|---|---|
| FACE ID | UNIQUE IDS FOR INDIVIDUAL DETECTED FACE IMAGES |
| FACE-DETECTION FRAME INFORMATION | INFORMATION ON DETECTION FRAME OF FACE IMAGE (x, y, WIDTH, HEIGHT) |
| FACE ROTATION ANGLE INFORMATION | INFORMATION ON ROTATION ANGLE OF FACE IMAGE (ROLL, PITCH, YAW) |
| SMILE SCORE | POSITIVE = SMILE, NEGATIVE = NON-SMILE |
| CONTRAST SCORE | LARGE = SHARP AND HIGH CONTRAST SMALL = BLURRING AND LOW CONTRAST |
| FACE FEATURE VALUE | IDENTIFICATION FEATURE VECTOR FOR CALCULATING DEGREE OF SIMILARITY BETWEEN FACE IMAGES |

FIG. 5

| ITEM | DESCRIPTION ITEM |
|---|---|
| CLUSTER ID | IDENTIFIER FOR IDENTIFY FINAL CLUSTER |
| FACE ID LIST | LIST OF FACE IDS OF FACE IMAGES INCLUDED IN CLUSTER |
| REPRESENTATIVE FACE ID | FACE ID OF REPRESENTATIVE FACE IMAGE |

FIG. 11
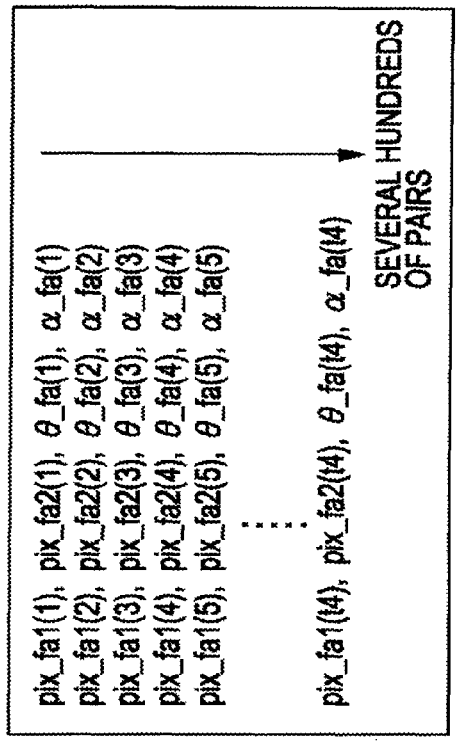
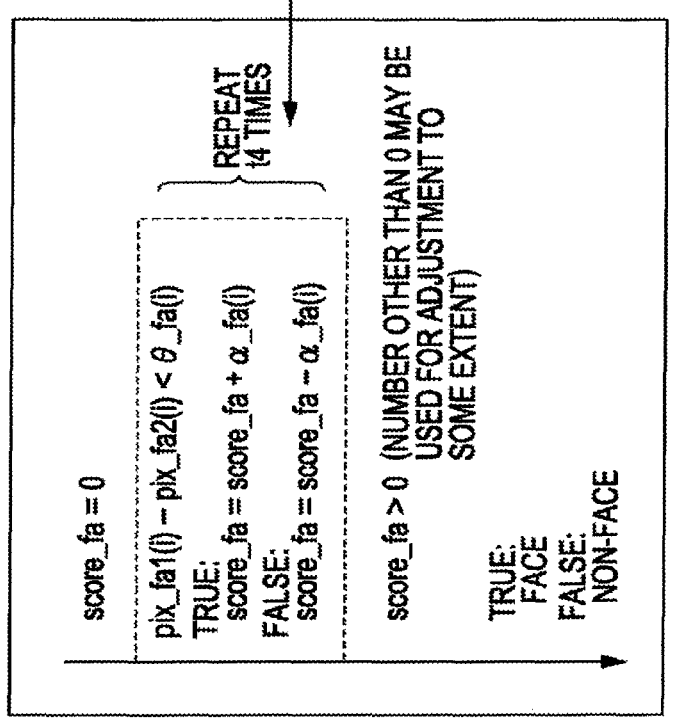

FIG. 23A

YAW ANGLE: −5 DEGREES $\begin{pmatrix} \text{IMAGE IS NOT} \\ \text{SIDE-FACE IMAGE} \end{pmatrix}$

FIG. 23B

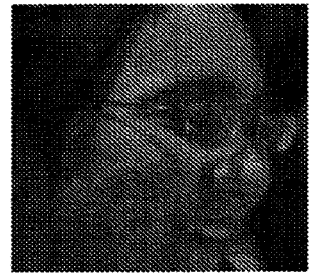

YAW ANGLE: 50 DEGREES $\begin{pmatrix} \text{IMAGE IS} \\ \text{SIDE-FACE IMAGE} \\ \text{AND REMOVED} \end{pmatrix}$

FIG. 24A

SCORE: 350

$\begin{pmatrix} \text{IMAGE IS NOT} \\ \text{BLURRING FACE IMAGE} \end{pmatrix}$

FIG. 24B

SCORE: 120

$\begin{pmatrix} \text{IMAGE IS BLURRING} \\ \text{FACE IMAGE} \\ \text{AND REMOVED} \end{pmatrix}$

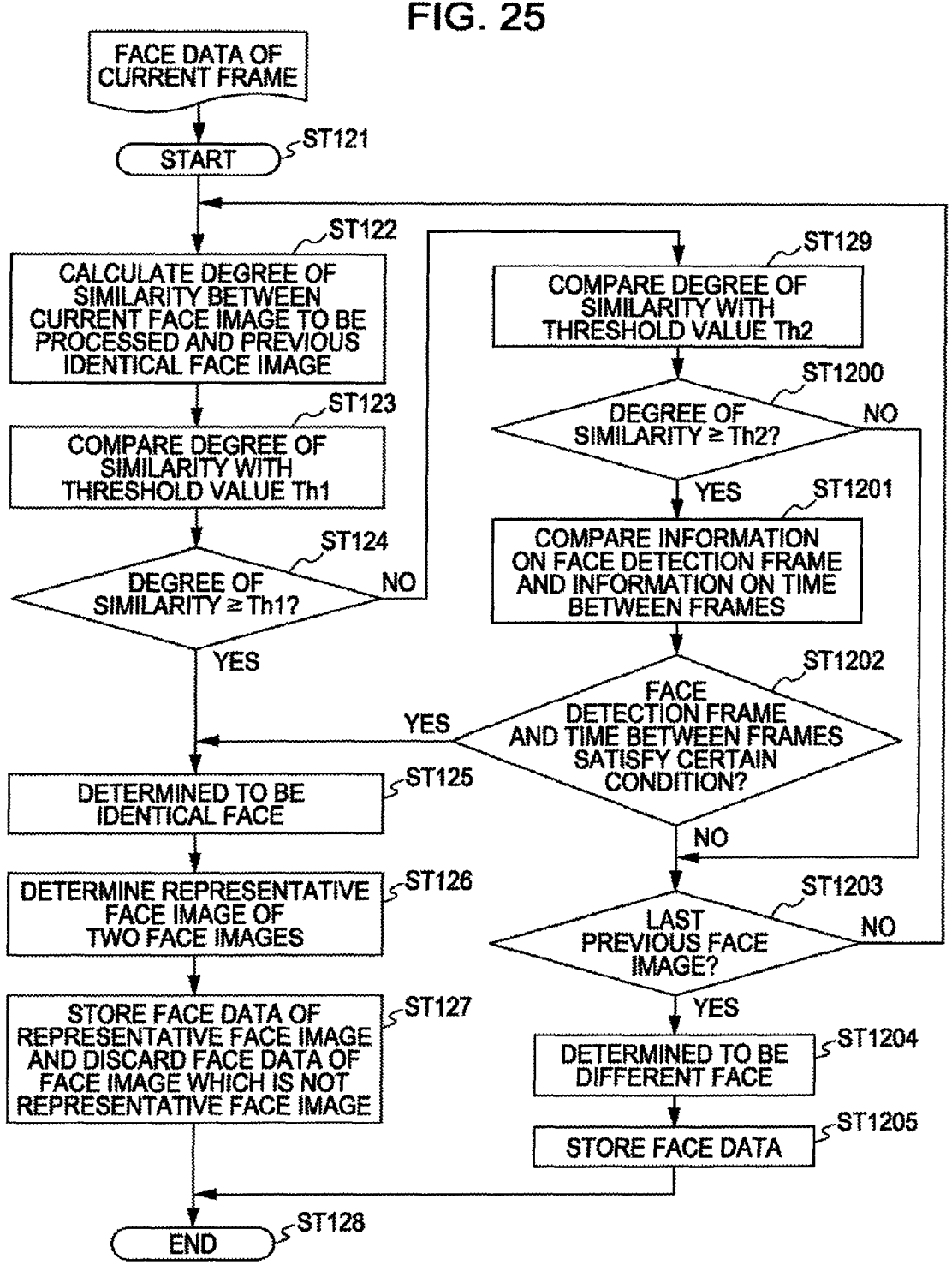

PREVIOUS FACE IMAGE

CURRENT FACE IMAGE

DEGREE OF SIMILARITY: 88

PREVIOUS FACE IMAGE

CURRENT FACE IMAGE

DEGREE OF SIMILARITY: 3

FRAME1

FRAME3

FIG. 30

| ID\ID | f1 | f2 | f3 | f4 | ... | fn |
|---|---|---|---|---|---|---|
| f1 | | ▨ | ▨ | ▨ | ▨ | ▨ |
| f2 | | | ▨ | ▨ | ▨ | ▨ |
| f3 | | | | ▨ | ▨ | ▨ |
| f4 | | | | | ▨ | ▨ |
| ⋮ | | | | | | ▨ |
| fn | | | | | | |

FIG. 31

| RANK | PAIR | DEGREE OF SIMILARITY |
|---|---|---|
| 1 | (f1, f3) | 91.5 |
| 2 | (f7, f12) | 90 |
| 3 | (f11, f9) | 87 |
| 4 | (f15, f9) | 86.5 |
| ⋮ | ⋮ | ⋮ |
| N | (fI, fJ) | −20 |

FIG. 33

| DATA | DESCRIPTION |
|---|---|
| NODE NUMBER | UNIQUE IDS FOR INDIVIDUAL NODES |
| UPPER LAYER NODE INFORMATION | POINTER TO UPPER LAYER NODE (NULL FOR THE UPPERMOST LAYER NODE) |
| LOWER LAYER NODE INFORMATION | POINTER TO LOWER LAYER NODE (BOTH ARE NULL FOR LOWERMOST LAYER NODE) |
| LEAF LIST | FACE ID LIST OF ALL LEAVES (TERMINAL NODES) OF LOWERMOST LAYER. SINGLE FACE ID IS INCLUDED IN CASE OF TERMINAL NODE |

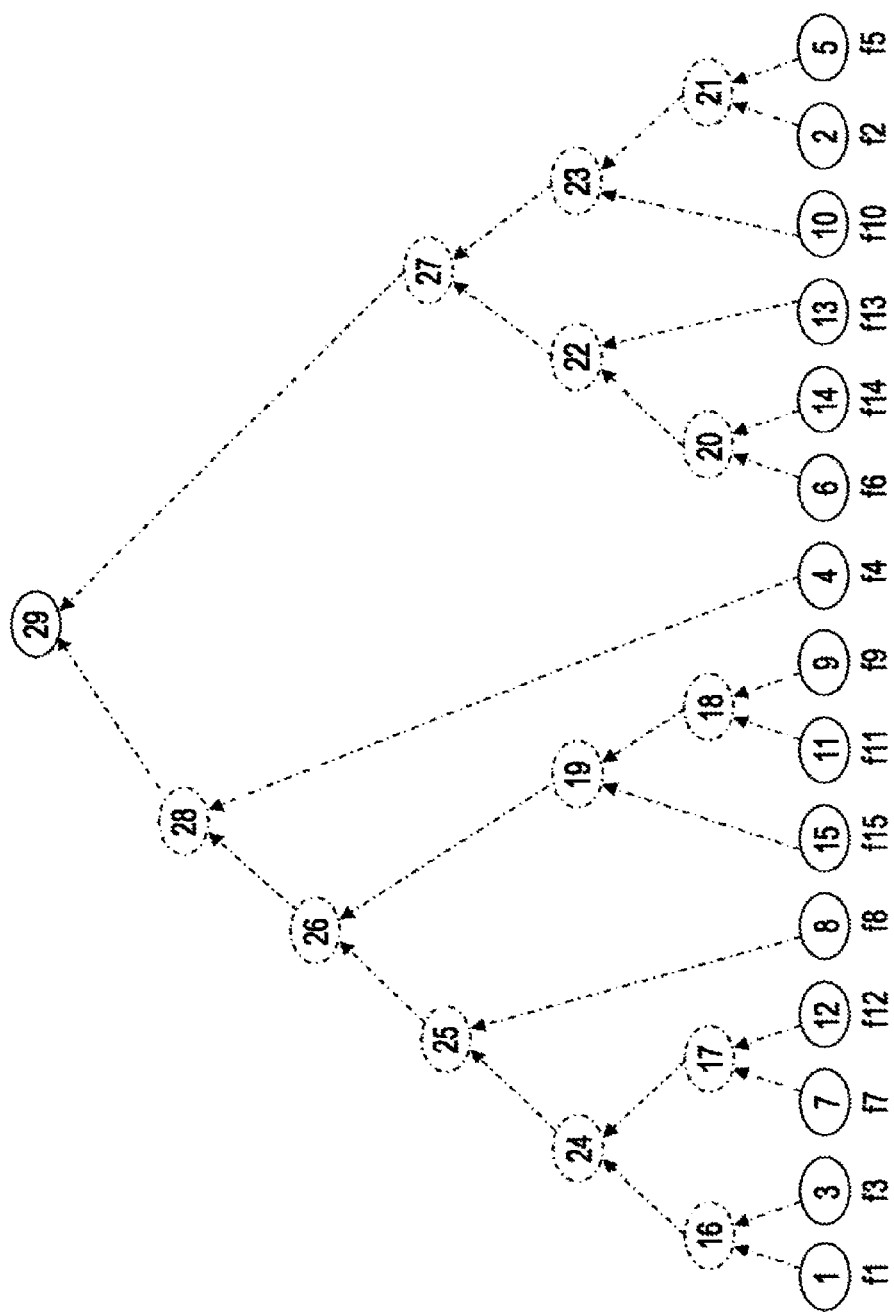

FIG. 35

| DATA | DESCRIPTION |
|---|---|
| NODE NUMBER | 19 |
| UPPER LAYER NODE INFORMATION | POINTER TO 26TH NODE |
| LOWER LAYER NODE INFORMATION | POINTER TO 15TH NODE<br>POINTER TO 18TH NODE |
| LEAF LIST | f9, f11, f15 |

NON-FRONT-FACE

FRONT AND UNIFORM LUMINANCE

FRONT AND UNEVEN LUMINANCE

FRONT AND BLURRING

FIG. 44

| | RESULT OF FACE CLUSTERING PROCESSING |
|---|---|
| Mr. A | A, A, A, B, C, A, D, A, A ... |
| Mr. B | B, B, C, B, B ... |
| ⋮ | ⋮ |
| Mr. K | K, K, K, B ... |

OVER-MERGING

OVER-DIVIDING

FIG. 45

| | | PREDICTING RESULT | | | | |
|---|---|---|---|---|---|---|
| | | CLUSTER 1 | CLUSTER 2 | CLUSTER 3 | ... | CLUSTER N |
| ACTUAL RESULT | CLUSTER 1 | c(1, 1) | c(1, 2) | c(1, 3) | ... | c(1, N) |
| | CLUSTER 2 | c(2, 1) | c(2, 2) | c(2, 3) | ... | c(2, N) |
| | CLUSTER 3 | c(3, 1) | c(3, 2) | c(3, 3) | ... | c(3, N) |
| | ... | ... | ... | ... | ... | ... |
| | CLUSTER M | c(M, 1) | c(M, 2) | c(M, 3) | ... | c(M, N) |

FIG. 46

|  |  | PREDICTING RESULT | | | | |
|---|---|---|---|---|---|---|
|  |  | CLUSTER 1 | CLUSTER 2 | CLUSTER 3 | ... | CLUSTER N |
| ACTUAL RESULT | CLUSTER 1 | c(1,1) | 0 | 0 | ... | 0 |
|  | CLUSTER 2 | 0 | c(2,2) | 0 | ... | 0 |
|  | CLUSTER 3 | 0 | 0 | c(3,3) | ... | 0 |
|  | ... | ... | ... | ... | ... | ... |
|  | CLUSTER N | 0 | 0 | 0 | ... | c(N,N) |

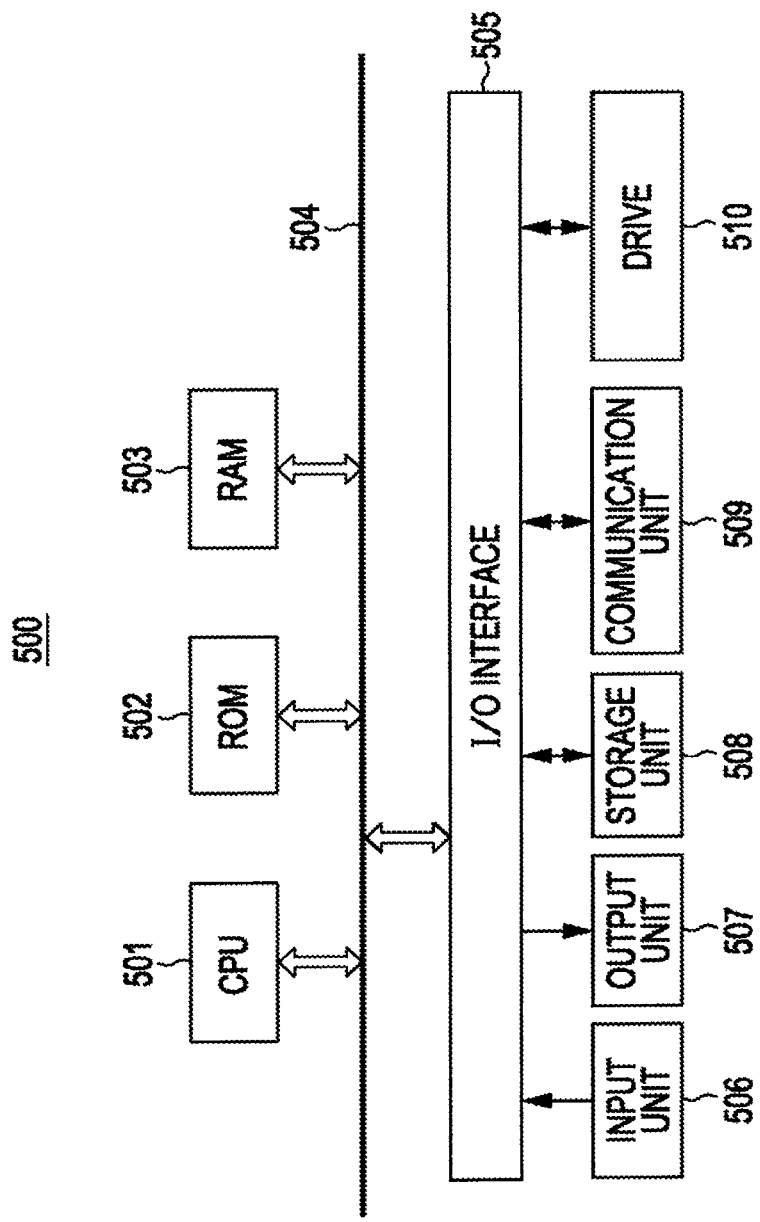

IMAGE PROCESSING APPARATUS, IMAGE PROCESSING METHOD, AND PROGRAM

RELATED APPLICATIONS

This application is a continuation of application Ser. No. 12/484,643, filed Jun. 15, 2009 now U.S. Pat. No. 8,027,523, which claims priority to Japanese Patent Application No. P2008-15972, filed Jun. 18, 2008, the entire contents of each of which are incorporated herein by reference in their entirety.

BACKGROUND OF THE INVENTION

1. Field of the Invention

The present invention relates to image processing apparatuses, image processing methods, and programs. More particularly, the present invention relates to an image processing apparatus which extracts characters through the following analysis performed within a short period of time. The image processing apparatus detects face images (images of a predetermined object) included in still-image frames successively obtained from a moving-image stream, determines whether a person corresponding to a face image detected in a current frame is the same as a person corresponding to a face image which is detected in a previous frame and which has been stored, in accordance with face feature values of the two face images, and stores one of the two face images when the determination is affirmative.

2. Description of the Related Art

In recent years, opportunities of capturing moving images have been increased since camcorders and digital still cameras which employ hard disks and memory cards as recording media have been widely used. Various methods, such as a method for detecting highlights using moving image analysis, have been proposed in order to quickly retrieve and view desired moving-image files and scenes from many moving-image files which have been recorded. An example of such a method for improving ease of retrieval and ease of viewing of moving images includes a method for extracting characters in a moving-image file employing a face detection technique and a face identifying technique. Other similar methods have been proposed.

Japanese Unexamined Patent Application Publication No. 2008-77536, for example, discloses a method for performing face tracking on adjacent frames in a still-image sequence obtained by decoding a moving-image file so that face areas of identical persons are determined, and finally performing clustering in order to distinguish characters.

SUMMARY OF THE INVENTION

In the method disclosed in Japanese Unexamined Patent Application Publication No. 2008-77536, a full frame of the moving-image file or an almost full frame of the moving-image file should be input so that the face tracking is accurately performed. This method is suitable for a case where the face tracking is performed during shooting. However, when a moving-image file is to be processed after shooting, the moving-image file should be fully decoded. When full decoding is performed on a moving-image file for a high-definition television which has been used in recent years, considerably long analysis time is necessary. Therefore, the method disclosed in Japanese Unexamined Patent Application Publication No. 2008-77536 is not practical.

It is desirable to effectively extract characters within a short period of time for analysis.

According to an embodiment of the present invention, there is provided an image processing apparatus including a face detector configured to detect face images from still-image frames successively extracted from a moving-image stream in accordance with image information items regarding the still-image frames, a face-feature-value calculation unit configured to calculate face feature values of the face images in accordance with image information items regarding the face images detected by the face detector, an identity determination unit configured to determine whether a first face image which is included in a current frame and which is detected by the face detector and a second face image which is included in a previous frame and which has been detected and stored by the face detector represent an identical person in accordance with at least face feature values of the first and second face images calculated by the face-feature-value calculation unit, and a merging processor configured to store only one of the first and second face images when the identity determination unit determined that the first face image and the second face image represent an identical person, and to store both the first and second face images when the identity determination unit determined that the first face image and the second face image do not represent an identical person.

In this embodiment, the face detector detects the face images included in the still-image frames successively extracted from the moving-image stream by the face detector in accordance with the image information items regarding the still-image frames. Note that, although the face images are detected in this embodiment, images of a certain object may be generally detected.

For example, the moving-image stream includes intraframes at predetermined intervals. The image information items regarding the still-image frames are successively extracted from the moving-image stream by performing data decompression processing on image information items of the intraframes.

The face-feature-value calculation unit calculates the face feature values of the face images detected by the face detector. The face-feature-value calculation unit detects face-feature positions, such as positions of both ends of an eyebrow, both ends of an eye, the center of the eyebrow, and the center of the eye, and calculates face feature values (local-feature-value vectors) in the face-feature positions using a convolution operation such as Gabor Filter.

An identical person appears in the moving-image stream. Therefore, a plurality of face images representing an identical person are included in the face images detected in accordance with the image information items regarding the still-image frames successively extracted from the moving-image stream. When a character included in the moving-image stream is to be extracted, only a single face image is finally determined for the character.

The identity determination unit determines whether the first face image detected in the current frame and the second face image detected in the previous frame which has been stored represent an identical person in accordance with at least the face feature values of the first and second face images calculated by the face-feature-value calculation unit. The identity determination unit may obtain a degree of similarity between the first and second face images in accordance with the face feature values of the first and second face images, and may compare the degree of similarity with a threshold value so as to determine whether the first and the second face images represent an identical person.

The identity determination unit may determine whether the first and second face images represent an identical person in accordance with, in addition to the face feature values of the first and second face images, at least detection-frame information items regarding the first and second face images or information on an interval between frames of the first and second face images.

The identity determination unit may obtain a degree of similarity between the first and second face images in accordance with the face feature values of the first and second face images, determine that the first and second face images represent an identical person when the degree of similarity is equal to or larger than a first threshold value, and determine that the first and second face images represent an identical person when the detection-frame information items regarding the first and second face images and the information on an interval between frames of the first and second face images satisfy predetermined conditions and when the degree of similarity is smaller than the first threshold value and equal to or larger than a second threshold value.

The predetermined condition for the detection-frame information items may include a first condition in which a distance between a center of a detection frame of the first face image and a center of a detection frame of the second face image is smaller than a threshold value, and a second condition in which an ratio of an area of the detection frame of the first face image to an area of the detection frame of the second face image is in a range from a first threshold value to a second threshold value. The predetermined condition for the information on a frame interval may correspond to a condition in which an interval between frames of the first and second face images are smaller than a threshold value.

When the identity determination unit determined that the first and second images represent an identical person, the merging processor stores one of the first and second face images. When the identity determination unit determined that the first and second images do not represent an identical person, the merging processor stores both the first and second face images.

In this embodiment, the face images included in the still-image frames successively extracted from the moving-image stream are detected, and a determination as to whether the face image detected in the current frame and the face image detected in the previous frame represent an identical person is made in accordance with the face feature values of the face images. When the determination is affirmative, only one of the face images is stored.

In this case, the still-image frames from which the face images are detected are extracted every one second, for example. Therefore, since the number of frames to be analyzed is small, characters are extracted with a short analysis time. For example, a MPEG stream or an AVC stream is employed, merely intraframes included this stream in predetermined intervals are decoded to be used. That is, a so-called full decoding is not necessarily, and therefore, reduction of the analysis time is attained.

As described above, since the identity determination unit determines whether the first face image and the second face image represent an identical person in accordance with at least the detection-frame information items regarding the first and second face images or the interval between the frames of the first and second face images, determination accuracy is enhanced.

In a case where the degree of similarity between the first and second face images which is calculated in accordance with the face feature values of the first and second face images is low due to a lighting condition even though the first face image and the second face image represent an identical person, it is determined that the first face image and the second face image represent an identical person taking whether the detection-frame information items regarding the first and second face images and information on the interval between the frames of the first and second face images satisfy predetermined conditions into consideration.

The image processing apparatus may further includes a face-rotation-angle detector configured to detect face-rotation angles representing angles of faces represented by the face images detected by the face detector, and a noise-face removing unit configured to remove, from among all the face images detected by the face detector, face images having face-rotation angles in a predetermined direction relative to the front which are larger than a threshold value, in accordance with information items regarding the face-rotation angles detected by the face-rotation-angle detector.

As for images representing a face which faces considerably sideways, a face which faces considerably upward, and a face which faces considerably downward, it is possible that face feature values are not accurately obtained by the face-feature-value calculation unit, and accordingly, the determination accuracy of the identity determination unit may be degraded. As described above, by removing the face images having face-rotation-angles in a predetermined direction relative to the from which are larger than the threshold value, images representing a face which faces considerably sideways, a face which faces considerably upward, and a face which faces considerably downward are removed in advance. Accordingly, the determination accuracy of the identity determination unit is prevented from being degraded.

The image processing apparatus may further include a contrast score calculation unit configured to calculate contrast scores representing contrast of the face images in accordance with the image information items regarding the face images detected by the face detector, and a noise-face removing unit configured to remove face images having contrast scores, which have been calculated by the contrast score calculation unit, smaller than a threshold value from among all the face images detected by the face detector.

It is highly possible that face feature values of blurred face images having considerably low contrast scores are not accurately calculated resulting in deterioration of the determination accuracy of the identity determination unit. As described above, by removing the face images having the contrast scores smaller than a threshold value, the blurred face images having considerably low contrast scores are removed in advance. Accordingly, the determination accuracy of the identity determination unit is prevented from being degraded.

The image processing apparatus may include a face clustering unit configured to assign the face images stored by the merging processor to clusters at least in accordance with the face feature values calculated by the face-feature-value calculation unit so that face images representing an identical person are assigned to a single cluster.

When the end of the moving-image stream is reached, the merging processor stores a predetermined number of face images in accordance with image data items corresponding to the still-image frames successively extracted from the moving-image stream. The face clustering unit performs clustering processing in accordance with at least the feature values calculated by the feature value calculation unit so that, among the face images stored by the merging unit, face images representing an identical person are assigned to a single cluster.

As described above, when the merging processor determined that the face image of the current frame and the face image in the previous frame which has been stored represent an identical person, one of the face images is stored. In this way, when the end of the moving-image stream is reached, the number of face images ultimately stored in the merging processor is reduced. Therefore, reduction of processing time of the face clustering unit is reduced.

The face clustering unit may include a similarity degree calculation unit, a layering/clustering unit, and a cluster determination unit. The similarity degree calculation unit may calculate degrees of similarity of individual pairs of face images extracted from the face images stored by the merging processor in accordance with the face feature values of the corresponding pairs of face images. The layering-and-clustering unit may assign the face images stored by the merging processor to individual clusters, and successively merge clusters including each of the pairs of face images in accordance with the degrees of similarity of the pairs of face images calculated by the similarity degree calculation unit in a descending order of the degrees of similarity of the pairs of face images.

The cluster determination unit may determine whether over-merging occurred on the clusters starting from a cluster at an uppermost layer in accordance with cluster information items arranged in a tree-shaped structure obtained by the layering/clustering unit, and determine clusters by dividing each of clusters which have been determined to be over-merged clusters into two clusters which were obtained before merging processing is performed by the layering/clustering unit.

The cluster determination unit may include an average-face-feature-value calculation unit configured to calculate an average face feature value, which is obtained by averaging the face feature values of the face images included in a cluster subjected to the over-merging determination processing, and an individual-similarity-degree calculation unit configured to calculate an individual-similarity-degree in accordance with the average face feature value calculated by the average-face-feature-value calculation unit and a face feature value of one of the face images included in the cluster subjected to the over-merging determination processing. When the individual-similarity-degree for at least one of the face images included in the cluster subjected to the over-merging determination processing is smaller than a threshold value for a comparison with a individual-similarity-degree, it is determined that the cluster subjected to the over-merging determination processing is an over-merged cluster. A user setting unit may allow a user to set the threshold value for a comparison with an individual-similarity-degree.

The cluster determination unit may further include an average-similarity-degree calculation unit configured to calculate an average similarity degree by averaging individual-similarity-degrees for the face images included in the cluster subjected to the over-merging determination processing, the individual-similarity-degrees being obtained by the individual-similarity-degree calculation unit. When the average similarity degree calculated by the average-similarity-degree calculation unit is smaller than a threshold value for a comparison with an average similarity degree, it is determined that the cluster subjected to the over-merging determination processing is an over-merged cluster. A user setting unit may allow a user to set the threshold value for a comparison with an average similarity degree.

The image processing apparatus may further includes a representative-image determination unit configured to determine, for each of clusters including a plurality of face images, a representative face image from among the plurality of face images included in each of the clusters. The representative-image determination unit determines, for each of the clusters including the plurality of face images, the representative face image from among the plurality of face images included in each of the clusters in accordance with at least face-rotation-angle information items, facial-expression information items, or contrast information items regarding the plurality of face images.

For each of the clusters including the plurality of face images, the representative-image determination unit may reduce the number of the face images in accordance with the face-rotation-angle information items so as to obtain a first face-image group including face images having face-rotation angles smaller than a first threshold value. Then, the representative-image determination unit may reduce the number of the face images included in the first face-image group in accordance with the facial expression information items so as to obtain a second face-image group including face images having scores representing degrees of a specific facial expression larger than a second threshold value. The representative-image determination unit may determine, from among the face images included in the second face-image group, a face image having the highest score representing a degree of contrast to be the representative face image in accordance with the contrast information items. A user setting unit may allow a user to set the first and second threshold values.

As described above, since the clustering processing in which, among the face images stored by the merging processor, face images of an identical person are assigned to a single cluster, and a representative face image is determined for the cluster including the face images. Therefore, in a browser application which displays the face images of the characters in the moving-image stream, overlap of face images of an identical person is prevented, and furthermore, optimum face images are displayed.

Accordingly, face images (images of a certain object) included in still-image frames successively extracted from a moving-image stream are detected, and it is determined whether a face image detected in a current frame and a face image which is detected in a previous frame and which has been stored represent an identical person in accordance with face feature values of the face images. When the determination is affirmative, one of the face images is stored. Accordingly, extraction of the characters is effectively performed with a short analysis time.

Accordingly, the similarity degree calculation, the layering/clustering processing, and the cluster determination are successively performed in this order, and clustering in which, among a plurality of face images (images of a specific object), face images representing an identical person are assigned to a single cluster is effectively performed.

BRIEF DESCRIPTION OF THE DRAWINGS

FIG. 4 is a diagram illustrating a configuration of data (face data) corresponding to each face image;

FIG. 5 is a diagram illustrating a configuration of cluster data serving as character data;

FIG. 11 is a diagram illustrating a face dictionary used when face-image detection is performed and measurement of a face score SCORE_fa using the face dictionary;

FIGS. 23A and 23B are diagrams illustrating art example of a face image which is not an image of a side face and in which a yaw angle thereof is −5 degrees, and an example of a face image which is an image of a side face (noise face) and in which the yaw angle thereof is +50 degrees;

FIGS. 24A and 24B are diagrams illustrating an example of a face image which is not a blurred face image and in which a contrast score thereof is 350, and an example of a face image which is a blurred face image (noise face image) and in which a contrast score thereof is 120;

FIG. 25 is a flowchart illustrating a procedure of identical-face merging processing performed by an identical-face-combining processor;

FIG. 30 is a diagram illustrating calculations of degrees of similarities performed for individual pairs of two face images by the face clustering unit using a similarity matrix;

FIG. 31 is a table illustrating an example of a face-pair list generated by sorting the face pairs in an order of a degree of similarity in accordance with results of the calculations using the similarity matrix;

FIG. 33 is a diagram illustrating a configuration of data (node data) of each node included in a layered structure;

FIG. 34 is a diagram illustrating an example of the layered structure of nodes generated through layered clustering processing;

FIG. 35 is a diagram illustrating a concrete example of the node data;

FIG. 44 is a diagram illustrating an example of a general result obtained when the face clustering processing is performed on a plurality of face images of persons "Mr. A" to "Mr. K";

FIG. 45 is a confusion table representing the relationships between predicting results and actual results;

FIG. 46 is a confusion table when ideal face clustering processing is performed;

FIG. 50 is a diagram illustrating an example of an inner configuration of a computer which executes processing operations of functional units of the image processing apparatus.

DESCRIPTION OF THE PREFERRED EMBODIMENTS

Figure 1:
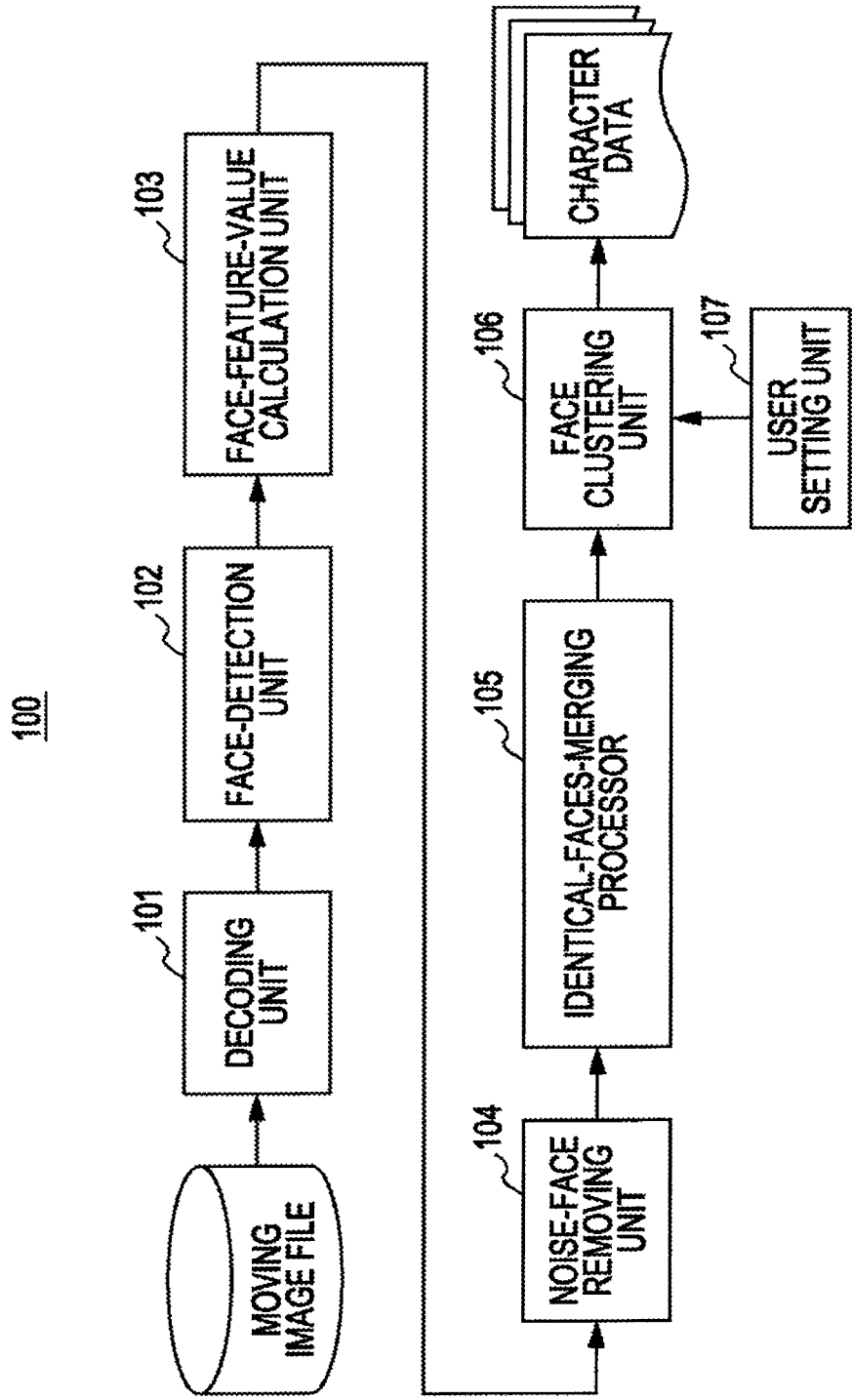
FIG. 1 is a block diagram illustrating a configuration example of an image processing apparatus according to an embodiment of the present invention.

Embodiments of the present invention will be described hereinafter with reference to the accompanying drawings.
Description of Entire Apparatus FIG. 1 is a block diagram illustrating a configuration example of an image processing apparatus 100 according to an embodiment of the present invention. The image processing apparatus 100 includes a decoding unit 101, a face detection unit 102, a face-feature-value calculation unit 103, a noise-face removing unit 104, an identical-faces-merging processor 105, and a face clustering unit 106.

The decoding unit 101 reads a moving-image file recorded in a hard disk (HDD) or a memory card, for example, and extracts still-image frames approximately every one second from a moving-image stream included in the moving-image file. In a case where the moving-image stream corresponds to video streams of MPEG (Moving Picture Expert Group) or AVCHD (Advanced Video Coded High Definition), the decoding unit 101 performs data decompression processing on image information items of intraframes which appear in a predetermined cycle so as to output image information items of desired still-image frames.

The face detection unit 102 detects face images included in the still-image frames in accordance with the image information items of the still-image frames (still images) successively extracted by the decoding unit 101. The face detection unit 102 detects the face images by scanning each of the still-image frames while face detection frames are slid with a plurality of resolutions, for example. However, a method for detecting the face images by the face detection unit 102 is not limited to this. The face detection unit 102 will be described in detail hereinafter.

Every time the face detection unit 102 detects the face images, the face detection unit 102 assigns unique identifiers used to specify the face images to the detected face images as face IDs. Each of the face IDs is generated using a frame number of a corresponding one of the frames included in the moving-image stream and a number representing an order of detection in the corresponding one of the frames.

Figure 2:
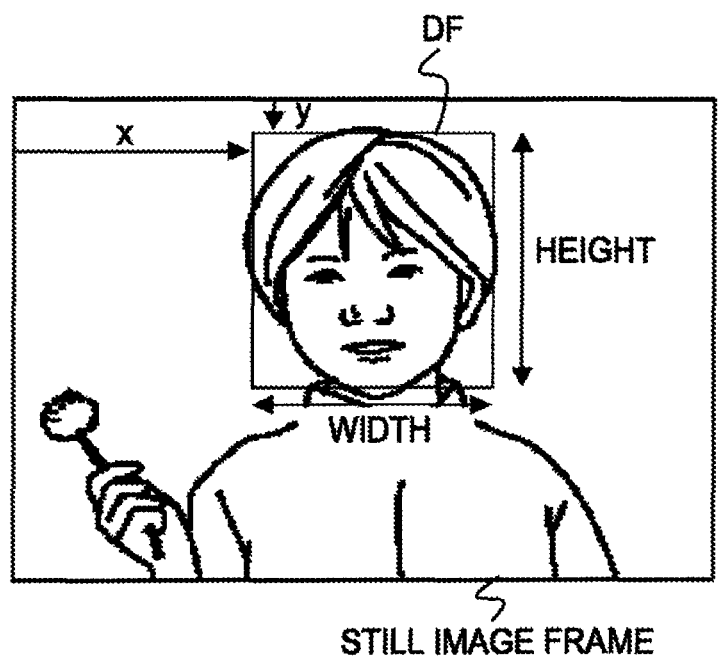
FIG. 2 is a plan view illustrating location information and size information of a face detection frame which are included in face-detection-frame information.

The face detection unit 102 adds the face IDs to the detected individual face images, and supplies face-image information items (image information items in the face detection frames) and face-detection-frame information items to the face-feature-value calculation unit 103. Here, each of the face-detection-frame information items includes location information and size information. The location information represents, for example, as shown in FIG. 2, a location (x, y) of a pixel at an upper left corner of a detection frame DF in a still-image frame. The size information represents, for example, as shown in FIG. 2, a horizontal size "width" and a vertical size "height" of the detection frame DF in the still-image frame. The sizes are represented by the number of pixels.

Note that, in this embodiment, when detecting the face images from the still-image frames (still images), the face detection unit 102 detects face-rotation angles representing angles of faces of the face images. Therefore, the face detection unit 102 functions as a face-rotation-angle detection unit. The face detection unit 102 detects the face images, for example, using a face dictionary which learns in accordance with a machine learning algorithm such as AdaBoost. Since the face detection unit 102 includes the face dictionary for the plurality of face-rotation angles, the face detection unit 102 detects face-rotation angles along with the face images. However, the detection method is not limited to this. Alternatively, a method for detecting parts of a face in each of the face images, such as eyes, a nose, and a mouth so that the face-rotation angles are detected in accordance with the distances relationship among the parts or the location relationship among the parts may be employed.

Figure 3A:
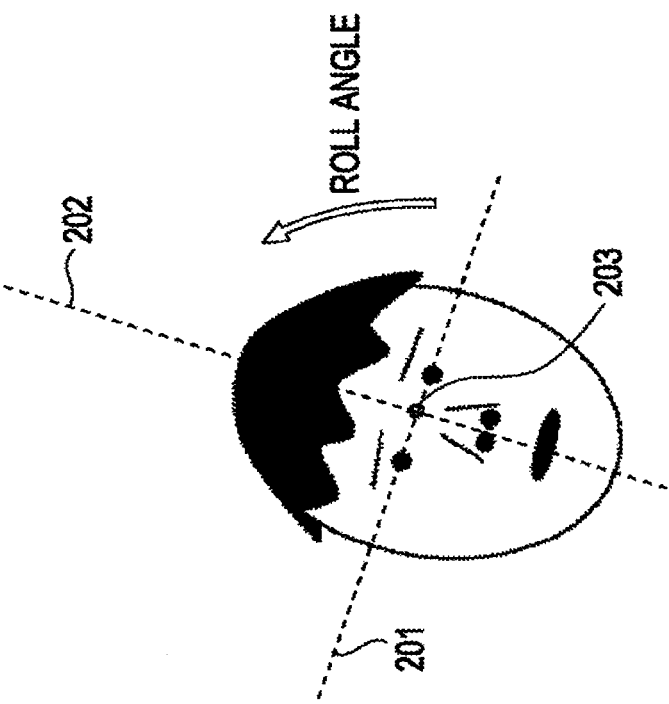
FIGS. 3A and 3B are diagrams illustrating a yaw angle, a roll angle, a pitch angle, which serve as face-rotation angles.
Figure 3B:
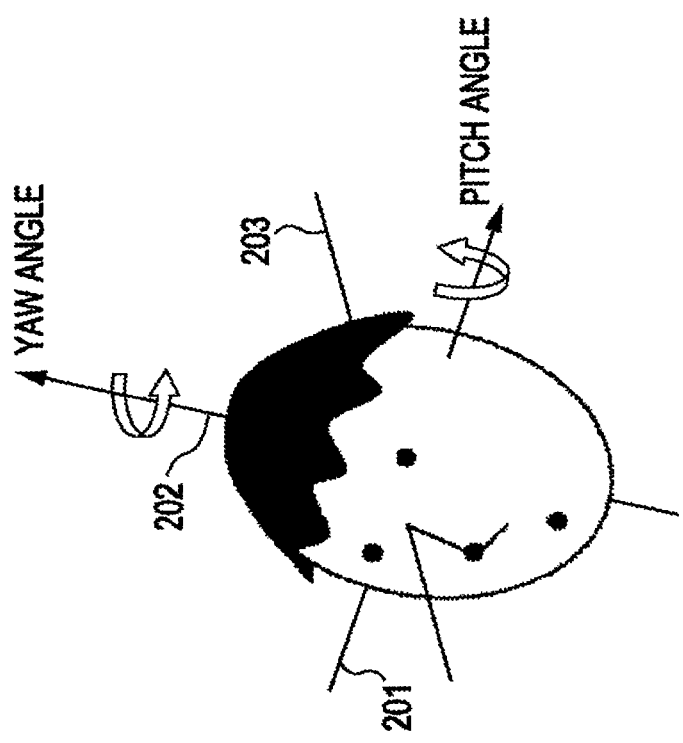

Directions of the face-rotating angles include three angles, i.e., a yaw angle, a roll angle, and a pitch angle. As shown in FIG. 3A, the yaw angle is defined with an axis 202 as the center. The axis 202 is perpendicular to an axis 201 which is parallel to a line connecting right and left eyes of a person and which extends substantially through the center of the head of the person. A right-hand direction of the yaw angle denotes a negative direction, and a left-hand direction of the yaw angle denotes a positive direction. Furthermore, as shown in FIG. 3B, the roll angle is generated by rotation with an axis 203 as the center. The axis 203 is perpendicular to the axis 201 and the axis 202, and an angle which makes the axis 201 horizontal is determined to be 0 degree. Moreover, as shown in FIG. 3A, the pitch angle is defined with the axis 201 as the center, and is made on an upper side or a lower side of the axis 201. A direction in which the face which turns up corresponds to a positive direction whereas a direction in which the face which turns down corresponds to a negative direction.

The face detection unit 102 adds the face IDs to the detected face IDs and supplies face-rotation-angle information items (yaw, roll, and pitch) to the face-feature-value calculation unit 103 along with the face-image information items and the face-detection-frame information items (x, y, width, and height).

The face-feature-value calculation unit 103 calculates face feature values of the face images in accordance with the image information items of the face images detected by the face detection unit 102, that is, the information items of the face detection frames of the face images. The face-feature-value calculation unit 103 detects face-feature positions, such as positions of both ends of an eyebrow, both ends of an eye, the center of the eyebrow, and the center of the eye, and calculates local-feature-value vectors (identification feature vectors) in the face-feature positions using a convolution operation such as Gabor filter. However, a method for calculating the local-feature-value vectors is not limited to this. The face-feature-value calculation unit 103 will be described in detail hereinafter.

Note that, in this embodiment, the face-feature-value calculation unit 103 calculates, in addition to the face-feature values of the face images, scores representing degrees of a certain facial expression, such as smile scores representing degrees of smile, and contrast scores representing degrees of contrast. Therefore, the face-feature-value calculation unit 103 corresponds to in a smile-score calculation unit and a contrast-score calculation unit.

The face-feature-value calculation unit 103 calculates the smile scores using a smile dictionary which leans in accordance with a machine learning algorithm such as AdaBoost. However, a method for calculating the smile scores is not limited to this. Furthermore, the face-feature-value calculation unit 103 calculates the contrast scores by adding square values of differences between luminance values of adjacent pixels, which are obtained for individual pixels, to one another. However, a method for calculating the contrast scores is not limited to this. The method for calculating the smile scores and the method for calculating the contrast scores will be described in detail hereinafter.

The face-feature-value calculation unit 103 supplies the face feature values, the smile scores, and the contrast scores to the noise-face removing unit 104 along with the face-detection-frame information items and the face-rotation-angle information items which were supplied from the face detection unit 102.

The noise-face removing unit 104 removes face images including images of side faces or blurred face images which may adversely affect to processing of the identical-faces-merging processor 105 and processing of the face clustering unit 106 in a succeeding stage. In particular, when amateurs capture moving images, blurring of images often occur, a person who is an object of an image often moves, or an image of a side face of a person is often captured.

Here, it is highly possible that the face-feature-value calculation unit 103 does not obtain accurate face feature values of the blurred face images. Therefore, it is highly possible that this adversely affects to accuracies of the processing of the identical-faces-merging processor 105 and the processing of the face clustering unit 106. Accordingly, the noise-face removing unit 104 performs threshold-value processing on the contrast scores obtained as described above by the face-feature-value calculation unit 103 so as not to supply the blurred face images to the processing operations in the succeeding stage.

Similarly, it is highly possible that the face-feature-value calculation unit 103 does not obtain accurate face feature values of the side-face images. Therefore, it is highly possible that this adversely affects to accuracies of the processing of the identical-faces-merging processor 105 and the processing of the face clustering unit 106. Accordingly, the noise-face removing unit 104 performs threshold-value processing on the face-rotation angles obtained as described above by the face detection unit 102 so as not to supply the side-face images to the processing operations in the succeeding stage.

The noise-face removing unit 104 removes face images having contrast scores smaller than a threshold value (150, for example). Furthermore, the noise-face removing unit 104 removes face images having face-rotation angles in a predetermined direction relative to the front, that is, in a direction of the yaw angle or a direction of the pitch angle which are larger than a threshold value (45 degrees, for example). The noise-face removing unit 104 will be described in detail.

The noise-face removing unit 104 supplies, among data items (hereinafter referred to as "face data items") corresponding to the face images supplied from the face-feature-value calculation unit 103, face data items other than face data items corresponding to removed face images to the identical-faces-merging processor 105.

Here, configurations of the face data items will be described. FIG. 4 is a diagram illustrating a configuration of each of the face data items. The face data item includes a face ID, face-detection-frame information, face-rotation angle information, a smile score, a contrast score, and a face feature value. As described above, the face ID is assigned by the face detection unit 102, and the face-detection-frame information and the face-rotation-angle information are obtained by the face detection unit 102. Furthermore, as described above, the face feature value, the smile score, and the contrast score are obtained by the face-feature-value calculation unit 103.

The identical-faces-merging processor 105 performs processing of merging identical face images every time the face data items included in a current frame is supplied from the noise-face removing unit 104. Therefore, the identical-faces-merging processor 105 corresponds to an identity-determination unit and a merging processor.

Since the identical-faces-merging processor 105 performs the merging processing on identical face images, the number of face images ultimately stored by the time the end of the moving-image stream is reached is reduced. Accordingly, a period of time in which processing of classifying characters is performed by the face clustering unit 106 in the succeeding stage is reduced. In a long moving-image stream in which a single person is continued to be shot, for example, if the identical-faces-combining processing is not performed, it is possible that the processing of the face clustering unit 106 in the succeeding stage fails since face images of the person are detected in hundreds of or thousands of frames.

Furthermore, since the identical-faces-merging processor 105 performs the merging processing on the face images representing the identical person, the number of face images ultimately stored by the time the end of the moving-image stream is reached is reduced. Accordingly, accuracy of processing of classifying the characters performed by the face clustering unit 106 in the succeeding stage is improved. In general, when face images of an identical person are collectively stored, the smaller the number of face images to be supplied to the face clustering unit 106 is, the higher accuracy of the processing of classifying characters is. As the number of face images of an identical person to be supplied to the face clustering unit 106 increases, over-dividing in which face images representing an identical person are classified into different clusters is likely to occur.

The identical-faces-merging processor 105 determines whether a person in a first face image (current face image) which is detected in a current frame and a person in a second face image (previous face image) which was detected in a previous frame and which has been stored are an identical person. In this case, for this determination, the identical-faces-merging processor 105 sets individual threshold values for a degree of similarity calculated in accordance with face feature values of the two face images, positions of face-detection frames in the two face images, sizes of the face-detection frames, and an interval (frame interval) between frames of the two face images.

If the frame interval is small, the positions of the face-detection frames are similar to each other, and the sizes of the face-detection frames are similar to each other, for example, it is highly possible that the persons in the two face images correspond to an identical person. Therefore, the identical-faces-merging processor 105 determines that the persons in the two face images are an identical person even if the degree of similarity of the two face images is low due to a lighting condition, for example. Conversely, if the frame interval is large and the degree of similarity of the two face images is low, the identical-faces-merging processor 105 determines that the persons in the two face images are different from each other. When the identical-faces-merging processor 105 determines that the persons in the two face images correspond to an identical person, only one of the two face images is stored whereas when the identical-faces-merging processor 105 determines that the persons in the two face images are not a identical person, both the two face images are stored. The identical-faces-merging processor 105 will be described in detail hereinafter.

When the end of the moving-image stream is reached, the identical-faces-merging processor 105 supplies face data items (refer to FIG. 4) corresponding to face images which have been ultimately stored to the face clustering unit 106.

When the end of the moving-image stream is reached, the face clustering unit 106 performs clustering processing on the face images ultimately stored in the identical-faces-merging processor 105 so that face images representing an identical person are assigned to a single cluster. In this way, characters in the moving-image stream are classified. The face clustering unit 106 performs the clustering processing at least in accordance with the face feature values of the face images.

In a browsing application which displays a list of the characters in the moving-image stream, face images representing an identical person should be represented by a single face image for simplicity. Therefore, the face clustering unit 106 determines a representative face image from among the plurality of face images included in a cluster obtained as a result of the clustering processing. The face clustering unit 106 determines the representative face image from among the plurality of face images in accordance with, for example, at least one of the face-rotation-angle information items, facial expression information items, and the contrast information items. The face clustering unit 106 will be described in detail hereinafter.

The face clustering unit 106 outputs data items of clusters serving as character data items representing the characters in the moving-image stream. FIG. 5 is a diagram illustrating a configuration of each of the cluster data items serving as the character data items. The cluster data item includes a cluster ID, a face ID list, and a representative face ID. The cluster ID is an identifier used to identify a cluster corresponding to the cluster data item. The face ID list includes face IDs assigned to the face images included in the cluster corresponding to the cluster data item. The representative face ID is used to identify the representative face image determined as described above when the plurality of face images are included in the cluster.

Operation of the image processing apparatus 100 shown in FIG. 1 will now be described.

The decoding unit 101 reads a moving-image file recorded in a hard disk (HDD) or a memory card, for example, and extracts still-image frames approximately ever one second from a moving-image stream in the moving-image file. In a case where the moving-image stream corresponds to a video stream of MPEG (Moving Picture Expert Group) as shown in (A) of FIG. 6 and (A) of FIG. 7, for example, the decoding unit 101 performs data decompression processing so as to decode image information items of intraframes (I frames) which appear in a predetermined cycle so as to successively output image information items of still-image frames as shown in (A) of FIG. 6 and (B) of FIG. 7.

The image information items of the still-image frames (still images) successively extracted from the moving-image stream by the decoding unit 101 are supplied to the face detection unit 102. As shown in (C) of FIG. 6, the face detection unit 102 detects face images included in the still-image frames. Every time the face detection unit 102 detects the face images, the face detection unit 102 assigns unique IDs (identifiers) used to specify the face images to the detected face images as face IDs. Furthermore, the face detection unit 102 detects face-rotation angles representing angles of faces in the detected face images. The face detection unit 102 adds the face IDs to the detected individual face images, and supplies face-image information items, face-detection-frame information items (x, y, width, and height), and face-rotation angle information items (yaw, roll, and pitch) to the face-feature-value calculation unit 103.

Figure 6:
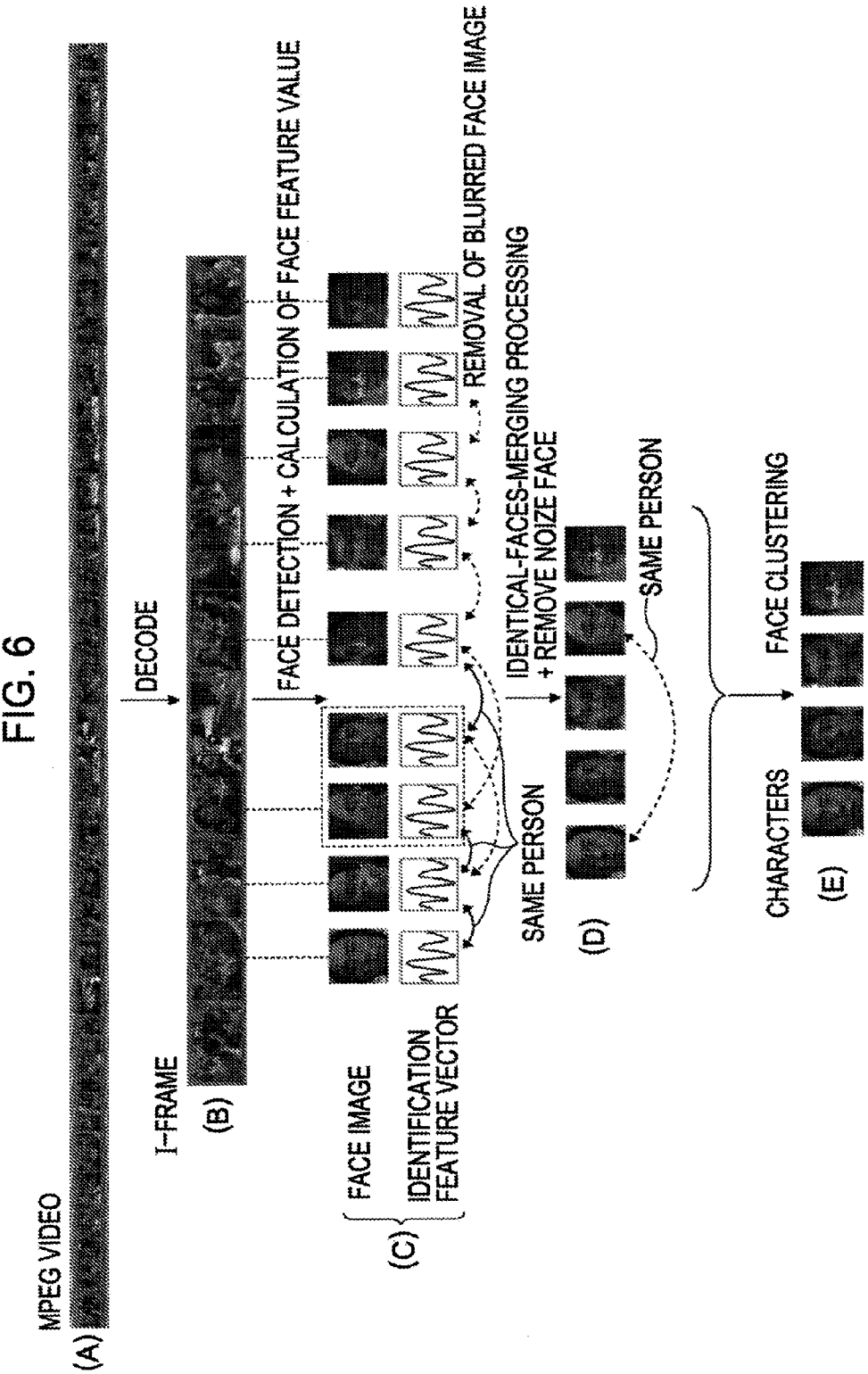
FIG. 6 is a diagram schematically illustrating a processing procedure of an image processing apparatus.
Figure 7:
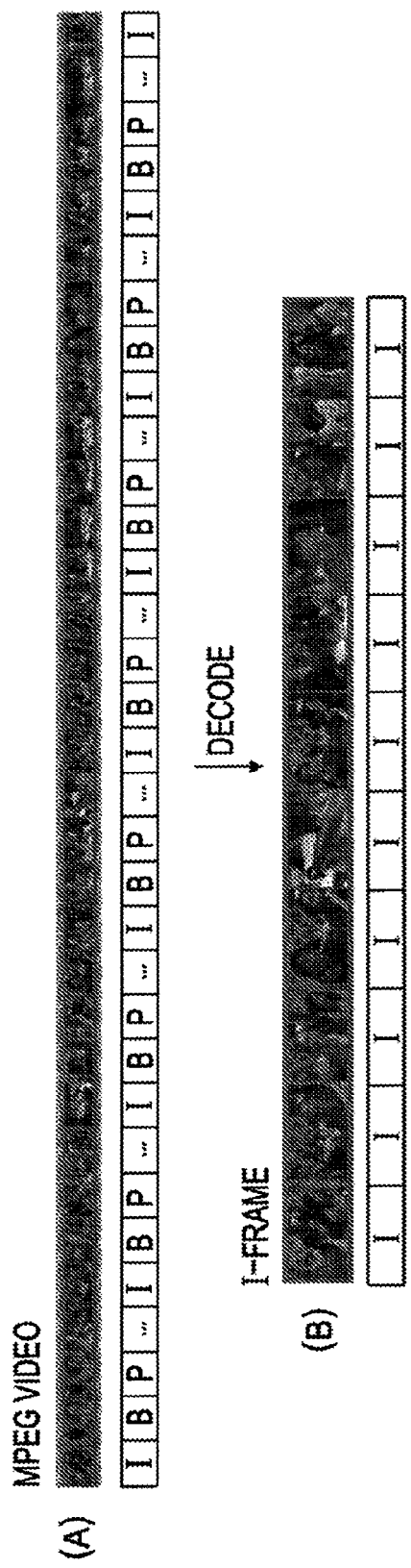
FIG. 7 is a diagram illustrating data decompression processing and decoding performed on image information in an intra frame (I frame) which appears in a predetermined cycle when a moving-image stream corresponds to a MPEG video stream.

The face-feature-value calculation unit 103 calculates local feature value vectors (identification feature vectors) serving as face feature values of the face images as shown in (C) of FIG. 6 in accordance with the image information items of the face images detected by the face detection unit 102. Furthermore, the face-feature-value calculation unit 103 calculates smile scores representing degrees of smile and contrast scores representing degrees of contrast on the basis of the image information items of the face images detected by the face detection unit 102. The face-feature-value calculation unit 103 supplies the face feature values, the smile scores, and the contrast scores to the noise-face removing unit 104 along with the face-detection frame information items and the face-rotation-angle information items which were supplied from the face detection unit 102.

The noise-face removing unit 104 removes face images including images of side faces or blurred face images which may adversely affect to processing of the identical-faces-merging processor 105 and processing of the face clustering unit 106 in a succeeding stage. Accordingly, the noise-face removing unit 104 performs the threshold-value processing as described above on the contrast scores obtained by the face-feature-value calculation unit 103 so as to remove the blurred face images. Furthermore, the noise-face removing unit 104 performs the threshold-value processing as described above on the face-rotation angles obtained by the face detection unit 102 so as to remove the side face images. That is, the noise-face removing unit 104 removes noise face images (blurred face images and side-face images). The noise-face removing unit 104 supplies, among face data items corresponding to the face images obtained by the face detection unit 102, face data items (including the face IDs, the face-detection-frame information items, the face-rotation-angle information items, the smile score, the contrast score, and the face feature values) other than face data items corresponding to noise face images to the identical-faces-merging processor 105.

The identical-faces-merging processor 105 performs processing of merging identical face images every time the face data items included in a current frame is supplied from the noise-face removing unit 104. In this case, the identical-faces-merging processor 105 sets individual threshold values to a degree of similarity calculated in accordance with face feature values of the two face images, positions of face-detection frames in the two face images, sizes of the face-detection frames, and an interval (frame interval) between frames of the two face images for a determination as to whether persons in two face images represent an identical person. When the identical-faces-merging processor 105 determines that the persons in the two face images represent an identical person, only one of the two face images is stored whereas when the identical-faces-merging processor 105 determines that the persons in the two face images are not an identical person, both the two face images are stored.

By the processing of the noise-face removing unit 104 and the processing of the identical-faces-merging processor 105 on the face images detected from the still-image frames by the face detection unit 102, when the end of the moving-image stream is reached, the identical-faces-merging processor 105 stores face images except for the noise face images, and face images of an identical person age merged as shown in (D) of FIG. 6.

When the end of the moving-image stream is reached, the identical-faces-merging processor 105 supplies face data items corresponding to the face images which have been ultimately stored in the identical-faces-merging processor 105 to the face clustering unit 106. The face clustering unit 106 performs clustering processing (classifying processing) so that face images of an identical person are assigned to a single cluster. The face clustering unit 106 determines a representative face image from among the plurality of face images included in the cluster obtained as a result of the clustering processing.

Since the face clustering unit 106 performs the clustering processing and the representative-image determination processing as described above, the face clustering unit 106 outputs character data items (data items of clusters) representing the characters in the moving-image stream with less overlaps of character data items representing an identical person.

Figure 8:
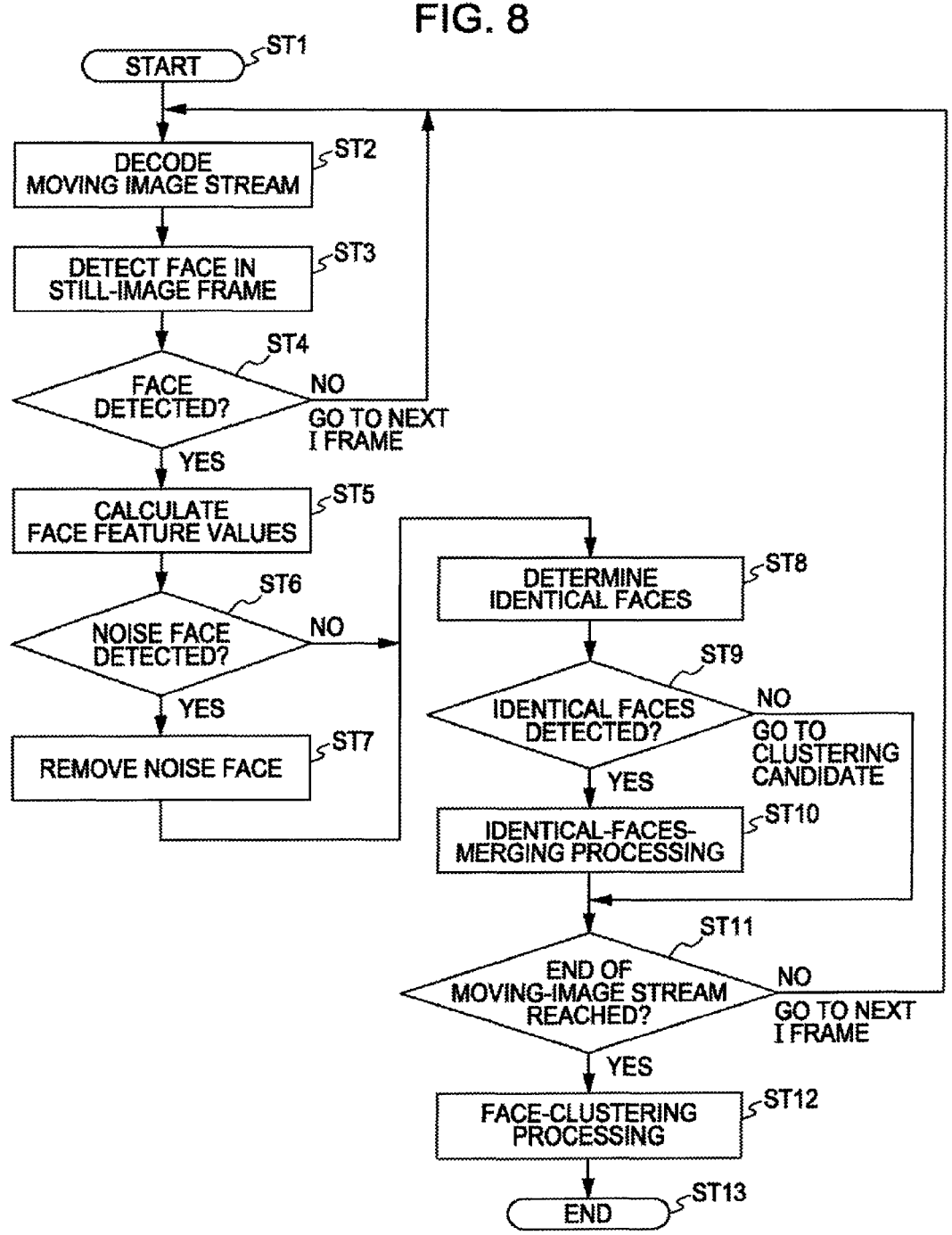
FIG. 8 is a flowchart illustrating a processing procedure of the image processing apparatus.

FIG. 8 is a flowchart illustrating a processing procedure of the image processing apparatus 100 of FIG. 1.

In step ST1, the image processing apparatus 100 starts processing, and proceeds to step ST2. In step ST2, the decoding unit 101 of the image processing apparatus 100 decodes an intraframe (I frame) of a moving image stream included in a moving-image file so as to extract image information of a still-image frame (still image).

In step ST3, the face detection unit 102 of the image processing apparatus 100 attempts to detect face images in the still-image frame, and the process proceeds to step ST4. Note that, in step ST3, the image processing apparatus 100 also detects face-rotation angles of the face images along with the face images.

In step ST4, the image processing apparatus 190 determines whether any face image is detected. When the determination is negative in step ST4, the image processing apparatus 100 returns to step ST2, and the decoding unit 101 performs decoding processing on the next intraframe (I frame). On the other hand, when the determination is affirmative in step ST4, the image processing apparatus 100 proceeds to step ST5.

In step ST5, the face-feature-value calculation unit 103 of the image processing apparatus 100 calculates local-feature-value vectors as face feature values of the face images detected in step ST3. Note that, in step ST5, the face-feature-value calculation unit 103 of the image processing apparatus 100 also calculates smile scores and contrast scores of the face images detected in step ST3.

In step ST6, the image processing apparatus 100 determines whether a noise face image (a side-face image or a blurred face image) is included in the face images detected in step ST3 in accordance with the face-rotation angles detected in step ST3 and the contrast scores calculated in step ST5. When the determination is affirmative in step ST6, the image processing apparatus 100 removes, in step ST7, the noise face image from among the face images detected in step ST3, and proceeds to step ST8. On the other hand, when the determination is negative in step ST6, the image processing apparatus 100 directly proceeds to step ST8.

In step ST8, the identical-faces-merging processor 105 of the image processing apparatus 100 determines whether each of the face images detected in the current frame is identical to any one of face images which have been detected in a previous frame and which have been stored in the identical-faces-merging processor 105 on the basis of degrees of similarity calculated in accordance with face feature values of the two face images, positions of detection frames in the two face images, sizes, and an interval between frames of two face images to be compared with each other.

In step ST9, the image processing apparatus 100 successively sets each of the face images detected in the current frame as an object of the determination, and determines whether a person in each of the face images detected in the current frame is identical to any person in the face images detected in the previous frame in accordance with results of the determinations in step ST8. When the determination is affirmative in step ST9, the identical-faces-merging processor 105 of the image processing apparatus 100 performs processing of merging face images representing an identical person, that is, processing of storing only one of the face images representing an identical person in step ST10. Thereafter, the image processing apparatus 100 proceeds to step ST11. On the other hand, when the determination is negative in step ST10, the face image which is an object of the determination is stored. Thereafter, the image processing apparatus 100 proceeds to step ST11.

In step ST11, the image processing apparatus 100 determines whether the end of the moving-image stream is reached. When the determination is negative in step ST11, the image processing apparatus 100 returns to step ST2, and the decoding unit 101 performs the decoding processing on the next intraframe (I frame). On the other hand, when the determination is affirmative in step ST11, the image processing apparatus 100 proceeds to step ST12.

In step ST12, the face clustering unit 106 of the image processing apparatus 100 performs face clustering processing. That is, the image processing apparatus 100 performs the clustering processing (classifying processing) so that the face images representing an identical person are assigned to a single cluster. In addition, for a cluster including a plurality of face images, the image processing apparatus 100 performs processing of determining a representative face image from among the plurality of face images included in the cluster so as to generate character data. After step ST12, the processing of the image processing apparatus 100 is terminated in step ST13.

The face detection unit 102, the face-feature-value calculation unit 103, the noise-face removing unit 104, the identical-faces-merging processor 105, and the face clustering unit 106 which are included in the image processing apparatus 100 shown in FIG. 1 will be described in detail hereinafter.

Face Detection Unit

The face detection unit 102 detects face images included in still-image frames in accordance with image information items (image information items obtained after grayscale conversion is performed) of the still-image frames (still images) which have been successively extracted by the decoding unit 101 and which have been temporarily stored in a storage device (not shown). Furthermore, the face detection unit 102 detects face-rotation angles representing angles of faces corresponding to the face images when detecting the face images from the still-image frames (still images).

Figure 9:
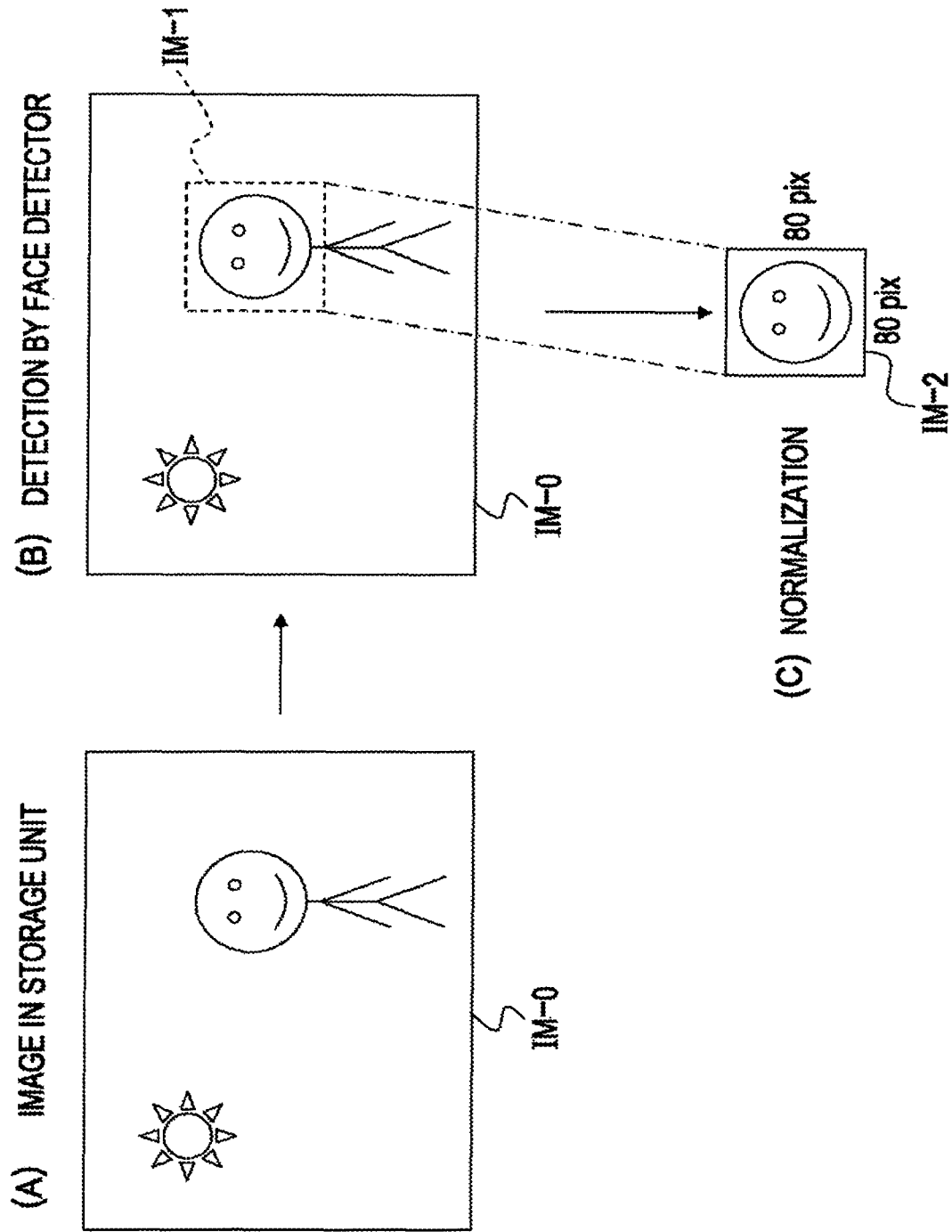
FIG. 9 is a diagram illustrating face-image detection processing performed by a face detection unit.

For example, when a still-image frame IM-0 shown in (A) of FIG. 9 is detected, the face detection unit 102 detects a face image IM-1, which is denoted by a frame of a dashed line in (B) of FIG. 9, included in the still-image frame IM-0. After the face image IM-1 is detected, the face detection unit 102 normalizes the face image IM-1 so that a face image IM-2 having a predetermined size, that is, a horizontal size of 80 pixels and a vertical size of 80 pixels in this embodiment, is obtained as shown in (C) of FIG. 9 to be processed by the face-feature-value calculation unit 103.

The face detection unit 102 adds face IDs to the detected face images, and instructs the storage device to store face image information items (information items regarding the face images in a face detection frame which have been normalized), face-detection-frame information items (location information items and size information items), and face-rotation-angle information items. Then, the face detection unit 102 supplies the stored information items to the face-feature-value calculation unit 103 in a succeeding stage at an appropriate timing.

Figure 10:
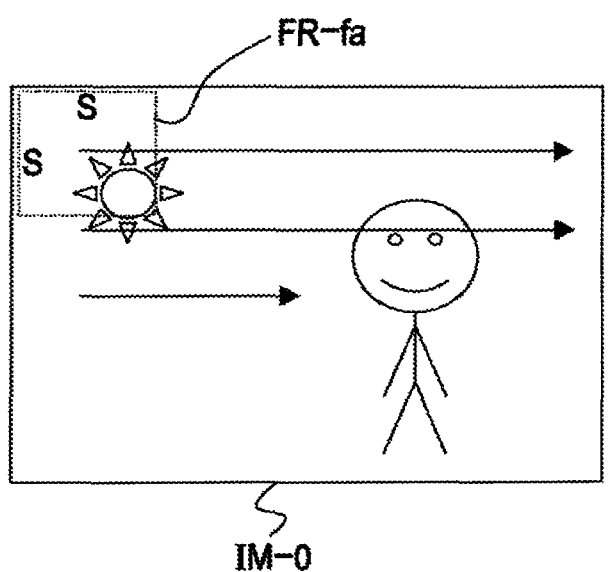
FIG. 10 is a diagram illustrating a detection frame FR-fa set in a still-image frame (still-image) for detecting a face image.

An example of the processing of detecting the face images performed by the face detection unit 102 will be described. In this detection processing, as shown in FIG. 10, a detection frame FR-fa having a predetermined size, that is, a horizontal size of S pixels and a vertical size of S pixels is set in the still-image frame IM-0. In this example, the S pixels correspond to 80 pixels or more. As shown by arrows in FIG. 10, the detection frame FR-fa moves over the still-image frame IM-0 so that a position of the detection frame FR-fa is successively changed. Then, measurement of a face score SCORE_fa is performed on an image defined by the detection frame FR-fa using a face dictionary. In accordance with the face score SCORE_fa, it is determined whether the image defined by the detection frame FR-fa is a face image.

Figure 12:
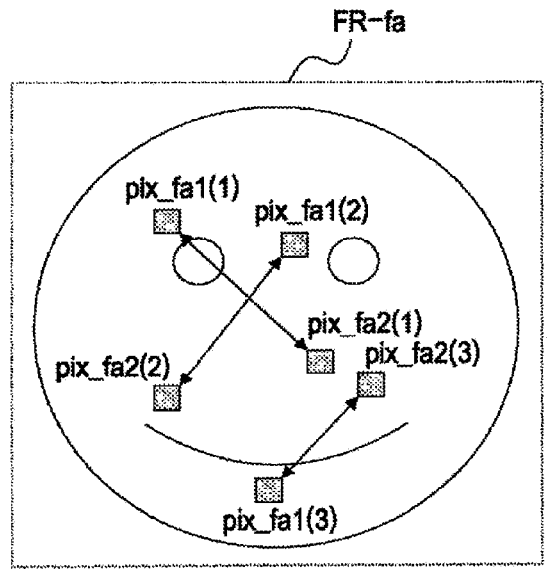
FIG. 12 is a diagram illustrating the relationship between position information and the detection frame FR-fa for each pair.

The face dictionary includes t4 combinations (several hundreds combinations) of $pix\_fa1(i)$, $pix\_fa2(i)$, $\theta\_fa(i)$, and $\alpha\_fa(i)$ as shown in (B) of FIG. 11. Here, $pix\_fa1(i)$ and $pix\_fa2(i)$ denote, as shown in FIG. 12, positions of two points in the image defined by the detection frame FR-fa. Note that, in FIG. 12, only three pairs of $pix\_fa1(i)$ and $pix\_fa2(i)$ are shown for simplicity. Furthermore, $\theta\_fa(i)$ denotes a threshold value of a difference between a luminance value of $pix\_fa1(i)$ and a luminance value of $pix\_fa2(i)$. Moreover, $\alpha\_fa(i)$ denotes weight to be added or reduced in accordance with a result of comparison between the difference between the luminance value of $pix\_fa1(i)$ and the luminance value of $pix\_fa2(i)$ and the threshold value $\theta\_fa(i)$. Detailed descriptions of the values of $pix\_fa1(i)$, $pix\_fa2(i)$, $\theta\_fa(i)$, and $\alpha\_fa(i)$ are omitted, and these values are obtained by being learned by the machine learning algorithm such as AdaBoost.

As shown in (A) of FIG. 11, the measurement of the face score SCORE_fa is performed as follows. It is determined whether each of the combinations of $pix\_fa1(i)$, $pix\_fa2(i)$, $\theta\_fa(i)$, and $\alpha\_fa(i)$ satisfies Expression (1). When the determination is affirmative, Expression (2) is performed. On the other hand, when the determination is negative, Expression (3) is performed. Note that, in Expression (1), $pix\_fa1(i)$ denotes a luminance value of its position, and $pix\_fa2(i)$ denotes a luminance value of its position.

$$pix\_fa1(i) - pix\_fa2(i) < \theta\_fa(i) \quad (1)$$

$$SCORE\_fa = SCORE\_fa + \alpha\_fa(i) \quad (2)$$

$$SCORE\_fa = SCORE\_fa - \alpha\_fa(i) \quad (3)$$

The determination as to whether the image defined by the detection frame FR-fa is a face image is made in accordance with the face score SCORE_fa measured as described above. Note that, in the measurement of the face score SCORE_fa described above, it is assumed that h(i) is 1 when Expression (1) is satisfied and h(i) is −1 when Expression (1) is not satisfied, the measured face score SCORE_fa is expressed by Expression (4).

$$SCORE\_fa = \sum_i h(i) \alpha\_fa(i) \quad (4)$$

When the face score SCORE_fa is larger than 0, the image defined by the detection frame FR-fa is determined to be a face image. On the other hand, when the face score SCORE_fa is equal to or smaller than 0, the image defined by the detection frame FR-fa is determined not to be a face image. Note that not only 0 but also any value other than 0 which is slightly adjusted may be used as a criterion value for the determination.

Figure 13:
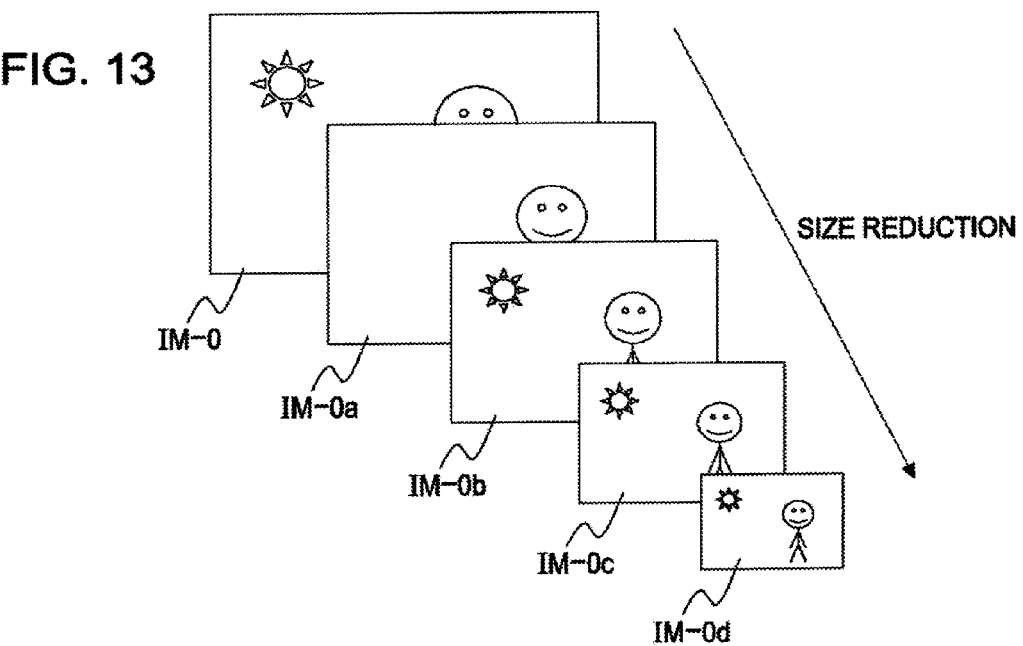
FIG. 13 is a diagram illustrating a still-image frame (still image) IM-0 and images IM-0a and IM-0b obtained by reducing the size of the still-image frame IM-0.

Note that face images of various sizes may be included in the still-image frame IM-0. Therefore, when face images are detected by setting the detection frame FR-fa having a predetermined size in the still-image frame IM-0 as shown in FIG. 10, only face images corresponding to the size of the detection frame FR-fa are detected. Therefore, in order to detect face images of various sizes included in the still-image frame IM-0, the face-image detection processing is performed on, in addition to the image in the still-image frame IM-0, reduced images IM-0a to IM-0d which are obtained by appropriately reducing the size of the still-image frame IM-0 as shown in FIG. 13.

Figure 14:
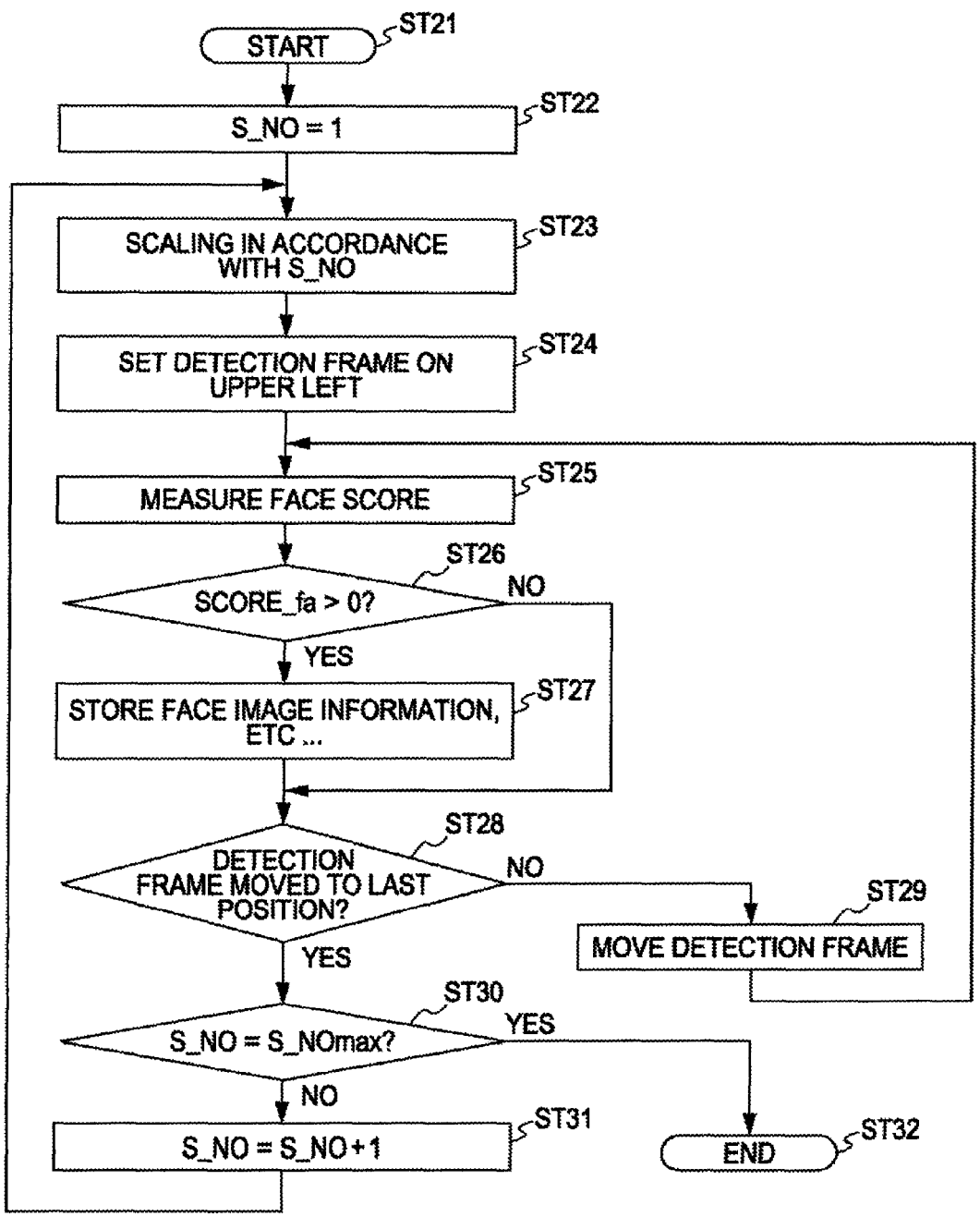
FIG. 14 is a flowchart illustrating a procedure of the face-image detection processing performed by the face detection unit.

FIG. 14 is a flowchart illustrating a procedure of the face-image detection processing performed by the face detection unit 102.

In step ST21, the face detection unit 102 starts the face-image detection processing, and proceeds to step ST22. In step ST22, the face detection unit 102 sets a reduction-step value S_NO of the still-image frame IM-0 to 1. In step ST23, the face detection unit 102 reads image information in the still-image frame IM-0 from the storage unit, performs scaling (size-reduction processing) corresponding to the reduction-step value S_NO, and generates a reduced image (still-image frame in which the size thereof is reduced) used to detect face images.

Note that when the reduction-step value S_NO is 1, a reduction rate is 1, that is, a reduced image used to detect face images has the same size as the still-image frame IM-0. Furthermore, the larger the reduction-step value S_NO is, the smaller the reduction rate is. A face image detected using a reduced image having a smaller reduction rate is a larger face image in the still-image frame IM-0. Note that face-detection-frame information (location information and size information) used here is that of the still-image frame IM-0.

In step ST24, the face detection unit 102 sets the detection frame FR-fa on an upper left of the reduced image generated in step ST23. In step ST25, the face detection unit 102 measures a face score SCORE_fa using the face dictionary as described above.

In step ST26, the face detection unit 102 determines whether the image defined by the detection frame FR-fa is a face image in accordance with the face score SCORE_fa measured in step ST25. In this case, when the face score SCORE_fa is larger than 0, the face detection unit 102 determines that the image defined by the detection frame FR-fa is a face image whereas when the face score SCORE_fa is not larger than 0, the face detection unit 102 determines that the image defined by the detection frame FR-fa is not a face image.

When the face detection unit 102 determined that the image defined by the detection frame FR-fa is a face image, the face detection unit 102 proceeds to step ST27. In step ST27, the face detection unit 102 adds a face ID to the detected face image and stores information (face-image information) on the image defined by the detection frame FR-fa in the storage unit along with the face-detection-frame information (location information and size information). Note that, as described above, the face detection unit 102 stores information representing the face image of S pixels×S pixels in the storage unit after normalizing the face image so as to have a size of 80 pixels×80 pixels which is to be processed by the face-feature-value calculation unit 103.

After step ST27, the face detection unit 102 proceeds to step ST28. When it is determined that the image defined by the detection frame FR-fa is not a face image in step ST26, the face detection unit 102 directly proceeds to step ST28. In step ST28, the face detection unit 102 determines whether the detection frame FR-fa has reached the end of the still-image frame IM-0. When the determination is negative in step ST28, the face detection unit 102 proceeds to step ST29 where the detection frame FR-fa is moved to the next position. Thereafter, the face detection unit 102 returns to step ST25, and the processing the same as described above is performed again. Note that a certain vertical position of the detection frame FR-fa is moved by one pixel in a horizontal direction. After the movement in the horizontal direction of the vertical position is terminated, the detection frame FR-fa is moved by one pixel in a vertical direction so as to be moved to the next vertical position.

When the determination is affirmative in step ST28, the face detection unit 102 determines whether the reduction-step value S_NO corresponds to the last reduction-step value S_NOmax in step ST30. When the determination is negative in step ST30, the face detection unit 102 sets the next reduction-step value S_NO+1 in step ST31. Thereafter, the face detection unit 102 returns to step ST23, and the processing the same as described above is performed again.

When the determination is affirmative in step ST30, the face-image detection processing has been performed on face images corresponding to all the reduction steps S_NO. Therefore, the face detection unit 102 terminates the face-image detection processing in step ST32.

As described above, when the face images are detected from the still-image frame (still image), the face detection unit 102 detects the face-rotation angles representing angles of faces in the face images. As described above, when detecting the face images using the face dictionary which is learned by the machine learning algorithm such as AdaBoost, the face detection unit 102 simultaneously uses different face dictionaries for different face-rotation angles.

When detecting a face image, the face detection unit 102 determines a face-rotation angle corresponding to a face dictionary used in the detection processing to be a face-rotation angle representing an angle of a face corresponding to the detected face image. Note that, when face scores SCORE_fa measured using the plurality of face dictionaries are larger than 0, a face-rotation angle corresponding to a face dictionary used to obtain the largest face score SCORE_fa is determined to be a face-rotation angle representing an angle of the detected face image. In step ST27 of FIG. 10, the face detection unit 102 also stores information on the face-rotation angle in the storage unit.

Face-Feature-Value Calculation Unit

The face-feature-value calculation unit 103 calculates face feature values of the face images detected by the face detection unit 102 in accordance with the image information items (face-image information items) regarding the face images, and stores the face feature values in the storage unit. Furthermore, the face-feature-value calculation unit 103 calculates smile scores representing degrees of smile and contrast scores representing degrees of contrast in accordance with the image information items regarding the face images, and stores the smile scores and the contrast scores in the storage unit. Then, the face-feature-value calculation unit 103 supplies the face feature values, the smile scores, and the contrast scores to the noise-face removing unit 104 in a successive stage at an appropriate timing.

The face-feature-value calculation unit 103 detects face-feature positions, such as positions of both ends of an eyebrow, both ends of an eye, the center of the eyebrow, and the center of the eye, and calculates local-feature-value vectors (identification feature vectors) in the fate-feature positions using a convolution operation such as Gabor filter. The face-feature-value calculation unit 103 detects the face-feature positions in accordance with the face-image information items and face-rotation-angle information items using a certain method, for example, a method referred to as an AAM (Active Appearance Models). This AAM is referred to in the following document.

F. Cootes, G. J. Edwards, and C. J. Taylor, "Active Appearance Models", Proc. Fifth European Conf. Computer Vision, H. Burkhardt and B. Neumann, eds, vol. 2, pp. 484-498, 1998

In the AAM method, face-feature positions of face images corresponding to faces in various angles in certain limited regions are accurately detected. Therefore, when the face-feature positions are to be detected using the AAM method, there is a demand for a system in which different face-feature positions of face images corresponding to faces in different angles are detected for individual regions in which the face-feature positions are to be accurately detected. For example, a plurality of detectors (not shown) for the different angles which detect the face-feature positions are disposed, and an appropriate one of the detectors is used in accordance an angle represented by face angle information.

When detecting the face-feature positions using the AAM method, the face-feature-value calculation unit 103 selects one of the plurality of detectors suitable for the face-rotation angle represented by the face-rotation-angle information, supplies the face image information to the selected detector, and detects the face-feature positions.

Figure 15:
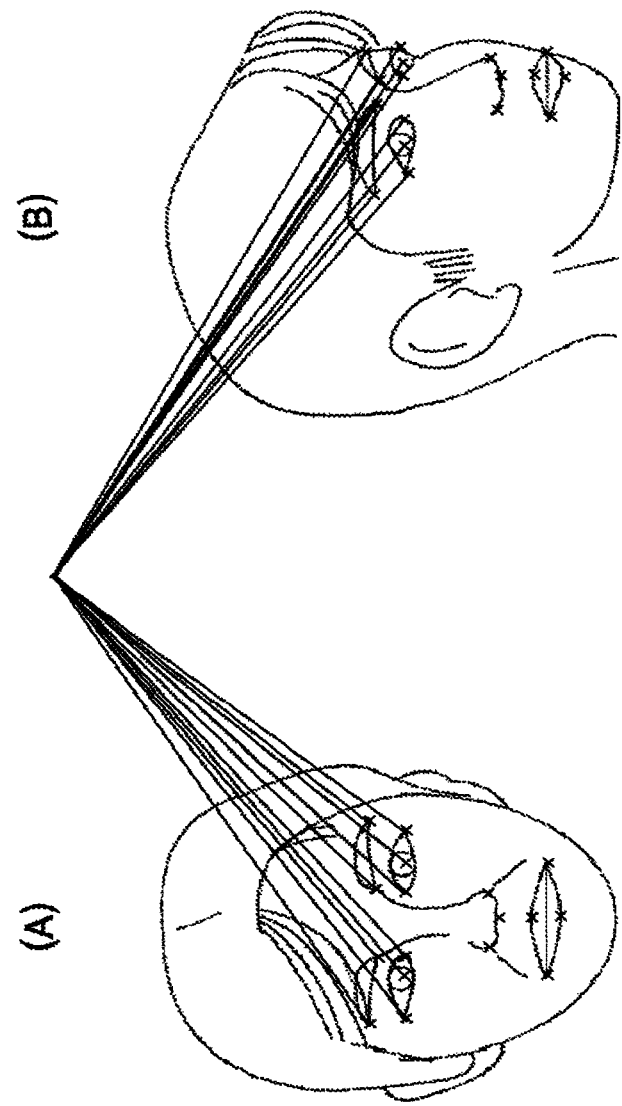
FIG. 15 is a diagram illustrating face-feature positions detected when a face-feature-value calculation unit calculated face feature values (local face-feature-value vectors)

The face-feature positions detected by the face-feature-value calculation unit 103 correspond to positions shown in (A) and (B) of FIG. 15, for example. Note that (A) of FIG. 15 is a diagram illustrating face-feature positions detected in a face image captured from the front of a face, and (B) of FIG. 15 is a diagram illustrating face-feature positions detected in a face image captured at a 45-degree angle. In (A) and (B) of FIG. 15, portions denoted by x-marks are to be detected as the face-feature positions.

Referring to (A) of FIG. 15, 17 points are detected as the face-feature positions, including both ends of each of the eyebrows (four points in total including two points in the right eyebrow and two points in the left eyebrow), both ends of each of the eyes and the center (black eyes) of each of the eyes (six points in total including three points in the right eye and three points in the left eye), both ends and the center of the nose (three points in total), both ends and the center of the mouth (four points in total including two points corresponding to both ends of the mouth, one point corresponding to the center of the upper lip, and one point corresponding to the center of the lower lip). In this embodiment, the description is continued assuming that 17 face-feature positions are detected in a single face image.

The face-feature positions (denoted by the x-marks) of (A) of FIG. 15 and the corresponding face-feature positions (denoted by the x-marks) of (B) of FIG. 15 are connected to each other by solid lines so that the association relationships are made apparent (note that only the association relationships in the face-feature positions in the eyebrows and the association relationships in the eyes are shown).

The face-feature-value calculation unit 103 detects the face-feature positions for individual face images detected by the face detection unit 102, and calculates local-feature-value vectors (identification feature vectors) serving as the face feature values in accordance with face-feature-position information items and the face-image information items for individual face-feature positions. Examples of a method for calculating the local-feature-value vectors performed by the face-feature-value calculation unit 103 include a calculation method using an image in the vicinity of a face-feature position of interest and a method using convolution calculation such as Gabor filter or Gaussian Derivative Filter. In this embodiment, the description is continued assuming that the local-feature-vectors are extracted using Gabor filter.

Processing of Gabor filter (Gabor-Filtering) will now be described. As it is generally known, optical cells of human beings include cells each of which has selectivity for specific orientations. The optical cells of human beings include cells which react to vertical lines and cells which react to horizontal lines. As with the optical cells of human beings, Gabor filter is a spatial filter including a plurality of filters each of which has orientation selectivity.

Gabor filter is spatially expressed by Gabor function. As shown in Expression (5), Gabor function g(x, y) is constituted by a carrier s(x, y) including a cosine component and an envelope $W_r(x, y)$ corresponding to two-dimensional Gaussian distribution.

$$g(x,y) = s(x,y) W_r(x,y) \quad (5)$$

The carrier s(x, y) is represented by Expression (6) using a plurality of functions. Here, a coordinate value $(u_0, v_0)$ denotes a spatial frequency, and P denotes a phase of the cosine component.

$$s(x,y) = \exp(j(2\pi(u_0 x + v_0 y) + P)) \quad (6)$$

The carrier represented by Expression (6) can be divided into a real-number component Re(s(x, y)) and an imaginary-number component Im(s(x, y)) as shown in Expression (7).

$$Re(s(x,y)) = \cos(2\pi(u_0 x + v_0 y) + P)$$

$$Im(s(x,y)) = \sin(2\pi(u_0 x + v_0 y) + P) \quad (7)$$

On the other hand, the envelope corresponding to the two-dimensional Gaussian distribution is expressed by Expression (8).

$$Wr(x,y) = K \exp(-\pi(a^2 (x-x_0)_r^2 + b^2 (y-y_0)_r^2)) \quad (8)$$

Here, the coordinate origin $(x_0, y_0)$ represents a peak of this function, and constants a and b are scale parameters of Gaussian distribution. A subscript r represents a rotation operation expressed by Expression (9).

$$(x-x_0)_r = (x-x_0)\cos\theta + (y-y_0)\sin\theta$$

$$(y-y_0)_r = -(x-x_0)\sin\theta + (y-y_0)\cos\theta \quad (9)$$

Accordingly, from Expressions (6) and (8), Gabor filter is represented by a spatial function as shown in Expression (10).

$$g(x,y) = K \exp(-\pi(a^2 (x-x_0)_r^2 + b^2 (y-y_0)_r^2)) \exp(j(2\pi(u_0 x + v_0 y) + P)) \quad (10)$$

In this embodiment, the face-feature-value calculation unit 103 performs calculation processing for individual face-feature positions of eyes, a mouth, and a nose in a face using 17 Gabor filters.

Assuming that an i-th Gabor filter is denoted by Gi, a result (Gabor Jet) obtained from the i-th Gabor filter is denoted by Ji, and an input image is denoted by I, a response from the Gabor filter Gi is represented by Expression (11).

$$j_i(x,y) = G_i(x,y) \otimes I(x,y) \quad (11)$$

The calculation of Expression (11) may be performed at high speed using a fast Fourier transformation. In the following description, local feature values obtained through Expression (11) are determined to be local-feature-value vectors (identification feature vectors) which are defined as Expression (12) below.

$$J_i = \{j_{i-1}, j_{i-2}, \ldots, j_{i-n}\} \quad (12)$$

As described above, the face-feature-value calculation unit 103 calculates the local-feature-value vectors (identification feature vectors) serving as the feature values for individual face-feature positions. That is, the face-feature-value calculation unit 103 calculate a group of 17 local-feature-value vectors corresponding to the 17 face-feature positions for each face image as shown in Expression (13), and stores results of the calculations in the storage unit.

$$\begin{aligned} J_1 &= \{j_{1-1}, j_{1-2}, j_{1-3}, \ldots, j_{1-n}\} \\ J_2 &= \{j_{2-1}, j_{2-2}, j_{2-3}, \ldots, j_{2-n}\} \\ J_3 &= \{j_{3-1}, j_{3-2}, j_{3-3}, \ldots, j_{3-n}\} \\ &\ldots \\ J_{17} &= \{j_{17-1}, j_{17-2}, j_{17-3}, \ldots, j_{17-n}\} \end{aligned} \quad (13)$$

Figure 16:
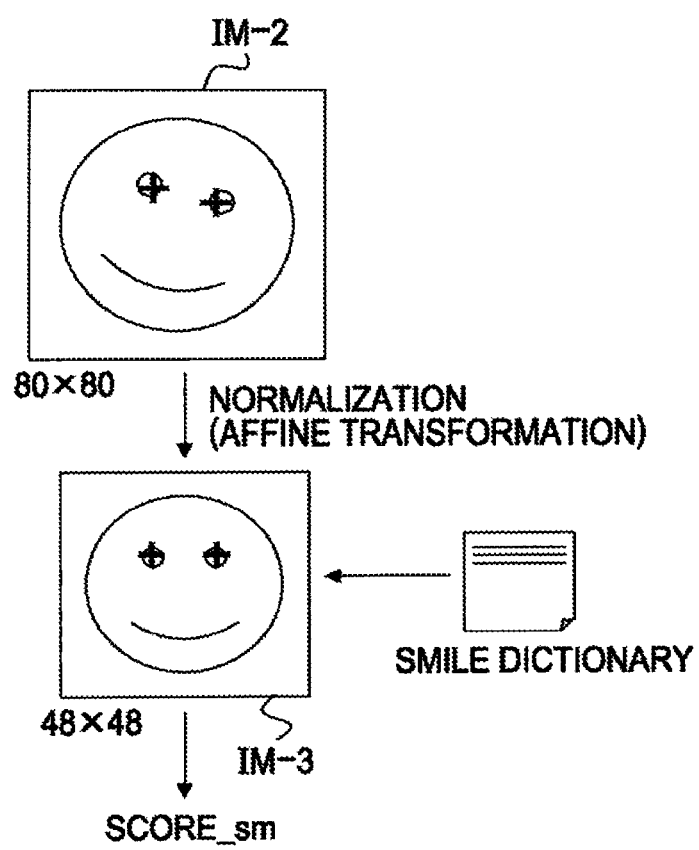
FIG. 16 is a diagram illustrating normalization processing performed on a face image IM-1 when a smile score is calculated by the face-feature-value calculation unit.

The face-feature-value calculation unit 103 calculates the smile scores representing degrees of smile in accordance with the image information items (face-image information items) of the face images detected by the face detection unit 102. As shown in FIG. 16, the face-feature-value calculation unit 103 performs normalization (affine transformation) on the face image IM-2 so that the left eye and the right eye are located at predetermined coordinates so as to generate a normalized face image IM-3 having a predetermined size, i.e., a horizontal size of 48 pixels and a vertical size of 48 pixels in this embodiment.

Note that the number of pixels (48 pixels×48 pixels) of the face image IM-3 which has just been normalized in accordance with the positions of the left and right eyes is smaller than the number of pixels (80 pixels×80 pixels) of the face image IM-2 which has previously been normalized. This is because the face image IM-2 should have the large number of pixels (resolution) to some extent so that the face feature values of the face image are accurately detected. However, the normalized face image IM-3 is used to detect a feature (smile score) of an entire face, and therefore, even the small number of pixels is effective. Since the normalized face image IM-3 has the small number of pixels, memory usage is reduced, and the processing of detecting the feature is readily performed at high speed.

As shown in FIG. 16, the face-feature-value calculation unit 103 measures a face score SCORE_sm using the smile dictionary. The face score SCORE_sm is used to determine whether the normalized face image IM-3 includes Smiling-face image.

Processing of measuring the face score SCORE_sm will be described. The face dictionary includes t3 combinations (several hundreds combinations) of pix_sm1(i), pix_sm2(i), θ_sm(i), and α_sm(i) as shown in (B) of FIG. 17. Here, pix_sm1(i) and pix_sm2(i) denote positions of two points in the normalized face image IM-3. Furthermore, θ_sm(i) denotes a threshold value of a difference between a luminance value of pix_sm1(i) and a luminance value of pix_sm2(i). Moreover, α_sm(i) denotes weight to be added or reduced in accordance with a result of comparison between the difference between the luminance value of pix_sm1(i) and the luminance value of pix_sm2(i) and the threshold value θ_sm (i). The values of pix_sm1(i), pix_sm2(i), θ_sm(i), and α_sm(i) are obtained by being learned by the machine learning algorithm such as AdaBoost.

As shown in (A) of FIG. 17, the measurement of the face score SCORE_sm is performed as follows. It is determined whether each of the combinations of pix_sm1(i), pix_sm2(i), θ_sm(i), and α_sm(i) satisfies Expression (14). When the determination is affirmative, Expression (15) is performed. On the other hand, when the determination is negative, Expression (16) is performed. Note that, in Expression (14), pix_sm1(i) denotes a luminance value of its position, and pix_sm2(i) denotes a luminance value of its position.

$$\text{pix\_sm1}(i) - \text{pix\_sm2}(i) < \theta\_sm(i) \tag{14}$$

$$\text{SCORE\_sm} = \text{SCORE\_sm} + \alpha\_sm(i) \tag{15}$$

$$\text{SCORE\_sm} = \text{SCORE\_sm} - \alpha\_sm(i) \tag{16}$$

Figure 18:
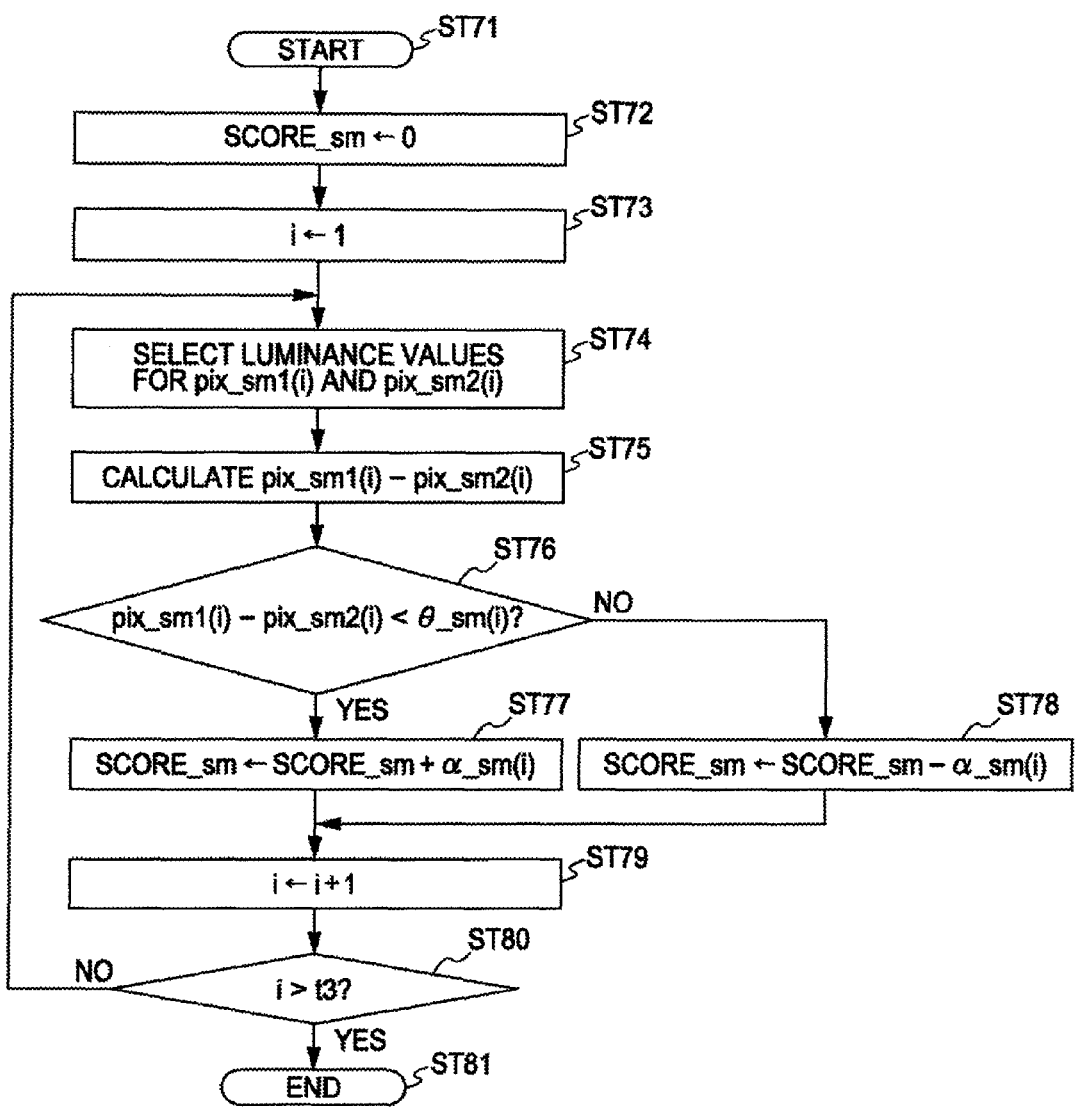
FIG. 18 is a flowchart illustrating a procedure of processing of measuring the smile score SCORE_sm using the smile dictionary.

FIG. 18 is a flowchart illustrating a procedure of the processing of measuring the smile score SCORE_sm using the smile dictionary. In step ST71, the face-feature-value calculation unit 103 starts the score-measurement processing, and proceeds to step ST72. In step ST72, the face-feature-value calculation unit 103 sets the face score SCORE_sm to 0. In step ST73, the face-feature-value calculation unit 103 sets i to 1.

In step ST74, the face-feature-value calculation unit 103 selects luminance values corresponding to pix_sm1(i) and pix_sm2(i). In step ST75, the face-feature-value calculation unit 103 subtracts the luminance value of pix_sm2(i) from the luminance value of pix_sm1(i). In step ST76, the face-feature-value calculation unit 103 determines whether a result (pix_sm1(i)−pix_sm2(i)) of the calculation is smaller than the threshold value θ_sm(i) (refer to Expression (14)).

When the determination is affirmative in step ST76, the face-feature-value calculation unit 103 proceeds to step ST77 and adds the weight α_sm(i) to the face score SCORE_sm (refer to Expression (15)). On the other hand, when the determination is negative in step ST76, the face-feature-value calculation unit 103 proceeds to step ST78 where the weight α_sm(i) is subtracted from the face score SCORE_sm (refer to Expression (16)).

After step ST77 or step ST78, the face-feature-value calculation unit 103 proceeds to step ST79. In step ST79, the face-feature-value calculation unit 103 increments i by one. In step ST80, the face-feature-value calculation unit 103 determines whether i is larger than t3. When the determination is affirmative in step ST80, it is determined that the processing is performed on all the t3 combinations included in the smile dictionary, and the processing of measuring a smile score is terminated in step ST8. On the other hand, when the determination is negative in step ST80, the face-feature-value calculation unit 103 returns to step ST74, and performs the processing described above again.

The face-feature-value calculation unit 103 calculates the smile scores for individual face images detected by the face detection unit 102 as described above, and stores the smile scores in the storage unit.

The face-feature-value calculation unit 103 calculates the contrast score representing degrees of contrast in accordance with the image information items (face-image information items) of the face images detected by the face detection unit 102. The face-feature-value calculation unit 103 calculates a contrast score ContrastScore by adding square values of differences between luminance values of adjacent pixels, which are obtained for individual pixels, to one another in accordance with the image information items of the face images.

Figure 19:
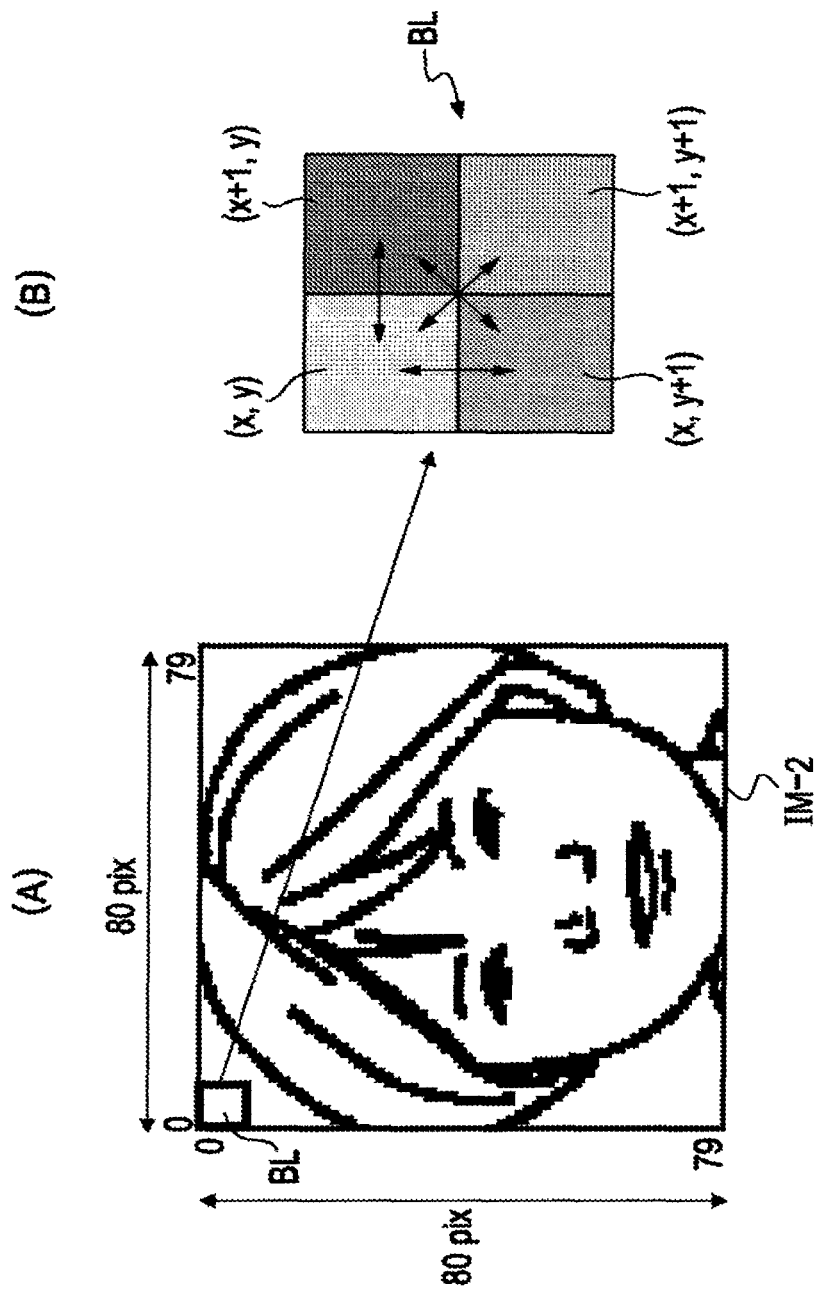
FIG. 19 is a diagram illustrating a method for obtaining a contrast score ContrastScore by adding a square value of a difference of luminance values of adjacent pixels obtained for individual pixels.

As shown (A) of FIG. 19, in the processing of calculating the contrast score ContrastScore, a block BL having a size of 2 pixels×2 pixels is set in the face image IM-2 having the size of 80 pixels×80 pixels. Among the four pixels included in the block BL, a position of an upper-left pixel is denoted by (x, y), a position of a lower-left pixel is denoted by (x, y+1), a position of an upper-right pixel is denoted by (x+1, y), and a position of a lower-right pixel is denoted by (x+1, y+1).

The face-feature-value calculation unit 103 successively moves the block BL by changing the values x and y in a range from 0 to 78, and successively adds square values of differences between luminance values of adjacent pixels, which are obtained for individual pixels, to one another. In this way, the contrast score ContrastScore is obtained.

It is assumed that a difference between a luminance value of the pixel (x, y) and a luminance value of the pixel (x+1, y) is denoted by [I(x, y)−I(x+1, y)], a difference between a luminance value of the pixel (x, y) and a luminance value of the pixel (x, y+1) is denoted by [I(x, y)−I(x, y+1)], a difference between a luminance value of the pixel (x, y) and a luminance value of the pixel (x+1, y+1) is denoted by [I(x, y)−I(x+1, y+1)], and a difference between a luminance value of the pixel (x, y+1) and a luminance value of the pixel (x+1, y) is denoted by [I(x, y+1)−I(x+1, y)], the contrast score ContrastScore is represented by Expression (17). Note that, in Expression (17), N denotes the number of pixels of the face image, and N is 80×80 in this embodiment.

$$BCS = \frac{1}{N} \left\{ \begin{array}{l} \sum_{x,y} [I(x, y) - I(x+1, y)]^2 + \\ \sum_{x,y} [I(x, y) - I(x, y+1)]^2 + \\ \sum_{x,y} [I(x, y) - I(x+1, y+1)]^2 + \\ \sum_{x,y} [I(x, y+1) - I(x+1, y)]^2 \end{array} \right\} \tag{17}$$

$$x \in (0, 80-2), y \in (0, 80-2), N = 80 \times 80$$

Figure 20:
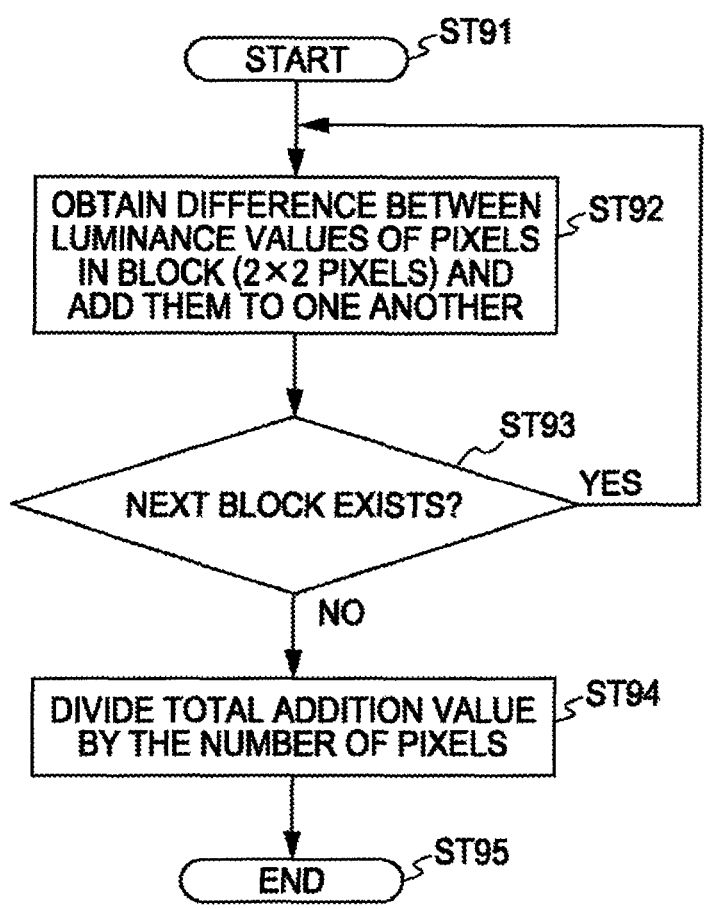
FIG. 20 is a flowchart illustrating a method for obtaining the contrast score ContrastScore of a certain face image IM-2.

FIG. 20 is a flowchart illustrating a procedure of processing of obtaining the contrast score ContrastScore of the face image IM-2. In step ST91, the face-feature-value calculation unit 103 starts the processing of obtaining a contrast score, and proceeds to step ST92. In step ST92, the face-feature-value calculation unit 103 calculates the contrast score by adding square values of differences between the luminance values among the pixels included in the block BL (2×2 pixels) to one another.

In step ST93, the face-feature-value calculation unit 103 determines whether a portion to which the block BL is to be moved exists. When a portion to which the block BL is to be moved exists in ranges of x and y of 0 to 78, the face-feature-value calculation unit 103 determines that the portion to which the block BL is to be moved exists. When the determination is affirmative in step ST93, the face-feature-value calculation unit 103 returns to step ST92, and the next portion corresponding to the block BL is processed.

When the determination is negative in step ST93, the face-feature-value calculation unit 103 proceeds to step ST94 where the face-feature-value calculation unit 103 divides a total addition value by the number of pixels N of the face image IM-2 so that the contrast score ContrastScore is obtained. After step ST94, the face-feature-value calculation unit 103 terminates the processing in step ST95.

The face-feature-value calculation unit 103 calculates the contrast scores for individual face images detected by the face detection unit 102 as described above, and stores the contrast scores in the storage unit.

Figure 21:
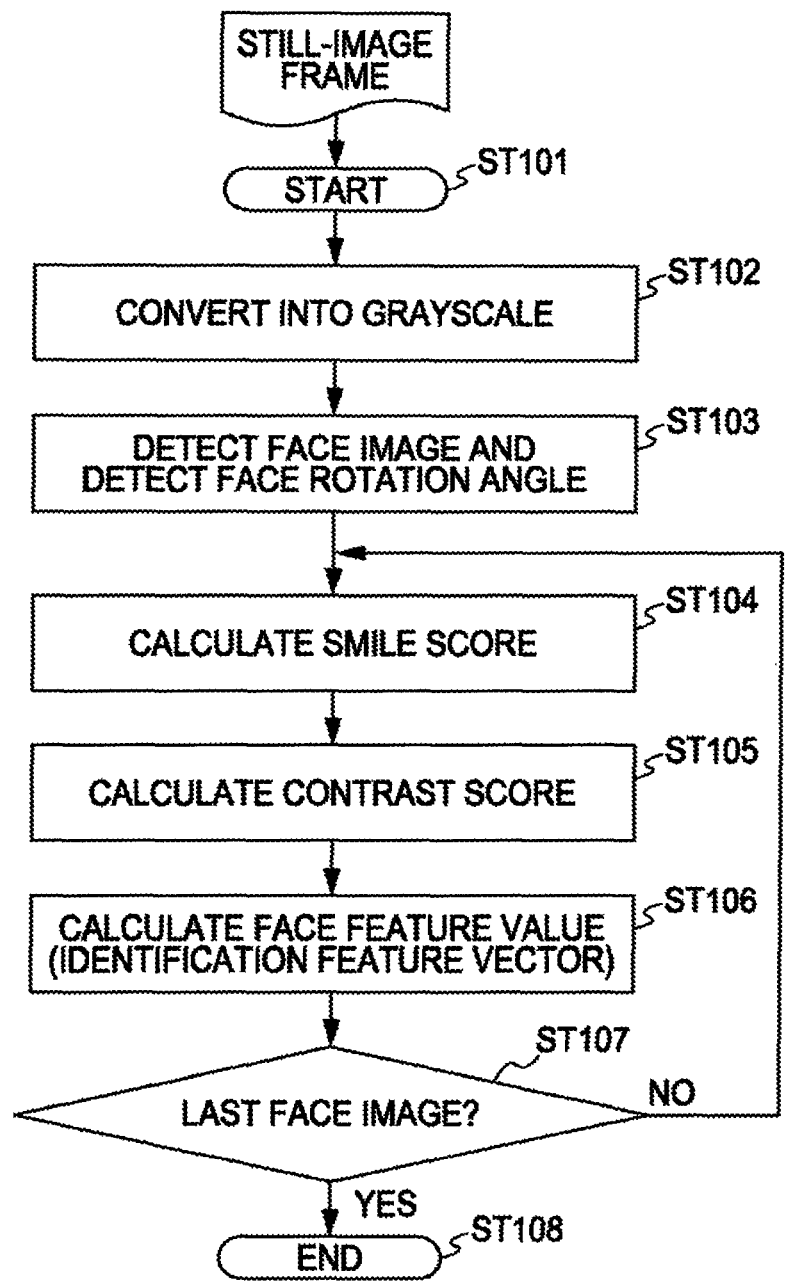
FIG. 21 is a flowchart illustrating a procedure of operations performed by the face detection unit and the face-feature-value calculation unit every time a still-image frame (still image) is extracted from a moving-image stream by a decoding unit.

FIG. 21 is a flowchart illustrating a procedure of operations performed by the face detection unit 112 and the face-feature-value calculation unit 103 every time still-image frames (still images) are extracted from a moving-image stream by the decoding unit 101.

When each of the still-image frames is extracted by the decoding unit 101, the face detection unit 102 and the face-feature-value calculation unit 103 start processing in step ST101. In step ST102, the face detection unit 102 converts information on an image in the still-image frame into grayscale. When a YUV format is employed as a format of the input image, the face detection unit 102 extracts only a Y component. When an RGB format is employed as the format of the input image, the face detection unit 102 calculates the Y component as shown in the following expression.

$$Y=(0.299*R+0.587*G+0.114*B)$$

In step ST103, the face detection unit 102 detects face images in accordance with the image information of the still-image frame which has been converted into grayscale, and further detects face-rotation angles representing angles of faces represented by the face images (refer to FIGS. 9 to 14).

Figure 17:
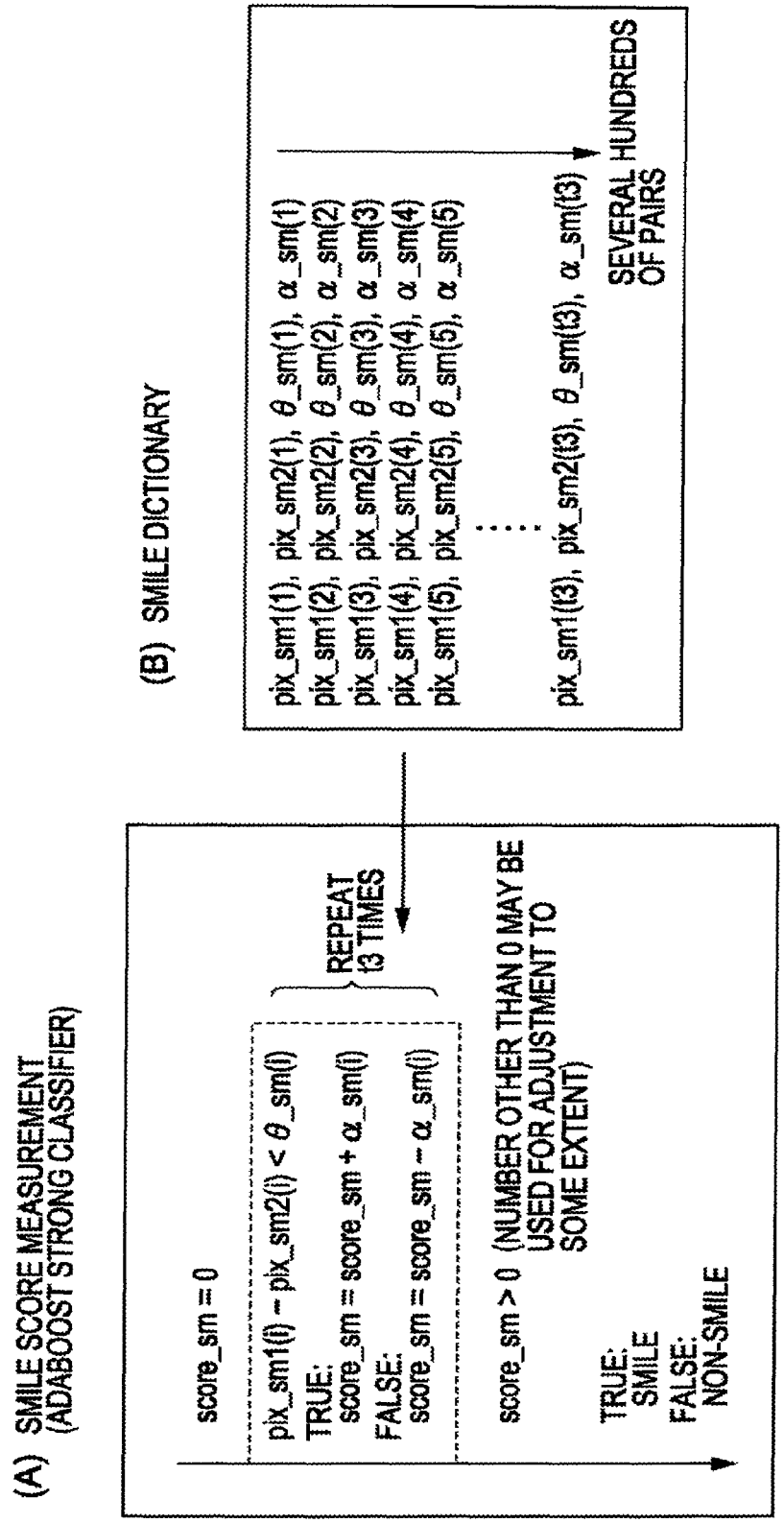
FIG. 17 is a diagram illustrating a smile dictionary and measurement of a smile score SCORE_sm using the smile dictionary.

In step ST104, the face-feature-value calculation unit 103 calculates a smile score SCORE_sm in accordance with information on one of the face images detected by the face detection unit 102 (refer to FIGS. 16 to 18). In step ST105, the face-feature-value calculation unit 103 calculates a contrast score ContrastScore in accordance with the information on the one of the face images detected by the face detection unit 102 (refer to FIGS. 19 and 20). In step ST106, the face-feature-value calculation unit 103 detects face-feature positions in accordance with the information on the one of the face images detected by the face detection unit 102 (refer to FIG. 15) so as to obtain a fade feature value (local-feature-value vector).

In step ST107, the face-feature-value calculation unit 103 determines whether all the face images detected by the face detection unit 102 have been processed. When the determination is negative in step ST107, the face-feature-value calculation unit 103 returns to step ST104, and calculates a smile score SCORE_sm, a contrast score ContrastScore, and a face feature value of the next face image.

When the determination is affirmative in step ST107, the face-feature-value calculation unit 103 proceeds to step ST108 where the processing is terminated.

Note that, in the flowchart of FIG. 21, in a case where the information on the image in the still-image frame (still image) which is supplied from the decoding unit 101 to the face detection unit 102 has already been converted into grayscale, the processing of converting the information on the image in the still-image frame (still image) performed by the face detection unit 102 (processing of step ST102) is eliminated. Furthermore, in the flowchart of FIG. 21, the operations of step ST104 to step ST106 are not necessarily performed in this order.

Noise-Face Removing Unit

The noise-face removing unit 104 removes face images including images of side faces or blurred face images which may adversely affect to processing of the identical-faces-merging processor 105 and processing of the face clustering unit 106 in a succeeding stage. The noise-face removing unit 104 removes noise-face images (such as side-face images and blurred face images) in accordance with face data items (refer to FIG. 4) corresponding to the face images supplied from the face-feature-value calculation unit 103.

Figure 22:
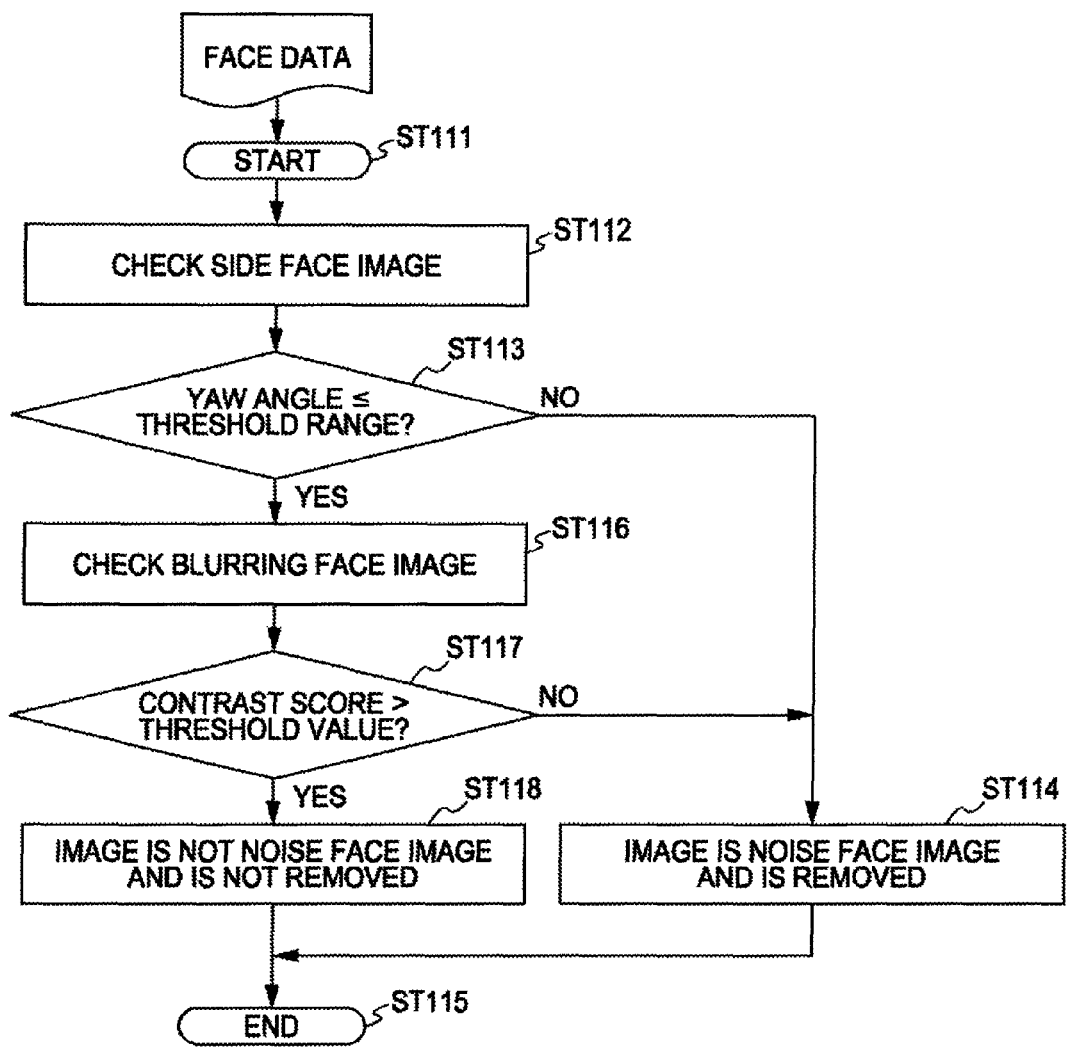
FIG. 22 is a flowchart illustrating a procedure of processing of removing noise-face images performed by a noise-face removing unit.

FIG. 22 is a flowchart illustrating a procedure of processing of removing noise-face images performed by a noise-face removing unit 104. Every time the face data items corresponding to the face images detected by the face detection unit 102 are supplied from the face-feature-value calculation unit 103, the noise-face removing unit 104 performs noise-face removing processing shown in the flowchart of FIG. 22 successively on the face images serving as objects to be processed.

In step ST111, the noise-face removing unit 104 starts the processing, and proceeds to step ST112. In step ST112, the noise-face removing unit 104 determines whether a face image of interest is a side-face image, that is, the noise-face removing unit 104 checks information on a face-rotation angle included in face data of the face image of interest.

In step ST113, the noise-face removing unit 104 determines whether a yaw angle is within a threshold range. The threshold range is ±45 degrees, for example. A face image shown in FIG. 23A has a yaw angle of −5 degrees, and therefore, is not a side-face image, and a face image shown in FIG. 23B has a yaw angle of +50 degrees, and therefore, is a side-face image (noise-face image), for example.

When the determination is negative in step ST113 (refer to FIG. 23B), the noise-face removing unit 104 determines that the face image of interest is a noise-face image (side-face image), and removes the face image of interest in step ST114. After step ST114, the noise-face removing unit 104 terminates the processing in step ST115.

On the other hand, when the determination is affirmative in step ST113, the noise-face removing unit 104 proceeds to step ST116. In step ST116, the noise-face removing unit 104 determined whether the face image of interest is a blurred face image, that is, the noise-face removing unit 104 checks a contrast score included in the face data corresponding to the face image of interest.

In step ST117, the noise-face removing unit 104 determines whether the contrast score is larger than a threshold value. The threshold value is 150, for example. A face image shown in FIG. 24A has a contrast score of 350, and therefore, is not a blurred face image, and a face image shown in FIG. 24B has a contrast score of 120, and therefore, is a blurred face image (noise-face image), for example.

When the determination is negative in step ST117, the noise-face removing unit 104 proceeds to step ST114 where the noise-face removing unit 104 determines that the face image of interest is a noise-face image (blurred face image), and removes the face image of interest. After step ST114, the noise-face removing unit 104 terminates the processing in step ST115.

On the other hand, when the determination is affirmative in step ST117, the noise-face removing unit 104 determines that the face image of interest is not a noise-face image, and therefore, does not remove the face image of interest in step ST118. After step ST118, the noise-face removing unit 104 terminates the processing in step ST115.

Note that, in the flowchart of FIG. 22, when the yaw angle of the face image of interest is out of the threshold range, the noise-face removing unit 104 determines that the face image of interest is a side-face image (noise-face image) and removes the face image of interest. In addition, when a pitch angle of the face image of interest is out of a threshold range, the noise-face removing unit 104 may determine that the face image of interest is an image of an upturned face or an image of a downturned face (noise face) and may remove the face image of interest.

Identical-Faces-Merging Processor

Every time face data items in a current frame is supplied from the noise-face removing unit 104, the identical-faces-merging processor 105 performs processing of merging identical face images. The identical-faces-merging processor 105 determines whether a person in a face image detected in the current frame is identical to a person in a face image which has been detected in a previous frame and which has been stored. In this case, for the determination, the identical-faces-merging processor 105 sets individual threshold values to a degree of similarity calculated in accordance with face feature values of the two face images, positions of face-detection frames in the two face images, sizes of the face-detection frames, and an interval (frame interval) between frames of the two face images.

FIG. 25 is a flowchart illustrating a procedure of identical-face merging processing performed by the identical-faces-merging processor 105. When receiving each of the face data items representing the face images of the current frame (except for the noise-face images) from the noise-face removing unit 104, the identical-faces-merging processor 105 successively performs the identical-face-combining processing on each of the face images as shown in FIG. 25.

In step ST121, the noise-face removing unit 104 starts processing, and proceeds to step ST122. In step ST122, the identical-faces-merging processor 105 calculates a degree of similarity between the face image of interest in the current frame (current face image) and one of the face images which have been detected in the previous frame and which have been stored (previous face image). In this case, the identical-faces-merging processor 105 calculates the degree of similarity using local-feature-value vectors (refer to Expression (13)) of the current face image and the previous face image serving as face feature values calculated by the face-feature-value calculation unit 103.

Here, a method for obtaining the degree of similarity will be described. The degree of similarity between the current face image and the previous face image is obtained using the local-feature-value vectors (face feature values) of the two face images. In this case, in a case where a face-rotation angle of the current face image and a face-rotation angle of the previous face image are different from each other (refer to (A) and (B) of FIG. 15), if the local-feature-value vectors of the two face images are used without any change, accuracy of calculation of the degree of similarity is degraded. Therefore, in the case where the face-rotation angles of the two face images are different from each other, the face-feature-value calculation unit 103 converts, for example, the local-feature-value vector of the previous face image into a local-feature-value vector corresponding to an angle of a face corresponding to the current face image using a mapping function, and thereafter, obtains the degree of similarity.

In a case where the face-rotation angle of the current face image is set to 0 degree (refer to (A) of FIG. 15) and the face-rotation angle of the previous face image is set to 45 degrees (refer to (B) of FIG. 15), mapping processing will be described. In this case, the local-feature-value vector of the current face image is represented by Expression (18), and the local-feature-value vector of the previous face image is represented by Expression (19). Note that superscripts of characters J and j denote the face-rotation angles. The character i denotes a number used to identify a face-feature position. In this embodiment, since the local-feature-value vectors corresponding to the 17 face-feature positions are to be calculated, the character i corresponds to one of numbers 1 to 17.

$$J_i^0 = \{j_{i-1}^0, j_{i-2}^0, \ldots, j_{i-n}^0\} \tag{18}$$

$$J_i^{45} = \{j_{i-1}^{45}, j_{i-2}^{45}, \ldots, j_{i-n}^{45}\} \tag{19}$$

The mapping processing is performed so that the local-feature-value vector extracted from the face image corresponding to a face at an angle of 45 degrees is converted so as to correspond to the local-feature-value vector extracted from the face image corresponding to a face at an angle of 0 degree using the mapping function. Expression (20) denotes the local-feature-value vector obtained after the mapping processing. In Expression (20), "~" on upper sides of the characters J and j represents that J and j are approximate values.

$$\tilde{J}_i^0 = \{\tilde{j}_{i-1}^0, \tilde{j}_{i-2}^0, \ldots, \tilde{j}_{i-n}^0\} \tag{20}$$

Elements included in Expression (20) (elements included in "{ }" on the right side of Expression (20)) are calculated using Expression (21).

$$\begin{aligned}\tilde{j}_{i-1}^0 &= f_{i-1}^{45}(j_{i-1}^{45}, j_{i-2}^{45}, \ldots, j_{i-n}^{45}) \\ \tilde{j}_{i-2}^0 &= f_{i-2}^{45}(j_{i-1}^{45}, j_{i-2}^{45}, \ldots, j_{i-n}^{45}) \\ &\vdots \\ \tilde{j}_{i-n}^0 &= f_{i-n}^{45}(j_{i-1}^{45}, j_{i-2}^{45}, \ldots, j_{i-n}^{45})\end{aligned} \tag{21}$$

That is, an element j included in Expression (20) is obtained by a predetermined mapping function f using all elements (n elements j including Ji-1 to Ji-n) included in Expression (19). In this case, the mapping function f is compatible with the angle of the face included in the previous face image. Furthermore, different mapping functions if are prepared for different face-feature positions. That is, since the 17 face-feature positions are detected in this embodiment, 17 mapping functions f are provided for each angle.

General expressions for the mapping processing are represented as follows.

$$J_i^{\theta I} = \{j_{i-1}^{\theta I}, j_{i-2}^{\theta I}, \ldots, j_{i-n}^{\theta I}\} \tag{22}$$

$$J_i^{\theta R} = \{j_{i-1}^{\theta R}, j_{i-2}^{\theta R}, \ldots, j_{i-n}^{\theta R}\} \tag{23}$$

$$\tilde{J}_i^{\theta R} = \{\tilde{j}_{i-1}^{\theta R}, \tilde{j}_{i-2}^{\theta R}, \ldots, \tilde{j}_{i-n}^{\theta R}\} \tag{24}$$

Expression (22) represents a local-feature-value vector at a feature position i included in the previous face image corresponding to a face having an angle of θI. Expression (23) denotes a local-feature-value vector at a feature position i included in the current face image corresponding to a face having an angle of θR. Expression (24) denotes a local-feature-value vector obtained by performing the mapping processing so that the local-feature-value vector at the feature position i of the previous face image obtained by Expression (22) is converted so as to correspond to the local-feature-value vector extracted from the face image corresponding to the face at the angle of θR.

Expression (25) represents elements on the right side of Expression (24). That is, the left side of Expression (25) denotes an estimate value of the k-th element of the local-feature-value vector at the feature position i. Among the right side of Expression (25), $$f_{i-k}^{\theta I, \theta R}(\ )$$

is a mapping function for a feature value which is used to perform the mapping processing on the k-th element of the local-feature-value vector at the feature position i of the face image corresponding to the face having the angle of θR using all the elements of the local-feature-value vector at the feature position i of the face image corresponding to the face having the angle of θI.

Note that, although all the elements are used for the mapping processing in this embodiment, all the elements are not necessarily used for the mapping processing. For example, among all the elements, elements which are basically used for the estimation may be determined so as to be used for the mapping processing (so as to be a signed to the mapping function). That is, in a case where local-feature-value vector to be input and a local-feature-value vector obtained after the mapping processing has an apparent cause-and-effect relationship with each other, the mapping processing is not performed using all elements of the input local-feature-value vector as input variables of the mapping function, but is performed using only the elements which have determined to have the cause-and-effect relationships.

Then, the identical-faces-merging processor 105 calculates the degree of similarity using normalized correlation calculation. When calculating the degree of similarity using the normalized correlation calculation, the identical-faces-merging processor 105 calculates a similarity vector in accordance with Expression (26) and Expression (27).

$$c_i^0 = NC(J_i^0, \tilde{J}_i^0) \quad (26)$$

$$C^0 = \{c_1^0, c_2^0, \ldots, c_n^0\} \quad (27)$$

Elements included in Expressions (12) and (20 are successively assigned to Expression (26) whereby the normalized correlation calculation is performed. By this, elements included in the similarity vector obtained by Expression (27) are calculated. In other words, the degree of similarity between identical face-feature positions of the previous face image and the current face image is calculated (refer to Expression (26)) using the local-feature-value vector of the previous face image (the local-feature-value vector which has been subjected to mapping conversion) (refer to Expression (20)) and the local-feature-value vector of the current face image (refer to Expression (12)).

Note that Expressions (28) and (29) are used when the angle of the face corresponding to the current face image is $\theta R$, and correspond to Expressions (26) and (27) above.

$$c_i^{\theta R} = NC(J_i^{\theta R}, \tilde{J}_i^{\theta R}) \quad (28)$$

$$C^{\theta R} = \{c_1^{\theta R}, c_2^{\theta R}, \ldots, c_n^{\theta R}\} \quad (29)$$

The identical-faces-merging processor 105 obtains a magnitude of the similarity vector (refer to Expressions (27) and (29)) calculated as described above, and the magnitude is used as the degree of similarity.

Referring back to the flowchart of FIG. 25, after step ST122, the identical-faces-merging processor 105 proceeds to step ST123. In step ST123, the identical-faces-merging processor 105 compares the degree of similarity obtained in step ST122 with a threshold value Th1 (first threshold value). It is assumed that a maximum value of the degree of similarity obtained in step ST122 is 100, and the threshold value Th1 is 88.

Figure 26A:
FIGS. 26A and 26B are diagrams illustrating an example of a previous face image and an example of a current face image which are highly similar to each other, and therefore, determined to be images of an identical person.
Figure 26B:

In step ST124, the identical-faces-merging processor 105 determines whether the degree of similarity is equal to or larger than the threshold value Th1. When the determination is affirmative in step ST124, the identical-faces-merging processor 105 proceeds to step ST125 and determines that the current face image and the previous face image include the respective face images representing an identical person. For example, FIGS. 26A and 26B show examples of the previous face image and the current face image, respectively. A degree of similarity of the two face images is 88, for example, and therefore, it is determined that these face images represent an identical person.

In step S126, the identical-faces-merging processor 105 determines a representative face image from among the two face images. In this case, among the two face images, one of the face images which corresponds to a face facing the front the most or one of the face images which has the highest contrast score is determined as the representative face image. In step ST127, the identical-faces-merging processor 105 stores face data corresponding to the representative face image, and discards face data which does not correspond to the representative face image. After step ST127, the identical-faces-merging processor 105 proceeds to step ST128 where the processing is terminated.

On the other hand, when the determination is negative in step ST124, the identical-faces-merging processor 105 proceeds to step ST129 and compares the degree of similarity obtained in step ST122 with a threshold value Th2 (second threshold value). It is assumed that the maximum value of the degree of similarity obtained in step ST122 is 100, and the threshold value Th2 is 0.

Figure 27A:
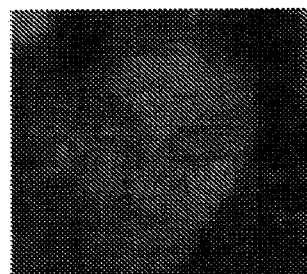
FIGS. 27A and 27B are diagrams illustrating an example of a previous face image and an example of a current face image which are barely similar to each other, and therefore, not determined to be images of an identical person only from a degree of the similarity.
Figure 27B:

In step ST1200, the identical-faces-merging processor 105 determines whether the degree of similarity is equal to or larger than the threshold value Th2. When the determination is affirmative in step ST1200, the identical-faces-merging processor 105 proceeds to step ST1201. For example, FIGS. 27A and 27B show examples of the previous face image and the current face image, respectively. A degree of similarity of the two face images is 3, for example.

In step ST1201, the identical-faces-merging processor 105 compares face-detection-frame information items of the two face images, and checks information on an interval between frames of the two face images. In step ST1202, the identical-faces-merging processor 105 determines whether face-detection-frame information items and the interval between the frames satisfy certain conditions. For example, when a distance between the centers of the face-detection frames is smaller than 80 pixels, an area ratio of the face-detection frames is in a range from 1:0.5 to 1:1.5, and the interval between the frames is smaller than 5.0 seconds, it is determined that the conditions are satisfied. Note that 80 pixels is an example of a threshold value of the distance between the centers of the face-detection frames, area ratios 1:0.5 and 1:1.5 are examples of threshold values of area ratios of the face-detection frames, and 5.0 seconds is an example of a threshold value of the interval between the frames.

When the conditions are satisfied, the identical-faces-merging processor 105 determines that the current face image and the previous face image represent an identical person in step ST125. Therefore, even when the degree of similarity of the two face images is low due to a lighting condition, for example, if a frame interval is short and positions and sizes of the face-detection frames are similar to each other, it is determined that the current face image and the previous face image represent an identical person.

Figure 28A:
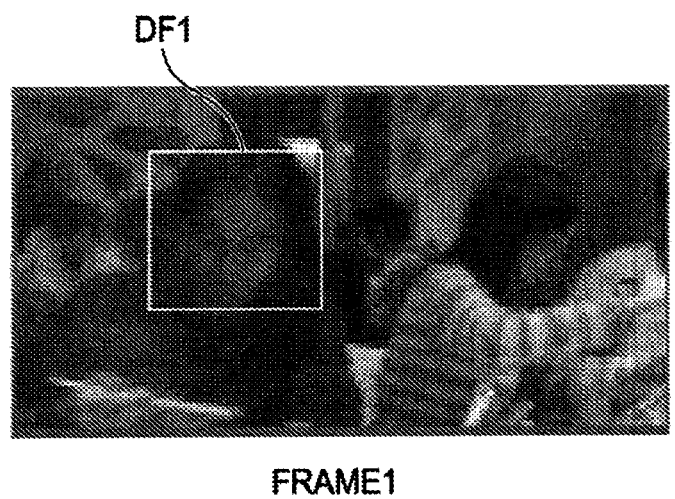
FIGS. 28A and 28B are diagrams illustrating an example of a previous face image and an example of a current face image which are barely similar to each other, but is determined to be images of an identical person only if conditions of a face detection frame and a period of time between frames are satisfied.
Figure 28B:
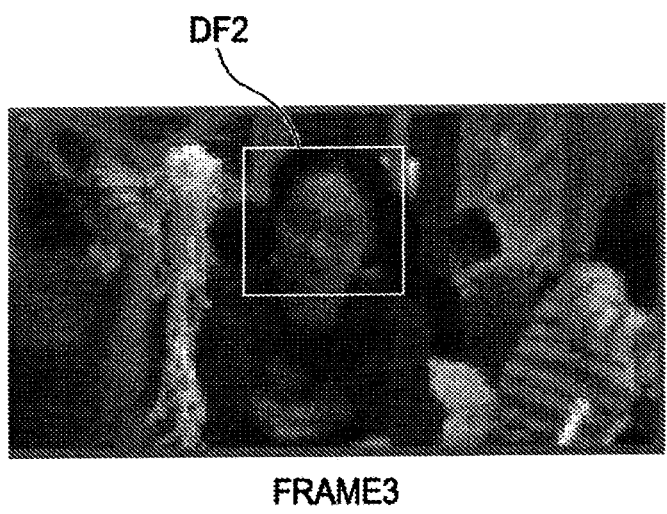

For example, FIG. 28A shows a still-image frame (frame 1) in which the previous face image (refer to FIG. 27A) is detected by a face-detection frame DF1, and FIG. 28B shows a still-image frame (frame 3) in which the current face image (refer to FIG. 27B) is detected by a face-detection frame DF2. In this case, a distance between the center of the face-detection frame DF1 and the center of the face-detection frame DF2 is 30 pixels, an area ratio of the face-detection frame DF1 to the face-detection frame DF2 is 1:1.05, and an interval between the frames is 3.0 seconds. Accordingly, the conditions of the face-detection frames and the interval between frames are satisfied.

After step ST125, the identical-faces-merging processor 105 proceeds to step ST126. An operation performed by the identical-faces-merging processor 105 in step ST126 is the same as that described above, and therefore, description thereof is omitted.

When the determination is negative in step ST1200 or step ST1202, the identical-faces-merging processor 105 proceeds to step ST1203. In step ST1203, the identical-faces-merging processor 105 determines whether all the previous face images have been processed. When the determination is negative in step ST1203, the identical-faces-merging processor 105 returns to step ST122, and performs the processing using the current face image of interest and the next previous face image.

When the determination is affirmative in step ST1203, the identical-faces-merging processor 105 proceeds to step ST1204 and determines that the current face image of interest is a face image corresponding to a person newly appeared. In step ST1205, face data corresponding to the current face image of interest is stored, and thereafter, the processing is terminated in step ST128.

Note that in the identical-faces-merging processing shown in the flowchart of FIG. 25, the determination as to whether the current face image and the previous face image represent an identical person is made in accordance with the detection-frame information items and the information on the interval between the frames of the two face images, in addition to the degree of similarity calculated from the face feature values of the current face image and the previous face image. However, the determination may be made only in accordance with the degree of similarity calculated from the face feature values of the current face image and the previous face image. In this case, in the flowchart of FIG. 25, when the degree of similarity is lower than the threshold value Th1 in step ST124, the identical-faces-merging processor 105 directly proceeds to step ST1203.

Furthermore, the identical-faces-merging processor 105 may make the determination in step ST1202 of the flowchart of FIG. 25 only in accordance with the detection-frame information items of the face images or the information on the interval between the frames of the face images.

Face Clustering Unit

When the end of the moving-image stream is reached, the face clustering unit 106 performs clustering processing on the face images ultimately stored in the identical-faces-merging processor 105 so that face images of an identical person are assigned to a single cluster. In this way, characters in the moving-image stream are classified. In accordance with a result of the clustering processing, the face clustering unit 106 determines a representative face image from among a plurality of face images included in the single cluster.

Figure 29:
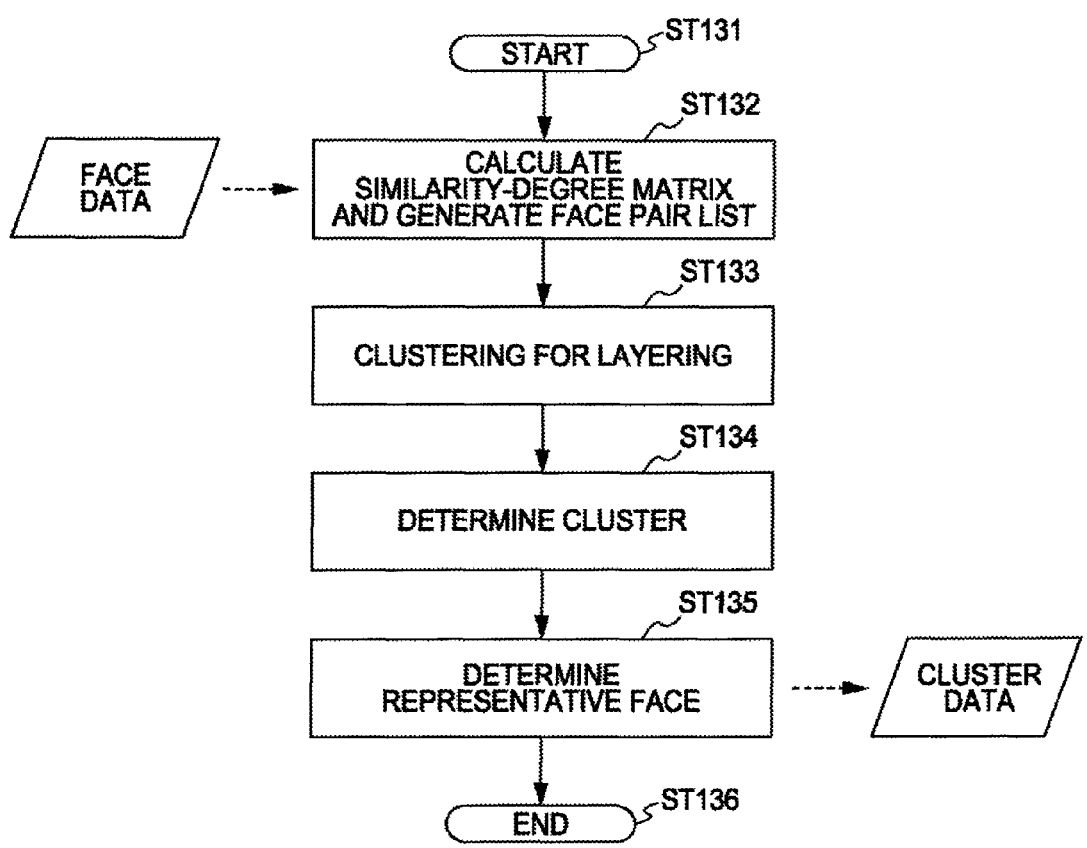
FIG. 29 is a flowchart illustrating a procedure of face clustering processing performed by the face clustering unit.

FIG. 29 is a flowchart illustrating a procedure of the face clustering processing performed by the face clustering unit 106.

The face clustering unit 106 starts the processing in step ST131, and proceeds to step ST132. In step ST132, the face clustering unit 106 calculates a similarity matrix. That is, the face clustering unit 106 calculates degrees of similarity of pairs of face images extracted from among face images ultimately stored by the identical-faces-merging processor 105 in accordance with feature values (local-feature-value vectors) of the pairs of face images. Therefore, the face clustering unit 106 corresponds to a similarity calculation unit. A method for obtaining the degrees of similarity is the same as that described in the description about the identical-faces-merging processor 105.

It is assumed that n face images are ultimately stored by the identical-faces-merging processor 105, and the n face images have individual face IDs f1 to fn. In this case, the face clustering unit 106 calculates the degrees of similarity of the pairs of face images corresponding to hatched portions of FIG. 30.

Furthermore, the face clustering unit 106 generates and stores a face-pair list by sorting the pairs of face images in a descending order of degrees of similarity in accordance with results of the calculations of the similarity matrix as shown in FIG. 31. The face-pair list includes "rank", "pair", and "degree of similarity" as items. In the item of "pair", face IDs of pairs of face images are listed. In the item of "degree of similarity", the calculated degrees of similarity are listed.

Figure 32:
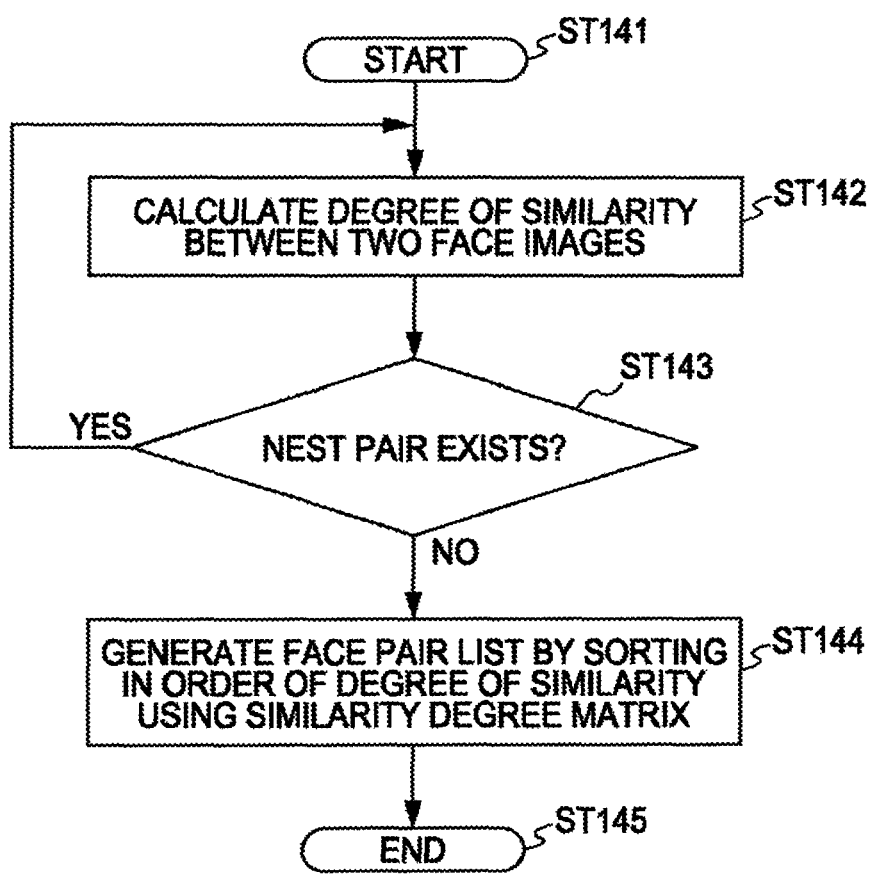
FIG. 32 is a flowchart illustrating a procedure of the calculations using the similarity matrix and processing of generating the face-pair list performed by the face clustering unit.

FIG. 32 is a flowchart illustrating a procedure of the calculation of the similarity matrix and processing of generating the face pairs list performed by the face clustering unit 106. The face clustering unit 106 starts the processing in step ST141, and proceeds to step ST142. In step ST142, the face clustering unit 106 calculates a degree of similarity of one of the pairs of face images. In step ST143, the face clustering unit 106 determines whether the next pair exists. When the determination is affirmative in step ST143, the face clustering unit 106 returns to step ST142, and calculates a degree of similarity of the next pair of face images.

When the determination is negative in step 7143, the face clustering unit 106 determines that the similarity matrix shown in FIG. 30 is completed, and proceeds to step ST144. In step ST144, the face clustering unit 106 sorts the pairs of face images in an order of the degrees of similarity using the similarity matrix so as to generate the face-pair list (refer to FIG. 31). After step ST144, the face clustering unit 106 proceeds to step ST145 where the processing is terminated.

Referring back to the flowchart of FIG. 29, the face clustering unit 106 performs layering/clustering processing in step ST133. In this case, the face clustering unit 106 performs the layering/clustering processing in accordance with the face-pair list (refer to FIG. 31) generated in step ST132. In this case, the face clustering unit 106 generates a layered structure using a clustering method referred to as "Single Linkage". Therefore, the face clustering unit 106 corresponds to a layering/clustering unit.

Specifically, the face clustering unit 106 determines the face images which have been ultimately stored by the identical-faces-merging processor 105 as individual clusters, and generates a number of leaves in the lowermost layer corresponding to the face images. Thereafter, the face clustering unit 106 refers to the face-pair list generated in step ST132, and successively merges the clusters including the face IDs corresponding to the pairs of face images in an order of the degrees of similarity so as to finally obtain a single cluster.

The face clustering unit 106 stores node data items representing nodes included in the layered structure. FIG. 33 is a diagram illustrating a configuration of each of the node data items. Each of the node data items includes a node number, upper-node information, lower-node information, and a leaf list. The node number is an ID unique to each of the nodes. The upper-node information is a pointer to an upper-layer node, and is "NULL" in node data item of the uppermost node. The lower-node information is a pointer to a lower-layer node, and is "NULL" in node data items of the lowermost node. The leaf list is a list of face IDs of leaves in the lowermost layer (terminal nodes) which have been retained, a single face ID is included in each of the node data items of the terminal nodes (lowermost layer).

FIG. 34 is a diagram illustrating an example of the layered structure of the nodes. In this layered structure of the nodes, 15 face images are finally stored by the identical-faces-merging processor 105, and face IDs f1 to f15 are assigned to the individual 15 face images. In this case, 15 lowermost leaves (terminal nodes) are generated. In the example of FIG. 34, node numbers 1 to 15 are assigned to the terminal nodes corresponding to the face IDs f1 to f15 for simplicity.

Referring back to the face-pair list of FIG. 31, since the first rank is assigned to a pair (f1, f3), a parent node having a node number of 16 is generated as an upper node of nodes which have node numbers of 1 and 3 and which include the face IDs f1 and f3, respectively, in the leaf lists thereof. Then, since the second rank is assigned to a pair (f7, f12), a parent node having a node number of 17 is generated as an upper node of nodes which have node numbers of 7 and 12 and which include the face IDs f7 and f12, respectively, in the leaf lists thereof.

Then, since the third rank is assigned to a pair (f11, f9), a parent node having a node number of 18 is generated as an upper node of nodes which have node numbers of 11 and 9 and which include the face IDs f11 and f9, respectively, in the leaf lists thereof. Then, since the fourth rank is assigned to a pair (f15, f9), a parent node having a node number of 19 is generated as an upper node of nodes which have node numbers of 15 and 18 and which include the face IDs f15 and f9, respectively, in the leaf lists thereof. In this way, the layered structure of the nodes is generated.

FIG. 35 is a diagram illustrating a concrete example of the 19th node data in the layered structure of the nodes. A node number "19" is assigned to the 19th node data. Upper-node information represents a pointer toward the 26th node. Lower-node information represents pointers toward the 15th and 18th node. A leaf list represents face IDs o leaves in the lowermost layer which have been retained, that is, the face IDs f9, f11, and f15.

Figure 36:
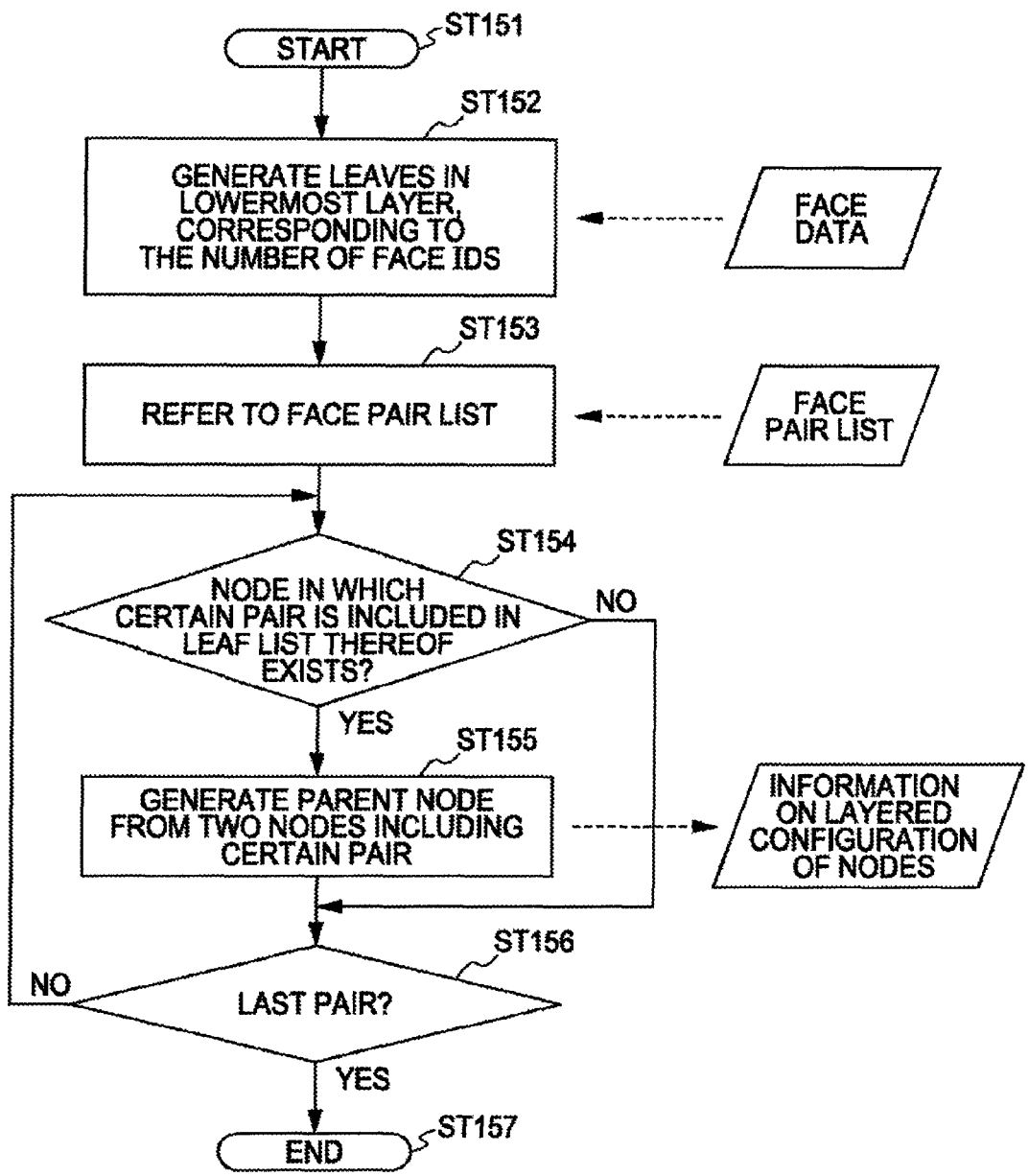
FIG. 36 is a flowchart illustrating a procedure of the layered clustering processing performed by the face clustering unit.

FIG. 36 is a flowchart illustrating a procedure of the layered clustering processing performed by the face clustering unit 106. The face clustering unit 106 starts the processing in step ST151, and proceeds to step ST152. In step ST152, the face clustering unit 106 generates a number of leaves in the lowermost layer corresponding to the face IDs. In step ST153, the face clustering unit 106 refers to the face-pair list.

In step ST154, the face clustering unit 106 determines whether two nodes each having leaf lists including the pair of face IDs of the first rank are included in the generated leaves. When the determination is affirmative in step ST154, the face clustering unit 106 proceeds to step ST155, and generates a parent node of the two nodes corresponding to the pair of face IDs of the first rank in step ST155.

After step ST155, the face clustering unit 106 proceeds to step ST156. When the determination is negative in step ST154, the face clustering unit 106 directly proceeds to step ST156. In step ST156, the face clustering unit 106 determines whether a pair of face IDs having the lowest rank has been reached. When the determination is negative in step ST156, the face clustering unit 106 returns to step ST154 where the processing is performed with reference to a pair of face IDs having the next rank. On the other hand, when the determination is affirmative in step ST156, the face clustering unit 106 terminates the processing in step ST157.

Referring back to the flowchart of FIG. 29, the face clustering unit 106 performs cluster-determining processing in step ST134. In this case, the face clustering unit 106 adjusts the clusters by over-merging determination. Specifically, the face clustering unit 106 performs the over-merging determination as follows. The face clustering unit 106 performs a determination as to whether over-merging occurs on the clusters starting from the cluster in the uppermost layer in accordance with information items regarding the clusters (information on the layered structure of the nodes) in a tree-shaped structure obtained by the clustering processing for layering in step ST133. Then, the face clustering unit 106 divides a cluster determined to have been over-merged into two original clusters before being merged by the layering/clustering processing of step ST133. The clusters are thus determined. Therefore, the face clustering unit 106 corresponds to a cluster determination unit.

Figure 37:
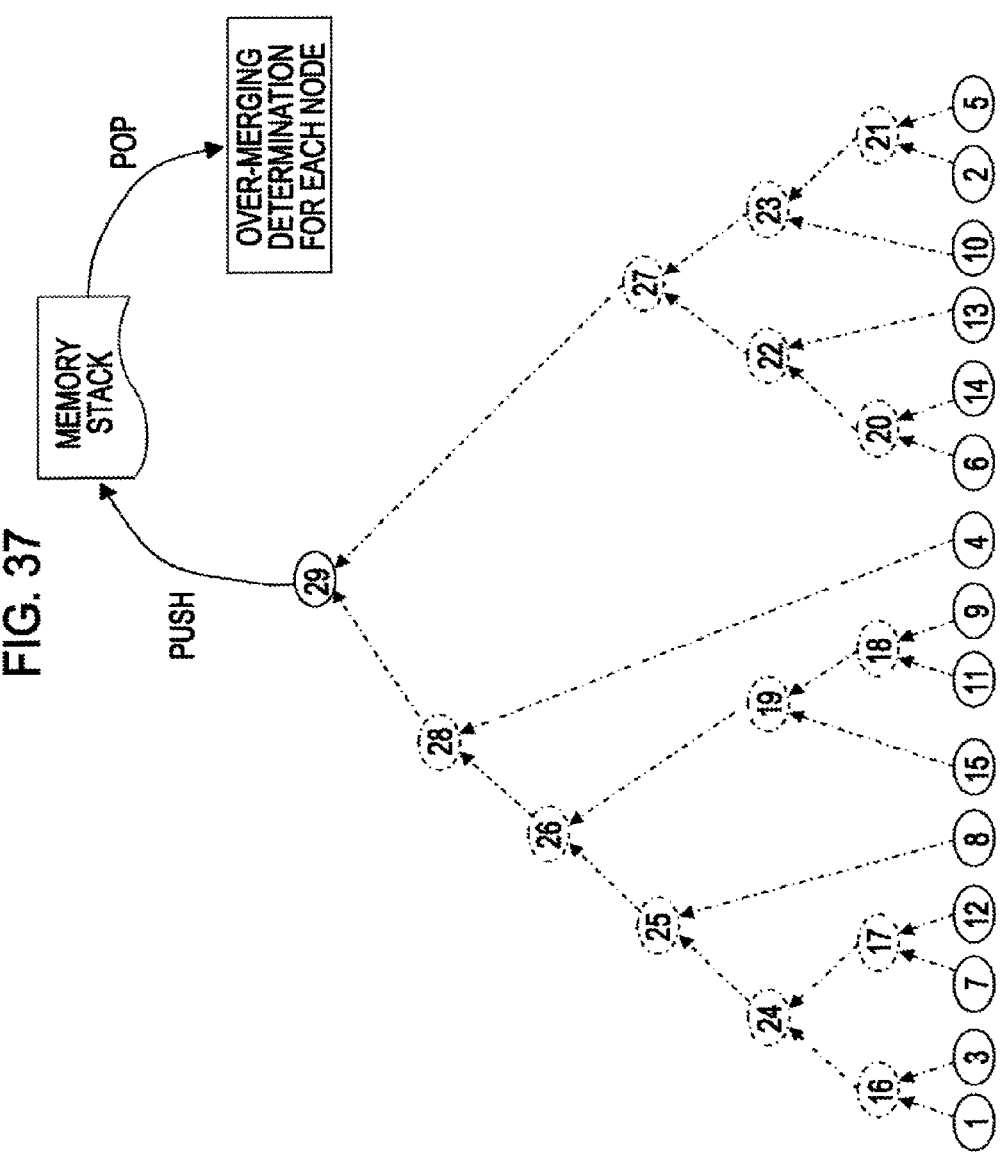
FIG. 37 is a diagram illustrating processing of sequentially stacking nodes from the uppermost nodes so that it is determined whether over-merging occurred in cluster determination processing performed by the face clustering unit.

As shown in FIG. 37, the face clustering unit 106 successively stacks (pushes) the nodes starting from the uppermost node in a stack (memory stack), and thereafter, extracts (pops) the nodes so as to perform the over-merging determination for individual nodes.

Figure 38:
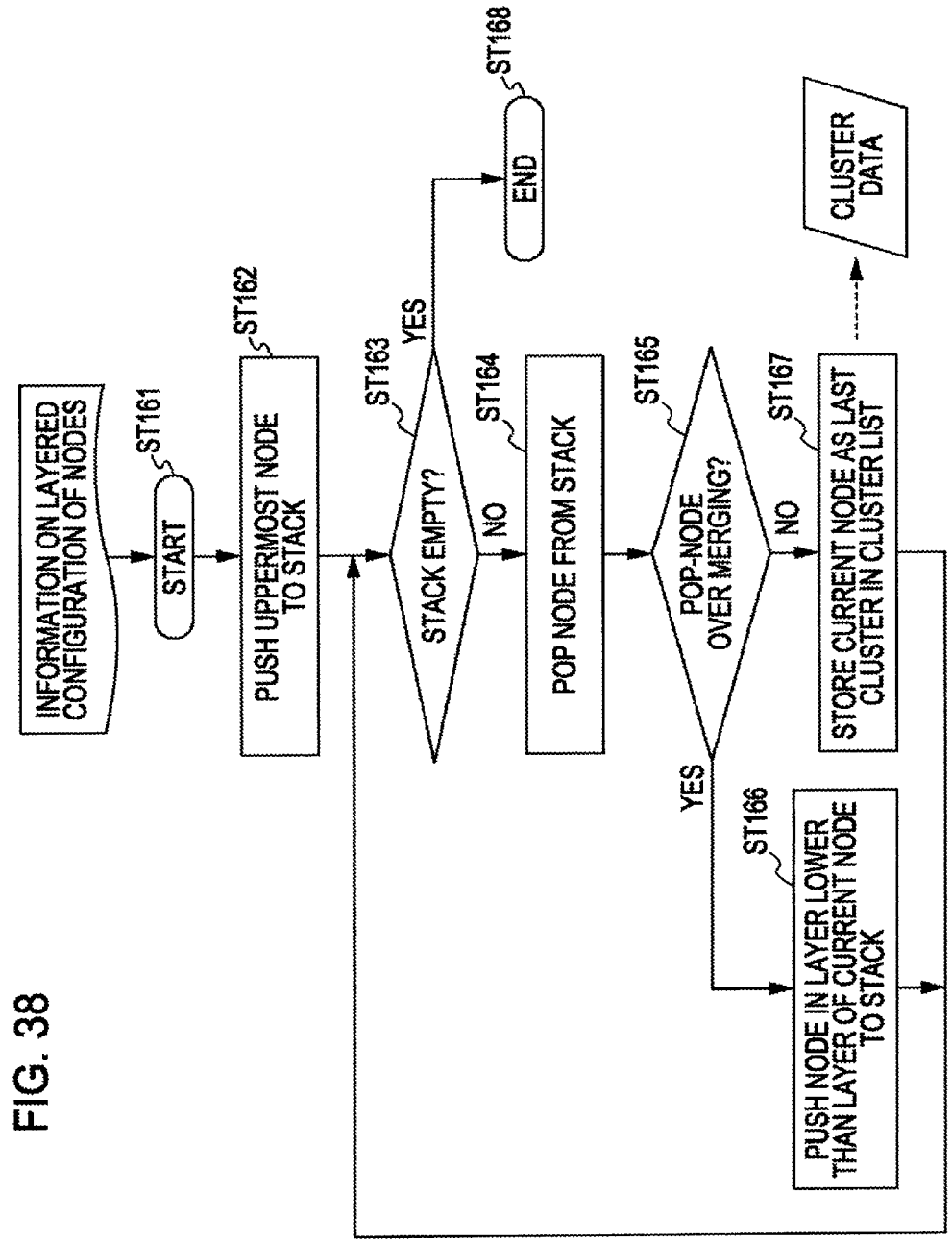
FIG. 38 is a flowchart illustrating a procedure of the cluster determination processing performed by the face clustering unit.

FIG. 38 is a flowchart illustrating a procedure of the cluster determination processing performed by the face clustering unit 106. The face clustering unit 106 starts the processing in step ST161, and proceeds to step ST162. In step ST162, the face clustering unit 106 pushes the uppermost node into the stack.

In step ST163, the face clustering unit 106 determines whether the stack is empty. When the determination is negative in step ST163, the face clustering unit 106 pops one of nodes included in the stack in step ST164.

In step ST165, the face clustering unit 106 determines whether the popped node has been over-merged. When the determination is affirmative in step ST165, the face clustering unit 106 proceeds to step ST166, and pushes nodes in a layer immediately lower than the current node into the stack. Thereafter, the face clustering unit 106 returns to step ST163, and performs the processing described above again. On the other hand, when the determination is negative in step ST165, the face clustering unit 106 proceeds to step ST167 where the face clustering unit 106 determines the current node to be the final cluster and stores the current node in a cluster list. Thereafter, the face clustering unit 106 returns to step ST163, and performs the processing described above again.

When the determination is affirmative in step ST163, the face clustering unit 106 directly proceeds to step ST168 where the processing is terminated.

Figure 39:
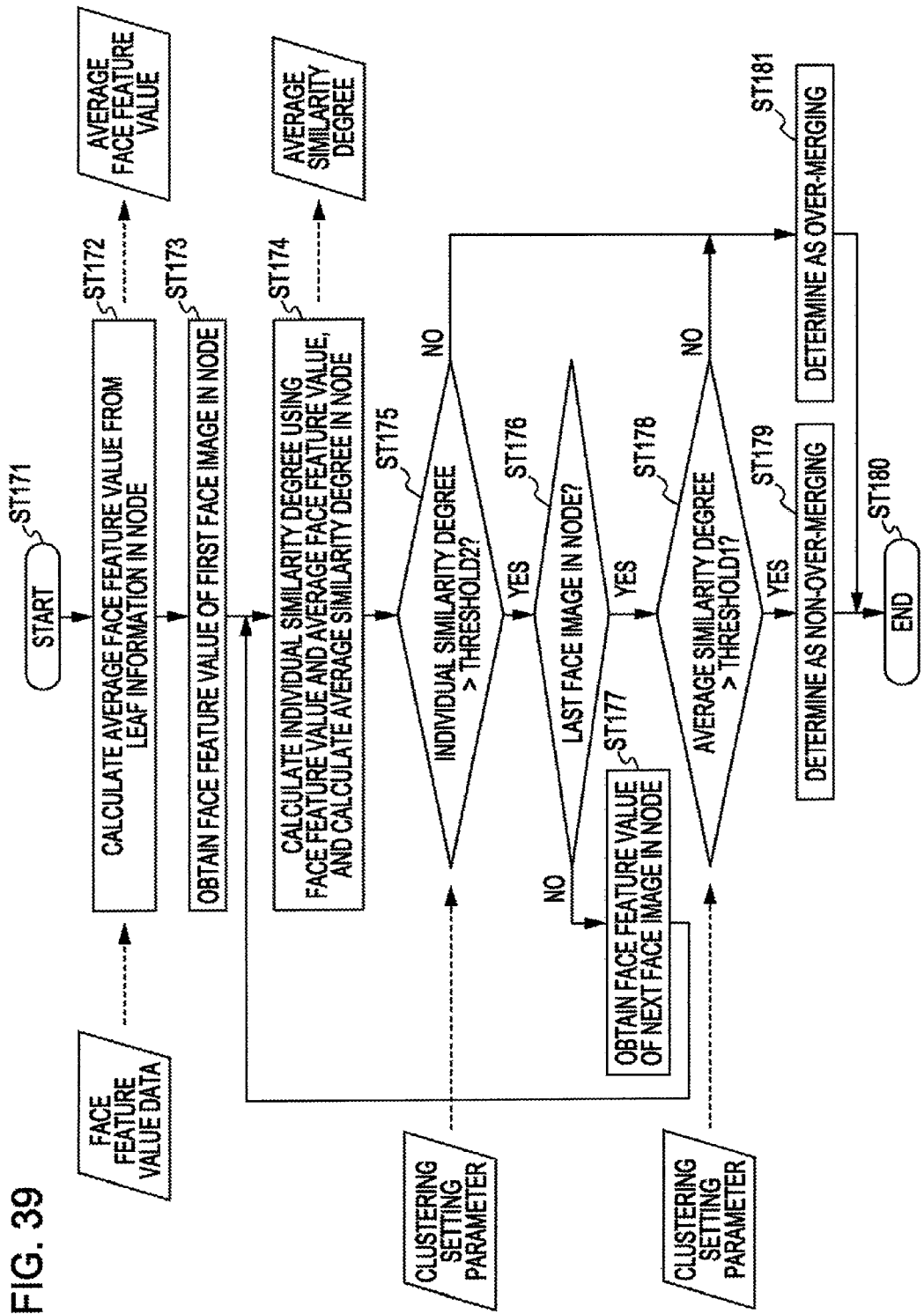
FIG. 39 is a flowchart illustrating a procedure of cluster over-merging determination processing performed by the face clustering unit.

The cluster over-merging determination processing performed in step ST165 will be described in detail. FIG. 39 is a flowchart illustrating a procedure of the cluster over-merging determination processing performed by the face clustering unit 106. In step ST171, the face clustering unit 106 starts processing, and proceeds to step ST172. In step ST172, for each of the nodes, in accordance with a leaf list of a node of interest, the face clustering unit 106 obtains an average face feature value of face images in which the face IDs thereof are included in the leaf list of the node of interest. Therefore, the face clustering unit 106 corresponds to an average-feature-value calculation unit.

Figure 40:
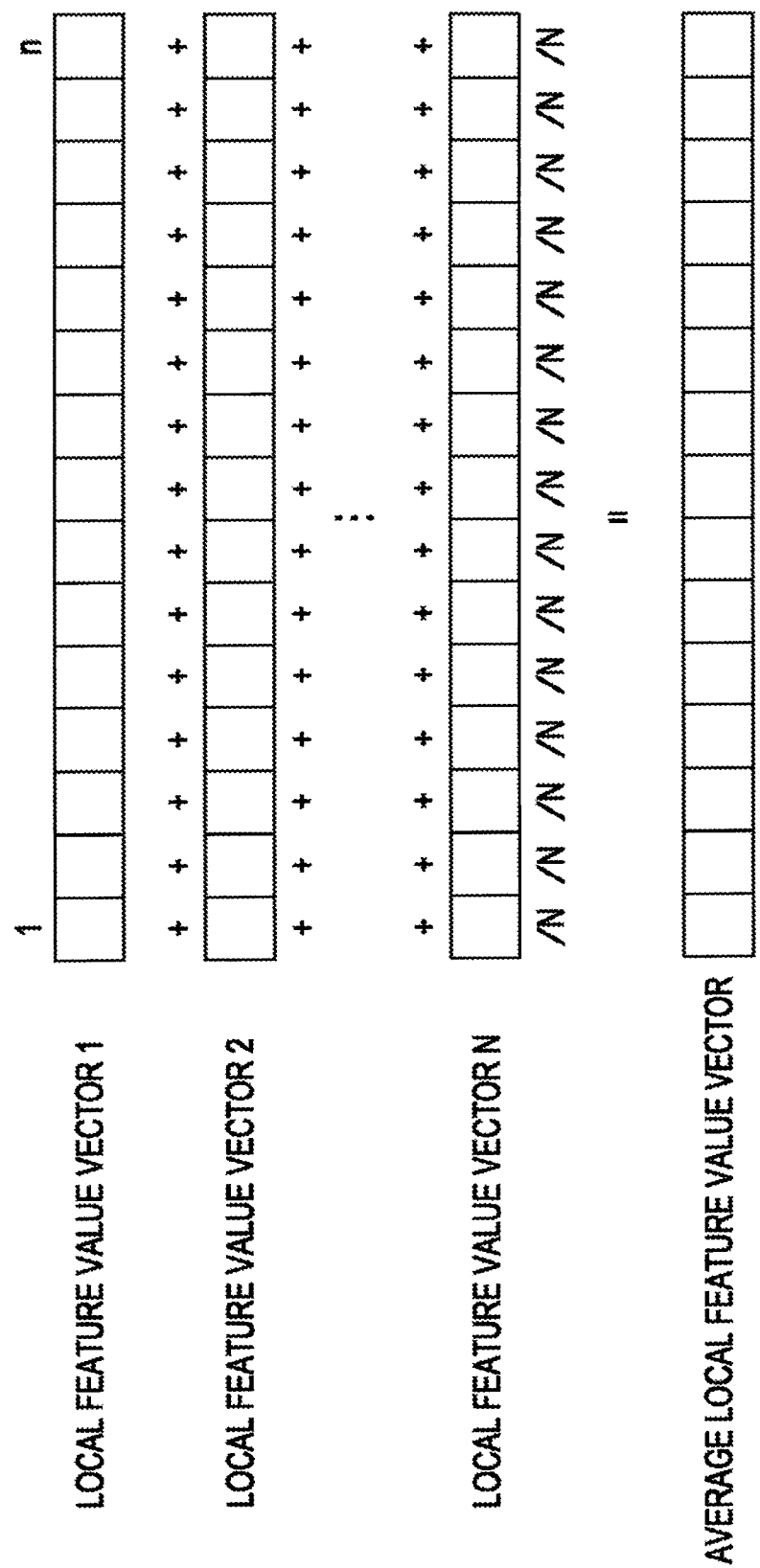
FIG. 40 is a diagram illustrating a calculation of an average-local-feature-value vector (average feature value)

In this embodiment, the face feature values correspond to the local-feature-value vectors calculated by the face-feature-value calculation unit 103 (refer to Expression (12)). Therefore, when N face IDs are included in the leaf list, the face clustering unit 106 adds the local-feature-value vectors corresponding to the N face images for individual elements included in the local-feature-value vectors and obtains averages of the individual elements whereby the average local-feature-value vector is obtained in step ST172 as shown in FIG. 40.

In step ST173, the face clustering unit 106 obtains a face feature value of a first face image included in the node of interest. In step ST174, the face clustering unit 106 calculates individual-similarity-degree which is a degree of similarity between the average face feature value obtained in step ST172 and the face feature value, obtained in step ST173. Furthermore, in step ST174, the face clustering unit 106 obtains an average similarity degree which is an average value of the currently obtained individual-similarity-degree and a previously obtained individual-similarity-degree.

In step ST175, the face clustering unit 106 determines whether the individual-similarity-degree obtained in step ST174 is larger than a threshold value for a comparison with the individual-similarity-degree. It is assumed that the average feature value obtained in step ST172 is represented by $f_{average}$, the face feature value obtained in step ST173 is $f_i$, the individual-similarity-degree obtained in step S174 is represented by Similarity ($f_i$, $f_{average}$), and the threshold value for a comparison with the individual-similarity-degree is represented by Threshold2.

In this case, in step ST175, the face clustering unit 106 determines whether Similarity ($f_i$, $f_{average}$) is larger than Threshold2. Note that "i" of "$f_i$" represents that this face feature value is for the i-th face image in the rode.

When the determination is affirmative in step ST175, the face clustering unit 106 proceeds to step ST176 and determines whether all the face images have been processed. When the determination is negative in step ST176, the face clustering unit 106 proceeds to step S177, and obtains a face feature value of the next face image in the node. Thereafter, the face clustering unit 106 returns to step ST174, and performs the processing described above again.

On the other hand, when the determination is affirmative in step ST176, the face clustering unit 106 proceeds to step ST178. In step S178, the face clustering unit 106 determines whether the average similarity degree ultimately obtained in step ST174 is larger than a threshold value for a comparison with the average similarity degree.

It is assumed that the average similarity value ultimately obtained in step ST172 is represented by Average(Similarity ($f_i$, $f_{average}$)) and the threshold value for a comparison with the average similarity degree is represented by Threshold1. In this case, the face clustering unit 106 determines whether Average(Similarity($f_i$, $f_{average}$) is larger than Threshold1 in step ST178.

When the determination is affirmative in step ST178, the face clustering unit 106 proceeds to step ST179, and determines that the node of interest (popped node) is not an over-merged node. Thereafter, the processing is terminated in step ST180.

When the determination is negative in step ST175 or step ST178, the face clustering unit 106 determines that the node of interest (popped node) is an over-merged node in step ST181. Thereafter, the processing is terminated in step ST180.

The threshold value Threshold2 for a comparison with the individual-similarity-degree and the threshold value Threshold1 for a comparison with the average similarity degree used in step ST175 and step ST178, respectively, in the cluster over-merging determination processing shown in FIG. 39 are clustering setting parameters. Although not mentioned above, the face clustering unit 106 is connected to a user setting unit 107 (refer to FIG. 1). The user arbitrarily sets the threshold value Threshold2 for a comparison with the individual-similarity-degree and the threshold value Threshold1 for a comparison with the average similarity degree using the user setting unit 107.

Figure 41:
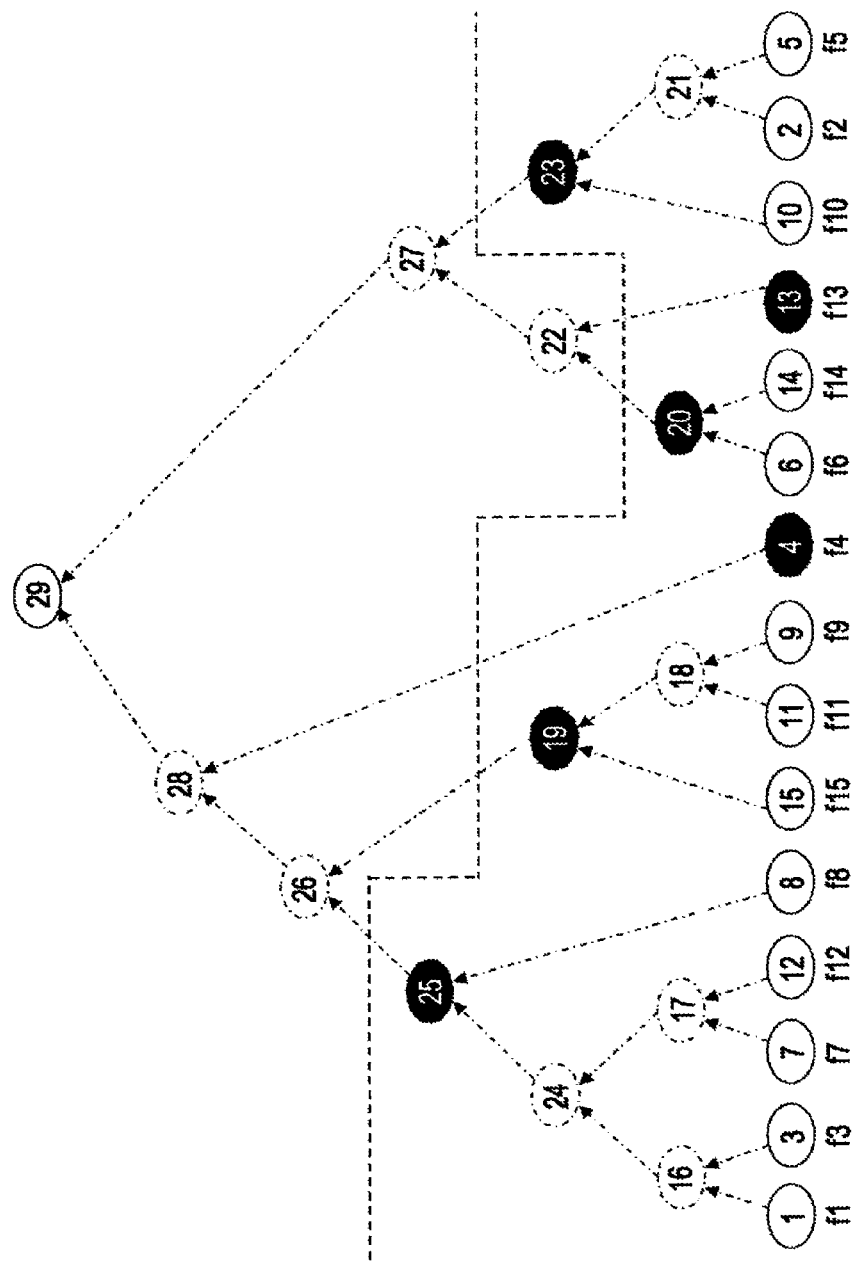
FIG. 41 is a diagram illustrating an example of determination of clusters in cluster determination processing.

FIG. 41 is a diagram illustrating an example of the determination of clusters in the cluster determination processing shown in the flowchart of FIG. 38. In this example of the cluster determination, nodes corresponding to node numbers 25, 19, 4, 20, 13, and 23 are stored in the cluster list as final clusters.

Referring back to the flowchart of FIG. 29, the face clustering unit 106 performs representative-face determination processing in step ST135. In this case, the face clustering unit 106 determines a representative face image among a plurality of face images included in each of clusters obtained as results of the clustering professing. Therefore, the face clustering unit 106 corresponds to a representative-face determination unit. The face clustering unit 106 determines, for each of the clusters which includes the plurality of face images, a representative face image on the basis of face-rotation-angle information items (roll, pitch, and yaw), smile scores, and contrast scores of the plurality of face images.

Figure 42:
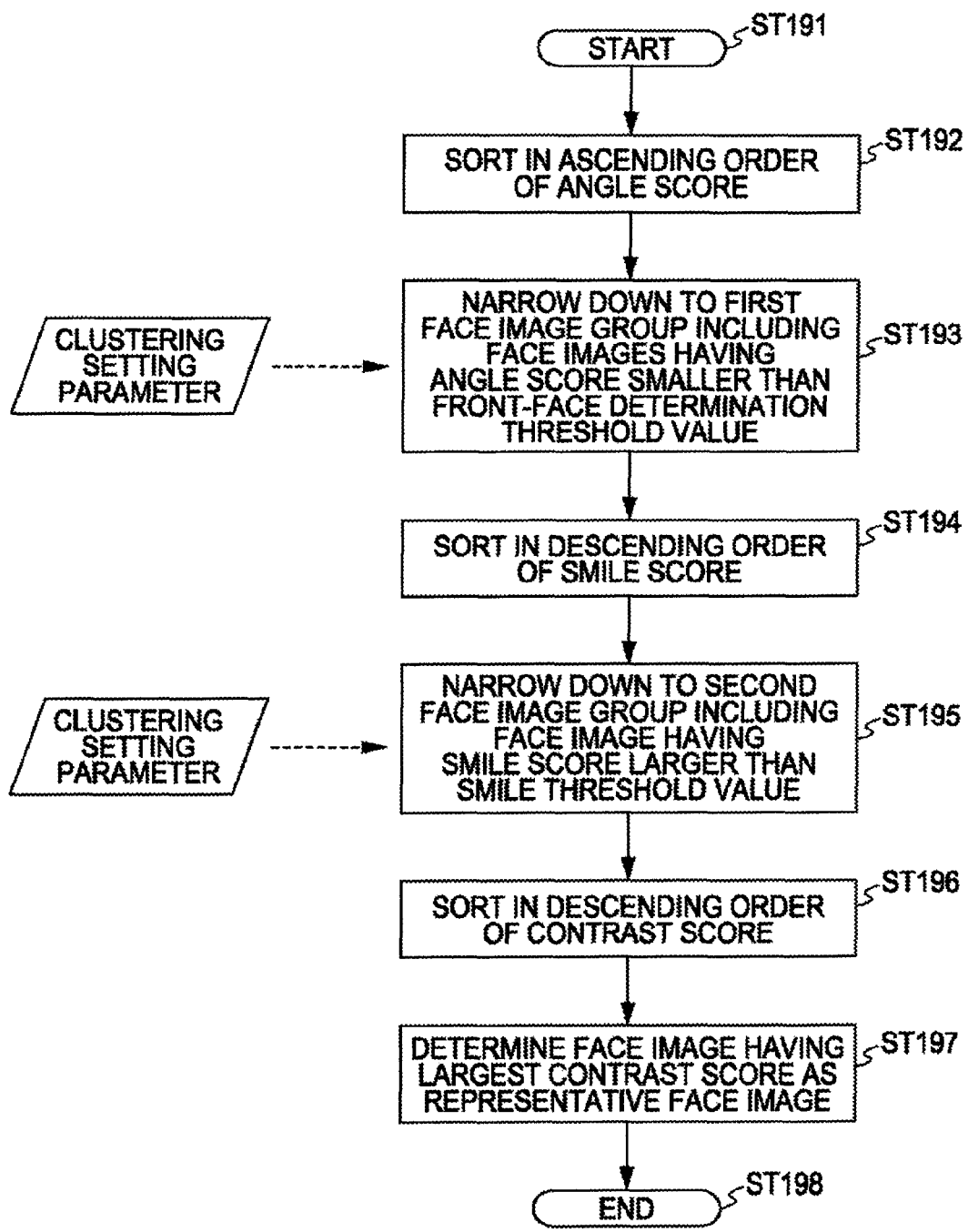
FIG. 42 is a flowchart illustrating a procedure of representative-face determination processing performed by the face clustering unit.
Figure 43A:
FIGS. 43A to 43D are diagrams illustrating processing of determining that a face image which is a front-face image and which has uniform luminance is a representative face image, for example, from among a face image which is not a front-face image, a face image which is a front-face image and which has uniform luminance, a face image which is a front-face image and which has poor luminance, and a face image which is a blurred face image.
Figure 43B:
Figure 43C:
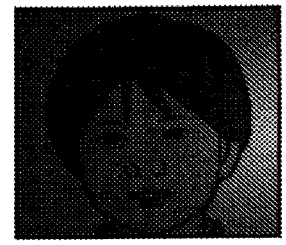
Figure 43D:

FIG. 42 is a flowchart illustrating a procedure of the representative-face determination processing performed by the face clustering unit 106. The face clustering unit 106 starts the processing in step ST191, and proceeds to step ST192. In step ST192, the face clustering unit 106 calculates angle scores $S_{front}$ of a plurality of face images included in a cluster of interest. The angle scores $S_{front}$ of the face images are calculated using roll angles, pitch angles, and yaw angles which are face-rotation angle information items of the face images in a still-image frame of interest in accordance with Expression (30). In Expression (30), coefficients a, b, and c correspond to weighting coefficients for individual angles.

$$S_{front}=a|\text{roll}|+b|\text{pitch}|+c|\text{yaw}| \tag{30}$$

In step ST192, the face clustering unit 106 sorts the face images in an ascending order of the angle scores $S_{front}$ of the face images calculated as described above. Note that as the angle scores $S_{front}$ of the face images are small, directions of faces corresponding to the face images are closer to the front. In step ST193, the face clustering unit 106 reduces the number of face images so as to obtain a first face-image group including face images having angle scores smaller than a front-face-determination threshold value.

In step ST194, the face clustering unit 106 sorts the face images included in the first face-image group in a descending order of the smile scores. In step ST195, the face clustering unit 106 reduces the number of face images so as to obtain a second face-image group including face images having smile scores larger than a smile threshold value.

In step ST196, the face clustering unit 106 sorts the face images included in the second face-image group in a descending order of the contrast scores. In step ST197, the face clustering unit 106 determines that, among the face images included in the second face-image group, a face image having the largest contrast score to be a representative face image. After step ST197, the face clustering unit 106 proceeds to step ST198 where the processing is terminated.

By performing the representative-face determination processing shown in the flowchart of FIG. 42, the face clustering unit 106 determines, among the plurality of face images included in the cluster of interest, a face image in which a direction of a face corresponding to the face image is closer to the front and which has a high smile score and a high contrast score to be a representative face image. It is assumed that four face images, i.e., a face image which does not correspond to a front face, a face image which corresponds to a front face and which has a uniform luminance, a face image which corresponds to the front face and which has nonuniform luminance, and a face image which corresponds to the front face and which is a blurred face image, as shown in FIGS. 43A to 43D, respectively, are included in a cluster. In this case, the face image which corresponding to the front face and which has the uniform luminance is determined to be a representative face image.

Note that the front-face-determination threshold value and the smile threshold value used in step ST193 and step ST195, respectively, in the representative-face determination processing shown in the flowchart of FIG. 42 are clustering setting parameters. The user arbitrarily sets the front-face-determination threshold value and the smile threshold value using the user setting unit 107 (refer to FIG. 1).

Although all the face-rotation-angle information items, the smile scores, and the contrast scores are used in the representative-face determination processing shown in the flowchart of FIG. 42, all of them are not necessarily used for the representative-face determination processing. That is, only some of them may be used for the representative-face determination processing. Furthermore, although a face image having a high degree of smile is determined to be a representative face image using the smile scores, a face image having a high degree of other facial expression may be determined to be the representative face image. In this case, scores of other facial expression are calculated instead of the smile scores using the face-feature-value calculation unit 103, and the obtained scores are used for the representative-face determination processing.

The face clustering unit 106 outputs data items regarding the clusters determined to be the final clusters in the cluster determination processing. The data items regarding the clusters represent character data items which are used to display the characters in the moving-image stream with less overlaps of character data items representing an identical person.

Referring back to the flowchart of FIG. 29, after step ST135, the face clustering unit 106 proceeds to step ST136 where the processing is terminated.

Accuracy-Evaluation Algorithm of Face Clustering

An accuracy-evaluation algorithm of the face clustering processing will be described. The threshold value Threshold2 for a comparison with the individual-similarity-degree and the threshold value Threshold1 for a comparison with the average similarity degree used in the cluster over-merging determination processing performed by the face clustering unit 106 are determined in accordance with the accuracy-evaluation algorithm of the face clustering processing.

Figure 44:
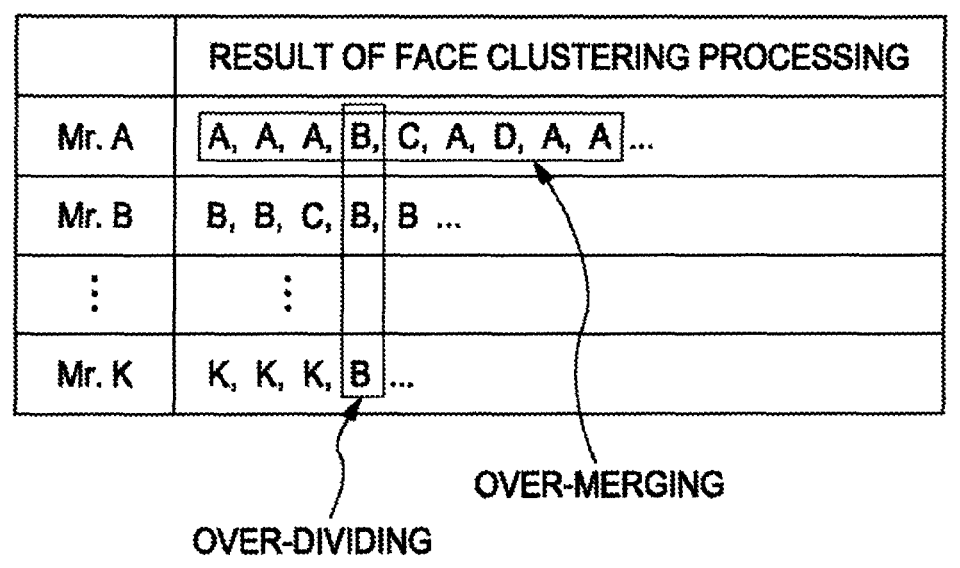

FIG. 44 is a diagram illustrating an example of a result obtained when the face clustering processing is performed on a plurality of face images representing persons "Mr. A" to "Mr. K". In this case, it is possible that a cluster of a predetermined person includes face images of other persons. For example, as shown in the example of the result of FIG. 44, a cluster of "Mr. A" includes face images "Mr. B", "Mr. C", and "Mr. D". A state in which face images representing different persons are mistakenly determined to be face images representing an identical person means over-merging. Furthermore, in the example of the result, in addition to a cluster of "Mr. B", clusters of "Mr. A" and "Mr. K" include face images of "Mr. B". A state in which face images representing an identical person are mistakenly determined to be face images of different persons means over-dividing.

FIG. 45 is a confusion table representing the relationships between predicting results and actual results. In this confusion table, c(i, j) denotes the number of face images of a person j included in a cluster of a person i. FIG. 46 is a confusion table obtained when ideal face clustering processing is performed. In this case, when j is not equal to i, c(i, j) is 0. That is, the number of face images of the person j included in the cluster of the person i is 0.

Figure 47:
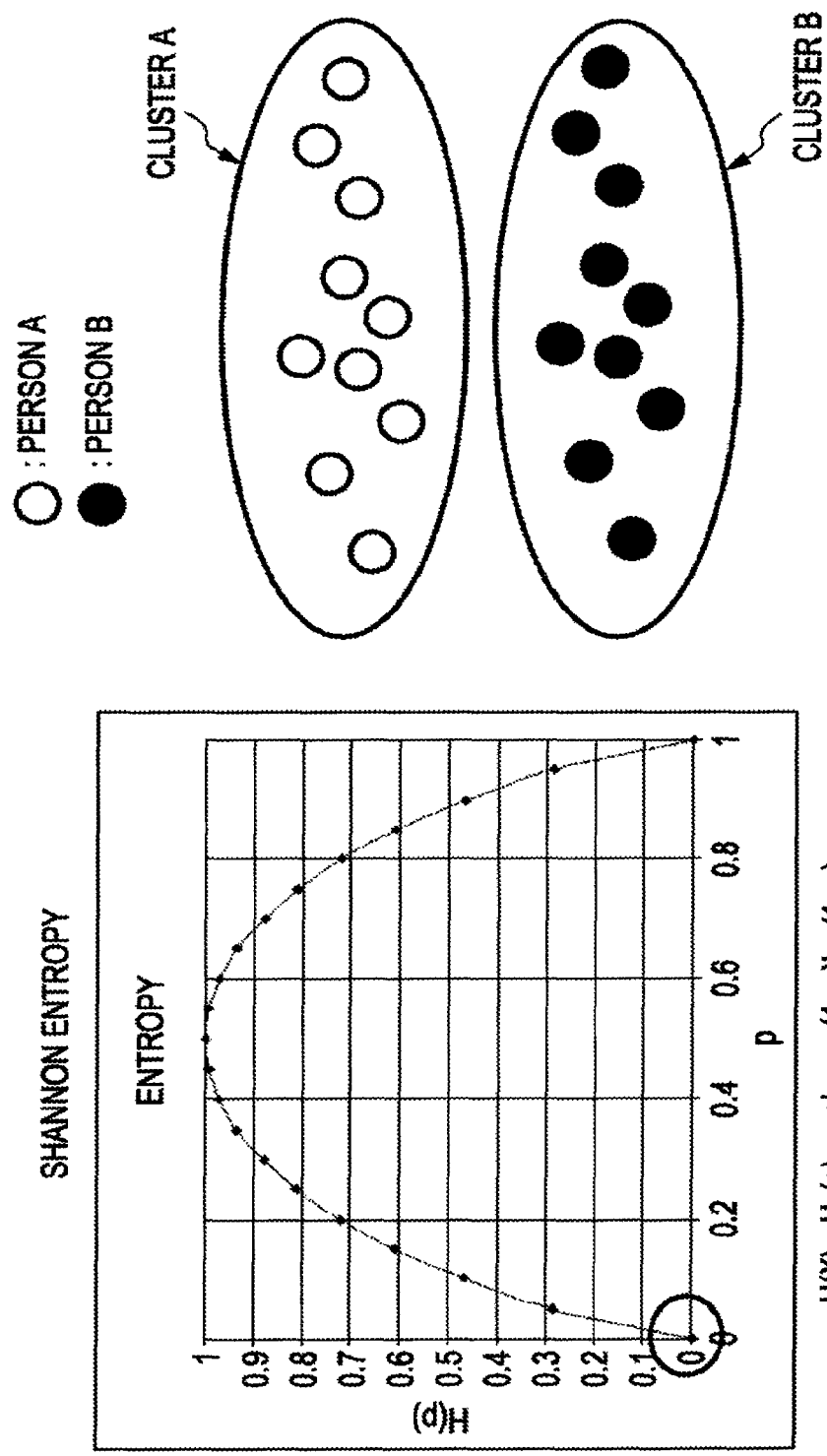
FIG. 47 is a first diagram illustrating the relationships between results of clustering (classification) and entropies (average information values)
Figure 48:
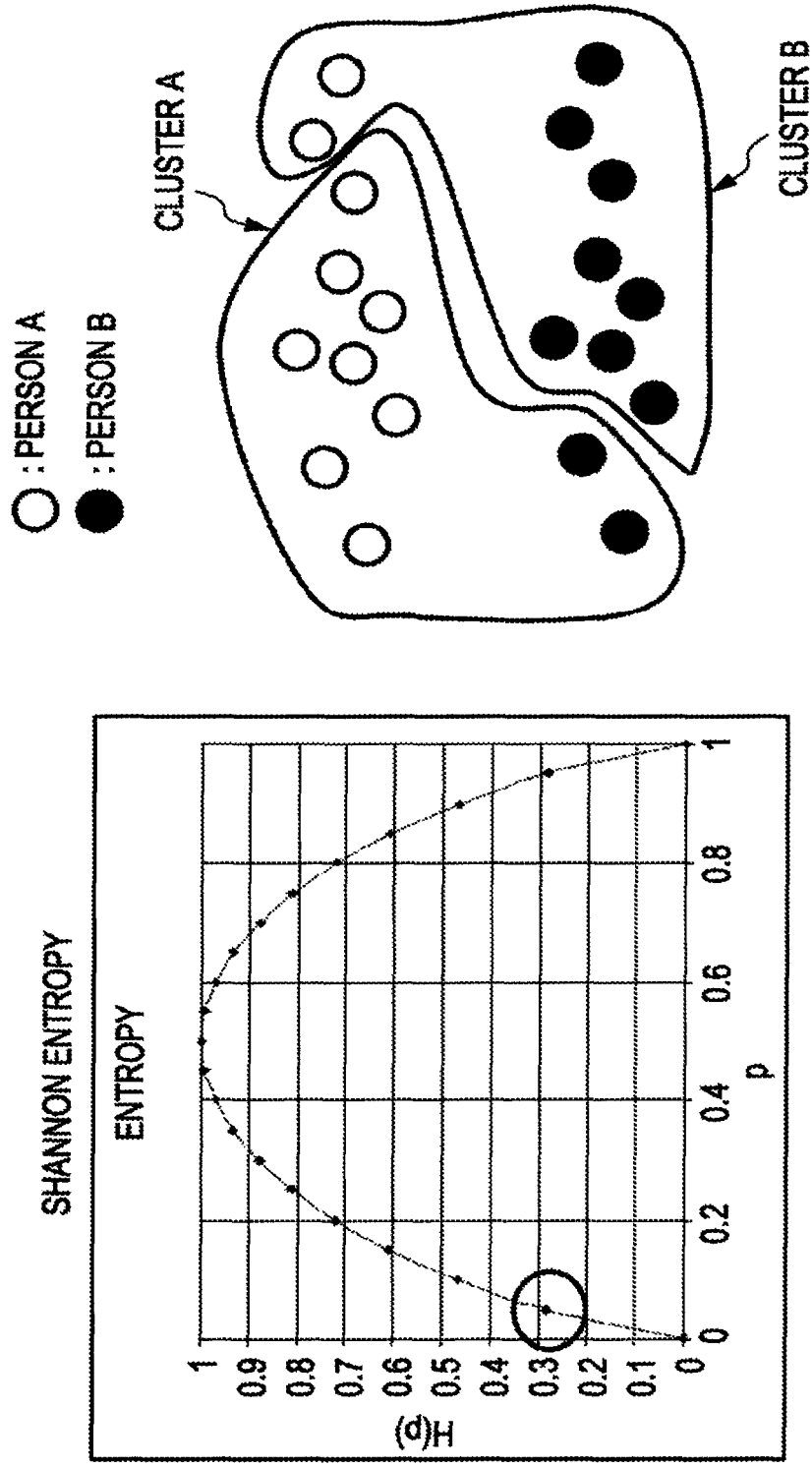
FIG. 48 is a second diagram illustrating the relationships between results of clustering (classification) and entropies (average information values)
Figure 49:
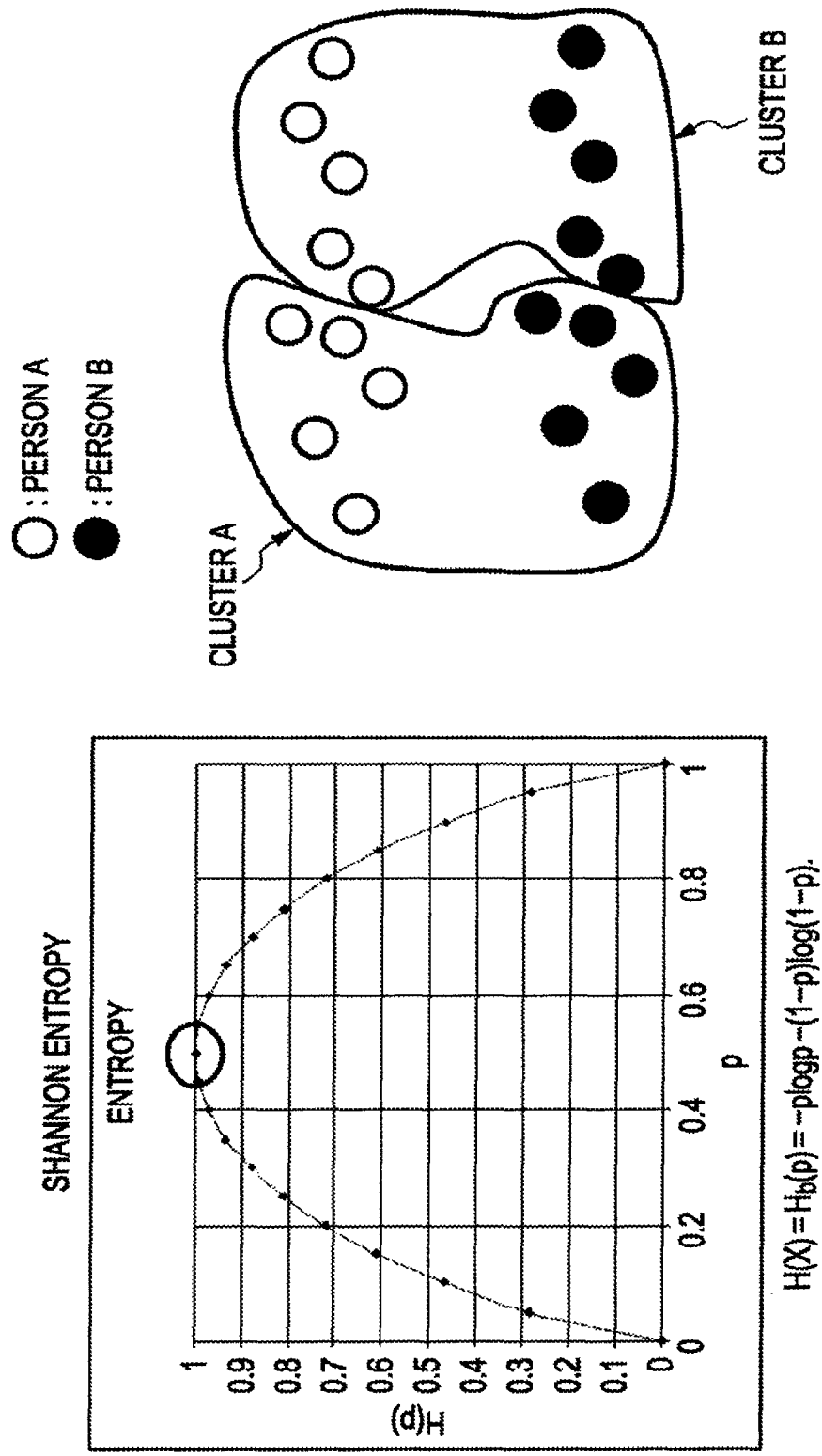
FIG. 49 is a third diagram illustrating the relationships between results of clustering (classification) and entropies (average information values)

Thinking about entropy (average information value), when face images of persons A and B are accurately classified into clusters A and B, respectively, as shown in FIG. 47, an entropy H(X) is 0. However, when the ace images of the persons A and B are classified so that each of the clusters A and B includes some of the face images of the other person as shown in FIG. 48, the entropy H(X) is larger than 0. Furthermore, when the face images of the persons A and B are classified so that each of the clusters A and B includes half the face images of the other person as shown in FIG. 49, which is a worst classification, the entropy H(X) is 1.

In the accuracy-evaluation algorism of the face clustering, a combination of two different concepts, that is, the confusion table (refer to FIG. 45) and the entropy, are used so that an over-merging score SCRc and an over-dividing score SCRd are obtained.

That is, the over-merging score SCRc is obtained by obtaining entropies Entropy(row(n)) of individual rows, weighting each of the entropies Entropy(row(n)) by the number of face images of a corresponding one of the rows, and adding the entropies Entropy(row(n)) to one another. The over-dividing score SCRd is obtained by obtaining entropies Entropy(column(m)) of individual columns, weighting each of the entropies Entropy(column(m)) by the number of face images of a corresponding one of the rows, and adding the entropies Entropy(column(m)) to one another. Note that the entropies Entropy (row(n)) and the entropies Entropy (column(m)) are weighted by the number of face images so that as the number of face images included in each of the rows is larger, the rows considerably affects the entropies.

Expression (31) represents the entropies Entropy(row(n)) and Expression (32) represents the over-merging score SCRc. Expression (33) represents the entropies Entropy(column (m)) and Expression (34) represents the over-merging score SCRd.

$$\text{Entropy (row}(n)) = -\sum_{i=1}^{N} q(n, i) \log_{\sum_{i=1}^{N} c(n,i)} (q(n, i)) \tag{31}$$

$$SCRc = \sum_{i=1}^{M} \{p(i) \text{Entropy (row}(i))\} \tag{32}$$

$$\text{Entropy (colum}(m)) = -\sum_{i=1}^{M} p(i, m) \log_{M} (q(i, m)) \tag{33}$$

$$SCRd = \sum_{i=1}^{N} \{q(i) \text{Entropy (colum}(i))\} \tag{34}$$

Furthermore, p(n, m), q(n, m), p(n), and q(m) are obtained by Expressions (35), (36), (37), and (38), respectively.

$$p(n, m) = \frac{c(n, m)}{\sum_{i=1}^{M} c(i, m)} \tag{35}$$

$$q(n, m) = \frac{c(n, m)}{\sum_{i=1}^{N} c(n, i)} \tag{36}$$

$$p(n) = \frac{\sum_{i=1}^{N} c(n, i)}{\sum_{i=1}^{N} \sum_{j=1}^{M} c(j, i)} \tag{37}$$

$$q(m) = \frac{\sum_{i=1}^{M} c(i, m)}{\sum_{i=1}^{N} \sum_{j=1}^{M} c(j, i)} \tag{38}$$

As the threshold value Threshold2 for a comparison with the individual-similarity-degree and the threshold value Threshold1 for a comparison with the average similarity degree used in the cluster over-merging determination processing performed by the face clustering unit 106, values which make the over-merging score SCRc and the over-dividing score SCRd close to 0 are obtained in advance.

As described above, in the image processing apparatus 100 shown in FIG. 1, the identical-faces-merging processor 105 determines whether a person in a face image detected in a current frame is identical to a person in a face image detected in a previous frame which has been stored, in accordance with face feature values of the two face images. When the determination is affirmative, only one of the two face images is stored. Therefore, a still-image frame from which face images are detected by the decoding unit 101 is extracted substantially every seconds, for example. Accordingly, since the number of frames to be analyzed is small, extraction of characters with short analysis time is achieved. In a case where a moving-image stream corresponds to a MPEG stream or an AVC stream, for example, only intraframes included in the stream at predetermined intervals are decoded to be used, that is, full decoding is not performed. Consequently, the analysis time is considerably reduced.

Furthermore, in the image processing apparatus 100 shown in FIG. 1, the identical-faces-merging processor 105 determines whether the person in the current face image and the person in the previous face mage are identical to each other in accordance with detection-frame information items of the two face images and an interval between frames of the two face images, in addition to the face feature values of the two face images. Accordingly, accuracy of the determination is improved. It is assumed that a degree of similarity of the two face images which is obtained using the face feature values of the two face images is low due to change of a lighting condition, for example, even though the two face images represent an identical person. In this case, it is determined that the two face images represent an identical person by determining whether the detection-frame information items of the two face images and the interval between frames of the two face images satisfy predetermined conditions.

Furthermore, in the image processing apparatus 100 shown in FIG. 1, the noise-face removing unit 104 removes a face image which is determined that a predetermined angle with respective to the front, i.e., a yaw angle or a pitch angle thereof, for example, is larger than a threshold value. Therefore, face images representing a face which faces considerably sideways, a face which faces considerably upward, and a face which faces considerably downward are removed. Accordingly, determination accuracies of the identical-faces-merging processor 105 and the face clustering unit 106 are prevented from being deteriorated.

Moreover, in the image processing apparatus 100 shown in FIG. 1, the noise-face removing unit 104 remove a face image which has a contrast score which is calculated by the face-feature-value calculation unit 103 and which is smaller than a threshold value. Therefore, face images which have considerably low contrast and which are blurred face images are removed in advance. Accordingly, determination accuracies of the identical-faces-merging processor 105 and the face clustering unit 106 are prevented from being deteriorated.

In the image processing apparatus 100 shown in FIG. 1, the face clustering unit 106 is arranged in a succeeding stage relative to the identical-faces-merging processor 105. Therefore, the face clustering unit 106 classifies face images in the moving-image stream stored in the identical-faces-merging processor 105 so that face images representing identical persons are assigned to a single cluster. Accordingly, character data is effectively obtained.

In the image processing apparatus 100 shown in FIG. 1, when determining that the face image detected in the current frame and the face image detected in the previous frame represent an identical person, the identical-faces-merging processor 105 stores only one of the two face images. Accordingly, when the end of the moving-image stream is reached, the number of face images ultimately stored in the identical-faces-merging processor 105 is reduced. Consequently, a period of time used for the processing performed by the face clustering unit 106 is reduced.

In the image processing apparatus 100 shown in FIG. 1, the face clustering unit 106 successively performs the similarity matrix calculation, the layering/clustering processing, and the cluster determination processing. Accordingly, clustering in which face images of an identical person are assigned to a single cluster is effectively performed.

In the image processing apparatus 100 shown in FIG. 1, the face clustering unit 106 performs the clustering processing in which, among the face images stored by the identical-faces-merging processor 105, face images of an identical person are assigned to a single cluster, and determines a representative face image for the cluster including the face images. Therefore, in a browser application which displays the face images of the characters in the moving-image stream, overlap of face images of an identical person is prevented, and furthermore, optimum face images are displayed.

Note that, in the image processing apparatus 100 shown in FIG. 1, all the face images ultimately stored by the identical-faces-merging processor 105 are subjected to the face clustering processing performed by the face clustering unit 106. However, the face clustering unit 106 first performs the similarity matrix calculation as described above. Therefore, when the number of the face images (character candidates) ultimately stored by the identical-faces-merging processor 105 is too large, the number of face images to be input to the face clustering unit 106 may be restricted. For example, the maximum number of face images may be determined to be 100 after the priority of the face images to be input is determined by sorting the face images in accordance with sizes of the detection frames, the smile scores, or the contrast scores.

In the image processing apparatus 100 of FIG. 1, the noise-face removing unit 104 is arranged in a proceeding stage relative to the identical-faces-merging processor 105. However, the noise-face removing unit 104 may be eliminated.

In the image processing apparatus 100 of FIG. 1, the moving-image file recorded in the hard disk (HDD) or the memory card is read, for example, and the characters are extracted from the moving-image stream included in the moving-image file. However, this invention is applicable to a case where characters are extracted from a moving-image stream obtained while a moving image is captured using a moving-image capturing apparatus, such as a digital camera recorder (camcorder) or a digital still camera.

In the image processing apparatus 100 shown in FIG. 1, face images are detected from a still-image frame. Similarly, this invention is generally applicable to a case where an image of a specific object is detected.

In the this embodiment, the decoding unit 101 decodes only intra frames (1-Frames). However, the decoding unit 101 may decodes all frames included in a moving-image stream such as an MPEG video signal in a system which allows analysis which takes long time, such as a digital archive system, and may supply the decoded frames to the face detection unit 102, in a succeeding stage for example, to be processed. In this case, when compared with the processing only using the intraframes, a speed of analysis is lowered. However, misses of detections of characters are reduced.

Note that the functional units of the image processing apparatus 100 in this embodiment are realized by hardware or software. When the functional units are realized by software, a computer executes processing of each of the functional units in accordance with a program stored in a ROM (Read Only Memory) or a hard disk.

FIG. 50 is a diagram illustrating an example of an inner configuration of a computer 500 which executes processing operations of the functional units. A CPU (Central Processing Unit) 501 executes various operations in accordance with programs stored in a ROM 502. A RAM (Random Access Memory) 503 appropriately stores data and programs used when the CPU 501 performs various operations.

An input/output interface 505, the CPU 501, the ROM 502, and the RAM 503 are connected to a bus 504. An input unit 506 including a keyboard and a mouse is connected to the input/output interface 505. The input/output interface 505 outputs signals input from the input unit 506 to the CPU 501. Furthermore, an output unit 507 including a display and a speaker is also connected to the input/output interface 505.

Moreover, a storage unit 508 including a hard disk and a communication unit 509 which communicates with other apparatuses through a network such as the Internet are also connected to the input/output interface 505. A drive 510 is also connected to the input/output interface 505 and is used to read data from or write data to a recording medium such as a magnetic disk, an optical disc, a magneto-optical disc, or a semiconductor memory. A moving-image file to be processed is input from the communication nit 509 or the drive 510 and stored in the storage unit 508, such as a hard disk.

The present application contains subject matter related to that disclosed in Japanese Priority Patent Application JP 2008-159782 filed in the Japan Patent Office on Jun. 18, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
 a face detector configured to detect face images included in still-image frames extracted from a moving-image stream;
 a face-feature-value calculation unit configured to calculate face feature values of the face images;
 an identity determination unit configured to determine whether a detected first face image included in a current frame and a detected second face image which is included in a previous frame and which has been stored represent an identical person; and
 a display unit configured to display one of the first and second face images in a browsing application which displays characters in a moving stream when it is determined that the first face image and the second face image represent the identical person.

2. The image processing apparatus according to claim 1, further comprising:
 a merging processor configured to store only one of the first and second face images when the identity determination unit determined that the first face image and the second face image represent the identical person, and to store both the first and second face images when the identity determination unit determines that the first face image and the second face image do not represent the identical person; and
 a face clustering unit configured to assign the face images stored by the merging processor to clusters at least in accordance with the face feature values calculated by the face-feature-value calculation unit so that face images representing the identical person are assigned to a single cluster.

3. The image processing apparatus according to claim 2, wherein the face clustering unit includes:
 a similarity degree calculation unit configured to calculate degrees of similarity of individual pairs of face images extracted from the face images stored by the merging processor in accordance with the face feature values of the pairs of face images,
 a layering-and-clustering unit configured to assign the face images stored by the merging processor to individual clusters, and successively merge clusters including each of the pairs of face images in accordance with the degrees of similarity of the pairs of face images calculated by the similarity degree calculation unit in a descending order of the degrees of similarity of the pairs of face images, and
 a cluster determination unit configured to determine whether over-merging occurred on the clusters starting from a cluster at an uppermost layer in accordance with cluster information items arranged in a tree-shaped structure obtained by the layering-and-clustering unit, and determine clusters by dividing each of clusters which have been determined to be over-merged clusters into two clusters which were obtained before merging processing is performed by the layering-and-clustering unit.

4. The image processing apparatus according to claim 3, wherein the cluster determination unit includes:
 an average-face-feature-value calculation unit configured to calculate an average face feature value, which is obtained by averaging the face feature values of the face images included in a cluster subjected to the over-merging determination processing, and
 an individual-similarity-degree calculation unit configured to calculate an individual-similarity-degree in accordance with the average face feature value calculated by the average-face-feature-value calculation unit and a face feature value of one of the face images included in the cluster subjected to the over-merging determination processing, and when the individual-similarity-degree for at least one of the face images included in the cluster subjected to the over-merging determination processing is smaller than a threshold value for a comparison with an individual-similarity-degree, it is determined that the cluster subjected to the over-merging determination processing is an over-merged cluster.

5. The image processing apparatus according to claim 4, further comprising a user setting unit configured to allow a user to set the threshold value for a comparison with an individual-similarity-degree.

6. The image processing apparatus according to claim 4, wherein the cluster determination unit further includes an average-similarity-degree calculation unit configured to calculate an average similarity degree by averaging individual-similarity-degrees for the face images included in the cluster subjected to the over-merging determination processing, the individual-similarity-degrees being obtained by the individual-similarity-degree calculation unit, and when the average similarity degree calculated by the average-similaritydegree calculation unit is smaller than a threshold value for a comparison with an average similarity degree, it is determined that the cluster subjected to the over-merging determination processing is an over-merged cluster.

7. The image processing apparatus according to claim 6, further comprising a user setting unit configured to allow a user to set the threshold value for a comparison with an average similarity degree.

8. The image processing apparatus according to claim 2, further comprising a representative-image determination unit configured to determine, for each of the clusters including a plurality of face images, a representative face image from among the plurality of face images included in each of the clusters.

9. The image processing apparatus according to claim 8, wherein the representative-image determination unit determines, for each of the clusters including the plurality of face images, the representative face image from among the plurality of face images included in each of the clusters in accordance with at least face-rotation-angle information items, facial-expression information items, or contrast information items regarding the plurality of face images.

10. The image processing apparatus according to claim 9, wherein, for each of the clusters including the plurality of face images, the representative-image determination unit reduces the number of the face images in accordance with the face-rotation-angle information items so as to obtain a first face-image group including face images having face-rotation angles smaller than a first threshold value, reduces the number of the face images included in the first face-image group in accordance with the facial expression information items so as to obtain a second face-image group including face images having scores representing degrees of a specific facial expression larger than a second threshold value, and determines, from among the face images included in the second face-image group, a face image having the highest score representing a degree of contrast to be the representative face image in accordance with the contrast information items.

11. The image processing apparatus according to claim 10, further comprising a user setting unit configured to allow a user to set the first and second threshold values.

12. The image processing apparatus according to claim 1, wherein said display unit is further configured to display a list of the characters in the moving stream.

13. The image processing apparatus according to claim 1, wherein said display unit is configured to display only one of the first and second face images.

14. The image processing apparatus according to claim 1, further comprising a memory unit configured to store the first and second face images, wherein the image processing apparatus is configured to remove from the memory unit the other of the first and second face images.

15. An image processing method comprising:
  detecting face images included in still-image frames extracted from a moving-image stream;
  calculating face feature values of the face images;
  determining whether a detected first face image included in a current frame and a detected second face image which is included in a previous frame and which has been stored represent an identical person; and
  displaying one of the first and second face images in a browsing application which displays characters in a moving stream when it is determined that the first face image and the second face image represent the identical person.

16. The image processing method according to claim 15, further comprising displaying a list of the characters in the moving stream.

17. The image processing method according to claim 15, further comprising displaying only one of the first and second face images.

18. The image processing method according to claim 15, further comprising removing from memory the other of the first and second face images.

19. The image processing method according to claim 15, further comprising:
  storing only one of the first and second face images when it is determined that the first face image and the second face image represent an identical person, and storing both the first and second face images when it is determined that the first face image and the second face image do not represent an identical person, and
  assigning the face images stored to clusters at least in accordance with the calculated face feature values so that face images representing an identical person are assigned to a single cluster.

20. The image processing method according to claim 19, further including,
  calculating degrees of similarity of individual pairs of face images extracted from the stored face images in accordance with the face feature values of the pairs of face images,
  assigning the stored face images to individual clusters,
  successively merging clusters including each of the pairs of face images in accordance with the degrees of similarity of the pairs of face images in a descending order of the degrees of similarity of the pairs of face images,
  determining whether over-merging occurred on the clusters starting from a cluster at an uppermost layer in accordance with cluster information items arranged in a tree-shaped hierarchy, and
  determining clusters by dividing each of clusters which have been determined to be over-merged clusters into two clusters which were obtained before merging processing is performed.

21. The image processing method according to claim 20, further including:
  calculating an average face feature value, which is obtained by averaging the face feature values of the face images included in a cluster subjected to the over-merging determination processing,
  calculating an individual-similarity-degree in accordance with the average face feature value and a face feature value of one of the face images included in the cluster subjected to the over-merging determination processing, and
  when the individual-similarity-degree for at least one of the face images included in the cluster subjected to the over-merging determination processing is smaller than a threshold value for a comparison with an individual-similarity-degree, determining that the cluster subjected to the over-merging determination processing is an over-merged cluster.

22. The image processing method according to claim 21, further including allowing a user to set the threshold value for a comparison with an individual-similarity-degree.

23. The image processing method according to claim 21, further including,
  calculating an average similarity degree by averaging individual-similarity-degrees for the face images included in the cluster subjected to the over-merging determination processing, and when the calculated average similarity degree is smaller than a threshold value for a comparison with an average similarity degree, determining that the cluster subjected to the over-merging determination processing is an over-merged cluster.

24. The image processing method according to claim 23, further including allowing a user to set the threshold value for a comparison with an average similarity degree.

25. The image processing method according to claim 15, further including:
organizing said face images into clusters and determining, for each cluster, a representative face image from among the plurality of face images included in each of the clusters.

26. The image processing method according to claim 25, wherein the representative-image determination unit determines, for each of the clusters including the plurality of face images, the representative face image from among the plurality of face images included in each of the clusters in accordance with at least face-rotation-angle information items, facial-expression information items, or contrast information items regarding the plurality of face images.

27. The image processing method according to claim 26, further including:
reducing the number of the face images in accordance with the face-rotation-angle information items so as to obtain a first face-image group including face images having face-rotation angles smaller than a first threshold value,
reducing the number of the face images included in the first face-image group in accordance with the facial expression information items so as to obtain a second face-image group including face images having scores representing degrees of a specific facial expression larger than a second threshold value, and
determining, from among the face images included in the second face-image group, a face image having the highest score representing a degree of contrast to be the representative face image in accordance with the contrast information items.

28. The image processing method according to claim 27, further including allowing a user to set the first and second threshold values.

29. A non-transitory computer readable storage medium having stored therein a computer program for causing a computer to execute:
detecting face images included in still-image frames extracted from a moving-image stream;
calculating face feature values of the face images;
determining whether a detected first face image included in a current frame and a detected second face image which is included in a previous frame and which has been stored represent an identical person; and
displaying one of the first and second face images in a browsing application which displays characters in a moving stream when it is determined that the first face image and the second face image represent the identical person.

30. The non-transitory computer readable storage medium according to claim 29 having stored therein the computer program for causing the computer to execute displaying a list of the characters in the moving stream.

31. The non-transitory computer readable storage medium according to claim 29 having stored therein the computer program for causing the computer to execute displaying only one of the first and second face images.

32. The non-transitory computer readable storage medium according to claim 29 having stored therein the computer program for causing the computer to remove from memory the other of the first and second face images.

* * * * *